(12) United States Patent
Oshima et al.

(10) Patent No.: US 7,874,267 B2
(45) Date of Patent: Jan. 25, 2011

(54) ANIMAL BREEDING SYSTEM AND USE THEREOF

(75) Inventors: Shigeru Oshima, Osaka (JP); Kentaro Yomogida, Osaka (JP); Kazuhiro Kaseda, Osaka (JP); Hiroshi Kiyono, Hyogo (JP)

(73) Assignee: Osaka Industrial Promotion Organization (JP)

( * ) Notice: Subject to any disclaimer, the term of this patent is extended or adjusted under 35 U.S.C. 154(b) by 595 days.

(21) Appl. No.: 10/498,583

(22) PCT Filed: Dec. 13, 2002

(86) PCT No.: PCT/JP02/13108

§ 371 (c)(1),
(2), (4) Date: Mar. 10, 2005

(87) PCT Pub. No.: WO03/051106

PCT Pub. Date: Jun. 26, 2003

(65) Prior Publication Data

US 2005/0193957 A1    Sep. 8, 2005

(30) Foreign Application Priority Data

Dec. 14, 2001  (JP) .............................. 2001-402715
Aug. 21, 2002  (JP) .............................. 2002-241110

(51) Int. Cl.
*A01K 1/03* (2006.01)
*A01K 1/00* (2006.01)
(52) U.S. Cl. ........................ 119/417; 119/302; 119/418
(58) Field of Classification Search ......... 119/302–310, 119/416–421, 448–450
See application file for complete search history.

(56) References Cited

U.S. PATENT DOCUMENTS 1,823,584 A * 9/1931 Bruce ........................ 119/302

(Continued)

FOREIGN PATENT DOCUMENTS

EP            233134 A    8/1987

(Continued)

OTHER PUBLICATIONS

European Search Report for European Patent Application No. EP 02 79 0764 dated Jan. 31, 2005.

(Continued)

*Primary Examiner*—David J Parsley
(74) *Attorney, Agent, or Firm*—Brinks Hofer Gilson & Lione

(57) ABSTRACT

The present invention has objectives of providing a low-cost, easy-to-handle individual isolation animal breeding unit and a system for using the same, significantly reducing costs of facilities and maintenance for animal experiments and saving on labor, and providing a new animal transportation form. For achieving the objectives, the present invention provides a system for maintaining an animal breeding environment, comprising A) an animal breeding unit capable of comprising an internal tray having a sufficient space for breeding an animal of interest, comprising an external tray capable of accommodating the internal tray, and capable of keeping a predetermined cleanliness degree; B) a method for providing the internal tray having the predetermined cleanliness degree; C) an internal tray exchange unit capable of accommodating the animal breeding unit and exchanging the internal tray while keeping the predetermined cleanliness degree; and D) a method for recovering the exchanged internal tray.

5 Claims, 25 Drawing Sheets

U.S. PATENT DOCUMENTS

| | | | | |
|---|---|---|---|---|
| 1,837,065 A * | 12/1931 | Pierce | | 119/306 |
| 2,562,691 A * | 7/1951 | Beringer | | 119/309 |
| 3,302,615 A | 2/1967 | Tietje | | |
| 3,343,520 A * | 9/1967 | Schwarz, Jr. | | 119/419 |
| 3,902,458 A * | 9/1975 | Schuck et al. | | 422/301 |
| 4,201,154 A * | 5/1980 | Gowrie | | 119/420 |
| 4,343,261 A | 8/1982 | Thomas | | |
| 4,593,650 A * | 6/1986 | Lattuada | | 119/419 |
| 4,729,246 A * | 3/1988 | Melgaard et al. | | 73/865.6 |
| 5,165,362 A * | 11/1992 | Sheaffer et al. | | 119/452 |
| 5,307,757 A * | 5/1994 | Coiro et al. | | 119/418 |
| 5,771,841 A * | 6/1998 | Boor | | 119/452 |
| 5,893,338 A * | 4/1999 | Campbell et al. | | 119/475 |
| 6,092,487 A * | 7/2000 | Niki et al. | | 119/420 |
| 6,227,146 B1 * | 5/2001 | Gabriel et al. | | 119/419 |
| 6,257,171 B1 | 7/2001 | Rivard | | |
| 6,308,660 B1 * | 10/2001 | Coiro et al. | | 119/419 |
| 6,341,581 B1 * | 1/2002 | Gabriel et al. | | 119/419 |
| 6,397,782 B1 * | 6/2002 | Cope et al. | | 119/452 |

FOREIGN PATENT DOCUMENTS

| | | |
|---|---|---|
| JP | 56-3770 | 1/1981 |
| JP | 61-148168 | 9/1986 |
| JP | 62-000230 | 1/1987 |
| JP | 62-7852 | 1/1987 |
| JP | 4-9555 | 1/1992 |
| JP | 4-267826 | 9/1992 |
| JP | 07-039401 | 7/1995 |
| JP | 9-168346 | 6/1997 |
| KR | 2001-0027953 A | 4/2001 |

OTHER PUBLICATIONS

JPO Office Action issued Jan. 15, 2008.
Korean Office Action issued Nov. 14, 2008.

* cited by examiner

FIG. 10
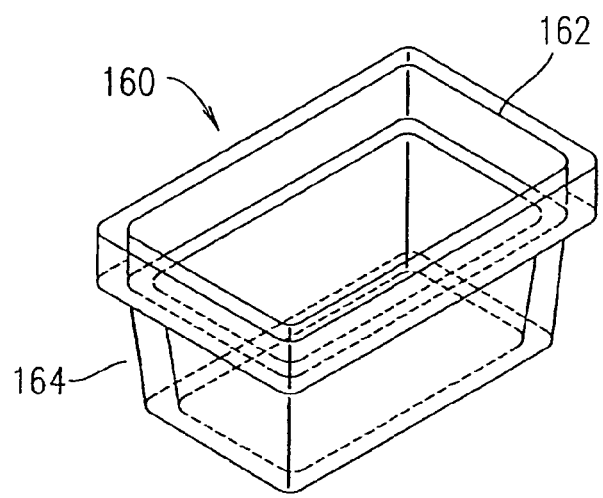
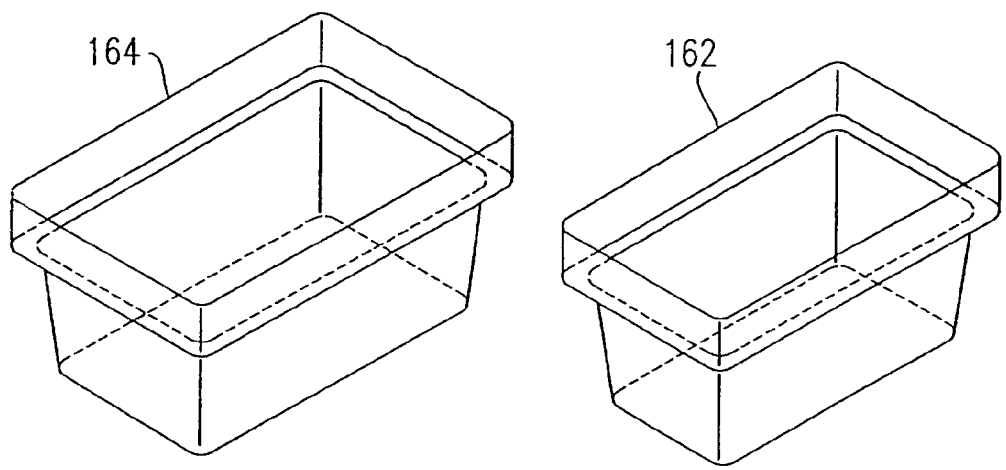

FIG. 12
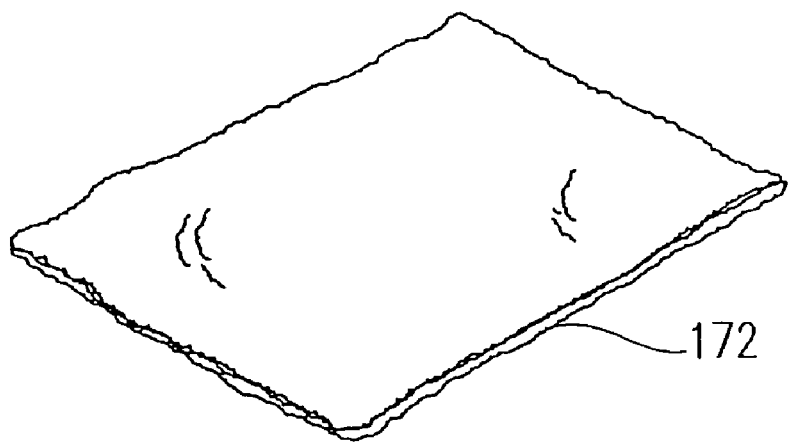
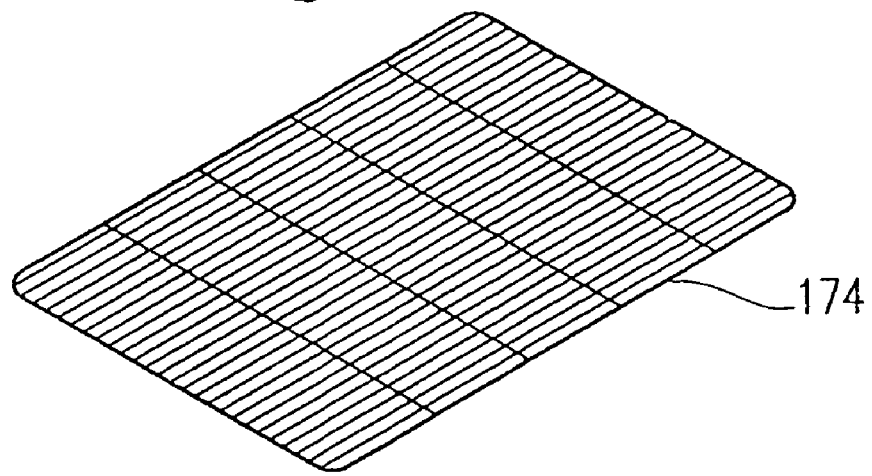
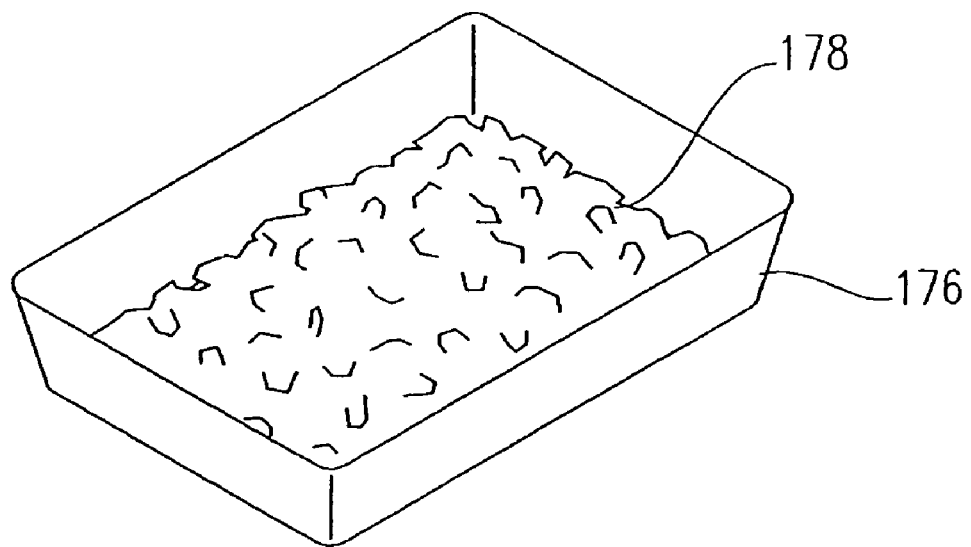

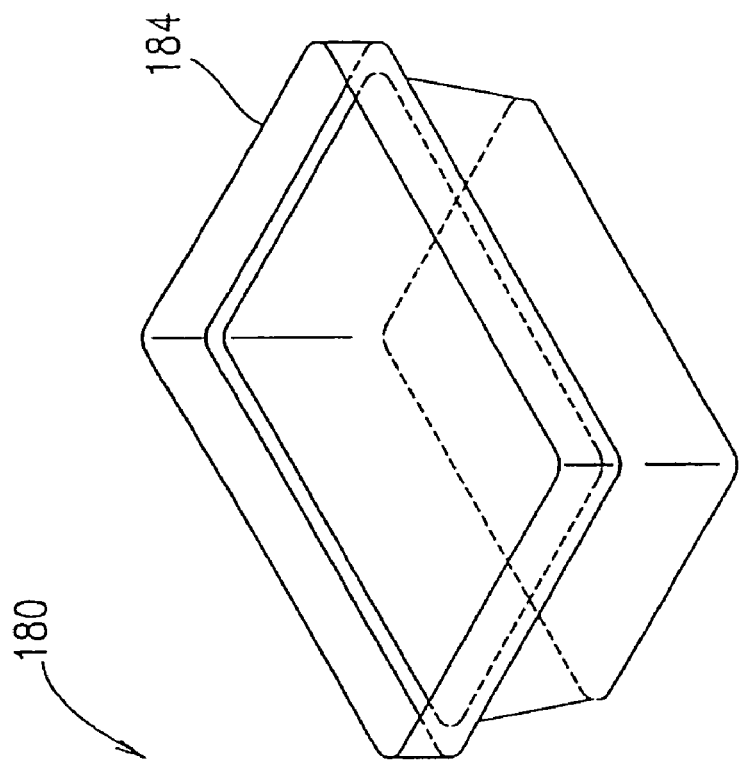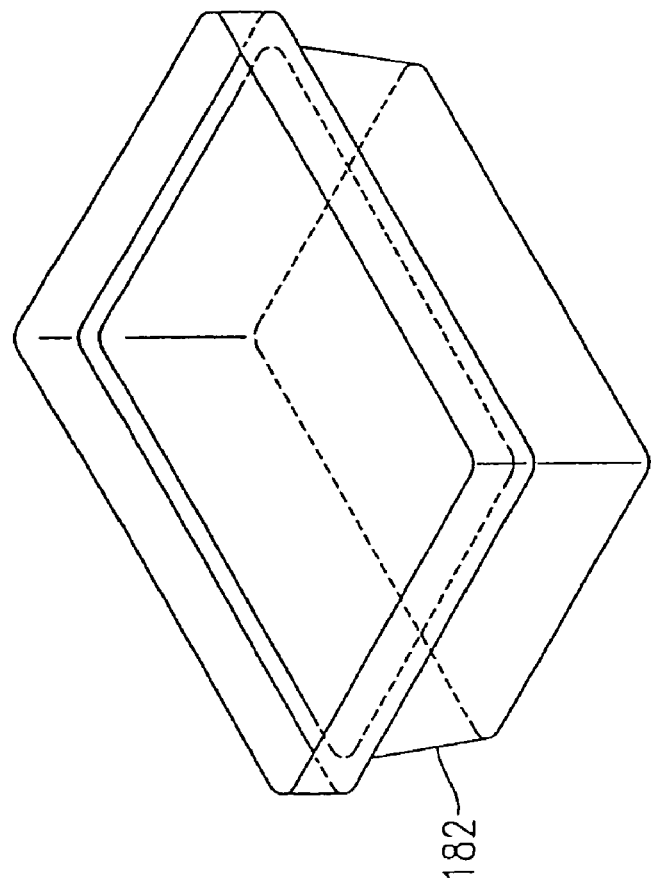
FIG. 13

FIG. 23
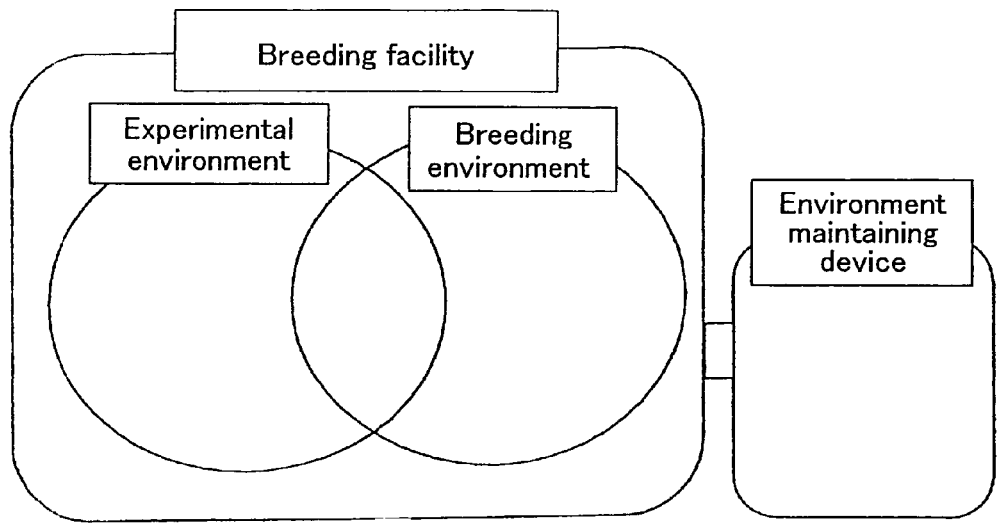
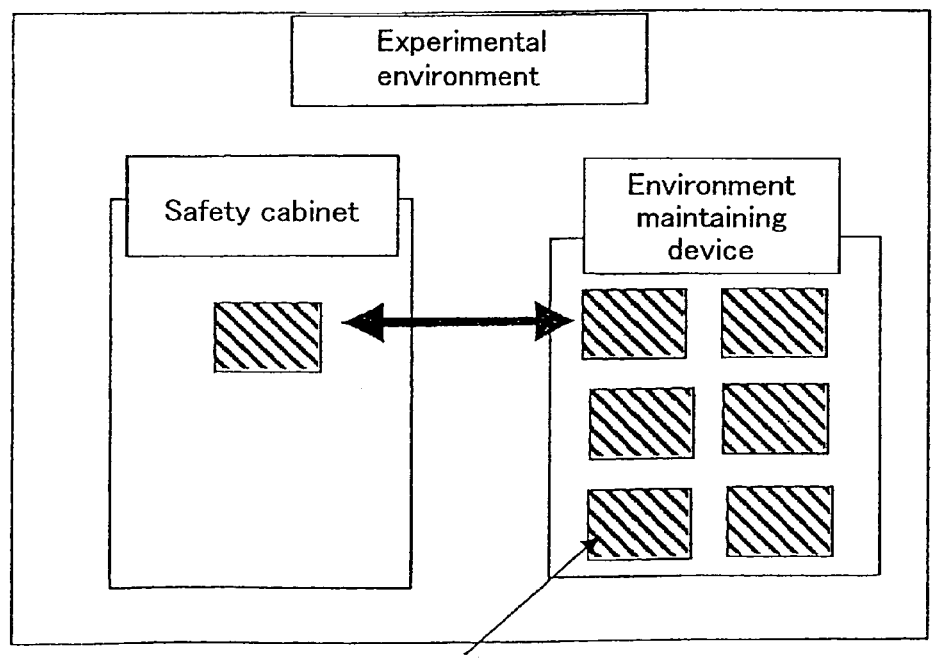

FIG. 25
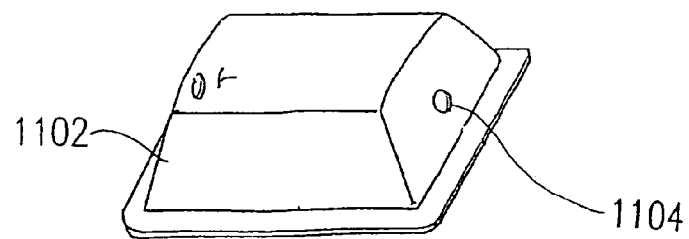
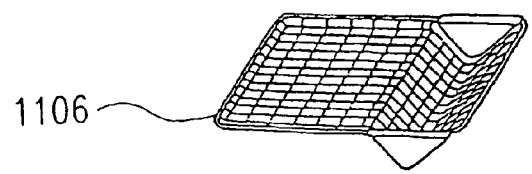
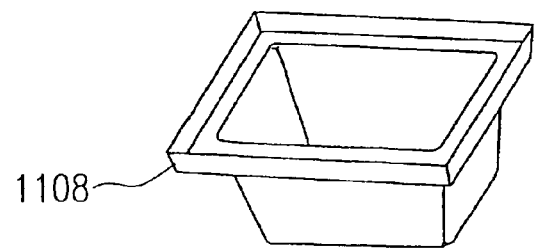
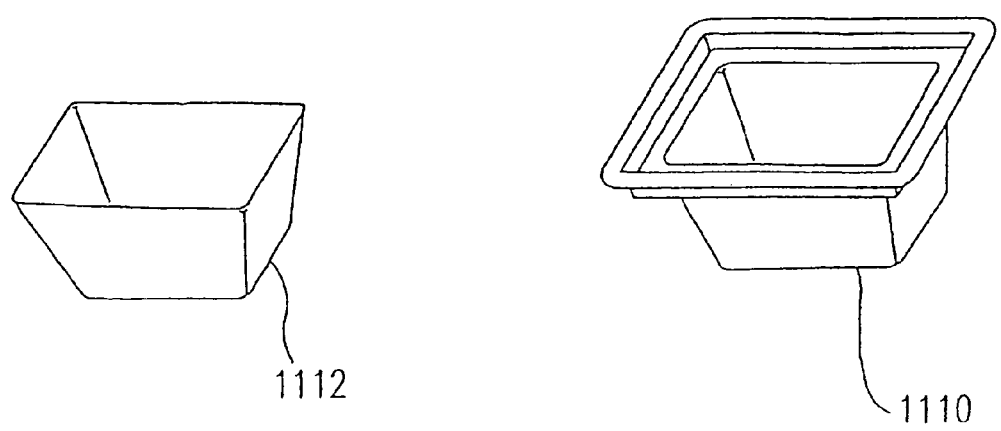

ANIMAL BREEDING SYSTEM AND USE THEREOF

CROSS-REFERENCE TO RELATED APPLICATIONS

This application claims priority under 35 USC §371 based upon PCT/JP02/13108 filed Dec. 13, 2002, and under 35 USC §119 based upon Japanese Patent Applications JP2001-402715, filed on Dec. 14, 2001, and JP2002-241110, filed on Aug. 21, 2002.

TECHNICAL FIELD

The present invention relates to an animal breeding system, a unit used for the same, and an animal breeding method and an experimental method using the animal breeding system and the unit. More specifically, the present invention relates to an animal breeding system which does not require a large-scale environment maintaining facility, a unit used for the same, and an animal breeding method and an experimental method using the animal breeding system and the unit.

BACKGROUND ART

In today's post-genomic age, the analysis of gene functions in vivo is becoming more and more important. The analysis of gene functions using gene modified animals have been developed worldwide. This requires high level quality control of gene modified small animals, which increases demands for high standard animal breeding facilities.

In general, animal breeding systems used for experiments in scientific research require large-scale facilities and high level environment maintaining systems. Gene modification experiments, infection experiments and the like, which require isolation of a breeding facility from an external environment, prevention of infection of the external environment, and the like. Animal breeding system used for such experiments require special environment maintaining systems. Such special systems have defects of being complicated, costly, and requiring personnel expenses. Such special systems also have defects that a facility used for the system, once built, is not easily changed in design, cannot accommodate for an increasing number of animals, and cannot easily prepare different breeding conditions.

In the fields of experiments of recombinant DNA operations, infection experiments on bacteria and viruses, and the like, experimental animals such as mice, rats and the like are bred and managed under strict conditions. In order to achieve such strict conditions, large-scale facilities including breeding devices are required for breeding and managing the experimental animals. In addition, a significant amount of labor and cost are spent for breeding and day-to-day management of the experimental animals. Such large-scale facilities need to conform to strict criteria defined by public authorities such as national governments or the like (for example, the "Recombinant DNA Experiment Guidelines" announced by the Ministry of Education, Culture, Sports, Science and Technology (Notice by the Ministry of Education, Culture, Sports, Science and Technology dated Jan. 31, 2002)).

Currently, however, there is a shortage of such high standard breeding facilities for providing animal breeding environments due to, for example, the strict regulations. It is necessary to supply an animal breeding environment in each facility. Therefore, it has become costly to build the facilities, and the expenses for maintaining the facilities including the light and heat expenses and personnel expenses have become enormous. Since the breeding environment is designed to be large, a huge air-conditioning device is required, and costs for managing the facilities are higher than actually should be. The facilities which have been built must fulfill the strictly defined conditions and thus have a special structure. Therefore, it is difficult to refurbish the facilities or to use the facilities for other purposes. Especially, there is a shortage of special facilities for performing special experiments such as infection experiments. One reason is that it is difficult to maintain the high standards due to the large size of the breeding environments. Another reason is that a special environment for performing isolation needs to be separately prepared in order to perform special experiments such as infection experiments. In addition, there is a problem that when an infection accident occurs, a huge amount of cost and time are spent for cleaning the animals and removing the contamination.

Conventional facilities also have the following defect. Since animals have contact with the humans to an unnecessarily high degree due to the procedure of breeding experiments, the possibility of mutual infection between the animals and the humans becomes high. There is a high possibility of allergen sensitization to the humans, which generates an excessive load on the experiment operators.

Since conventional systems are not fully prepared for carrying the animals for isolation, there is a problem that the possibility of contamination to the animals and environmental pollution is increased when the animals are moved between breeders and the facilities, and between the facilities.

It is considered that there are about 400 research, experiment and breeding institutes handling experimental animals in Japan. Currently worldwide, small experimental animals are bred in metallic or polycarbonate-based breeding cages having floors covered with bedding. The bedding made dirty by the bred animals is disposed each time, and the breeding cages are used repeatedly after being washed and sterilized.

A conventional breeding cage for experimental animals has a shape shown in FIG. 29. A plurality of small projections 1504 are provided on the outer side walls of a main body 1501.

For example, a breeding facility in Osaka University, which is a middle-scale breeding facility, keeps about 10,000 mice a day (about 4,000 breeding cages). The bred animals are transferred to new breeding cages which are sterilized with steam (pulp is used as a bedding material) once a week or once every two weeks. Such a transfer is performed on a daily basis. Annually, about 230,000 breeding cages and about 22 tons of the bedding materials are necessary. About 35 tons of excrement needs to be disposed. About 900,000 liters of washing water and 5,700 $Nm^3$ of town gas are used for these operations annually. This is a waste of a huge amount of resources in terms of labor and materials.

Especially in order to control the health condition inside the animal breeding cages, exchange of bedding materials, for example, is important and indispensable. Conventionally, the bedding materials have been exchanged manually. However, since the number of breeding cages for experimental animals is increasing and research using transgenic animals have been actively conducted recently, the costs for labor and materials for hygiene control tend to be more and more raised. There is another problem that the cages and bedding materials used for the breeding need to be prepared and disposed in the facility, and huge equipment for the preparation and disposal is required for each facility. Accordingly, a system for simplifying the work for hygiene control has been strongly desired.

For example, an experimental mouse usually bears one to several tens of babies at once, and the babies obtain a mating ability in 5 to 6 weeks after birth. Therefore, especially gene modified animals need to be individually bred from 4 to 5 weeks after birth, i.e., before the babies obtain a mating ability in order to maintain the strain. Demands for gene modified animals have recently been rapidly increased, and there are problems of increasing costs for labor and materials and a difficulty in obtaining breeding space.

Conventional facilities have many defects from the viewpoint of the operators who perform experiments using animals. For example, since the experiments need to be performed in a special facility as described above, the operator must enter the isolated breeding facility. The procedure for entrance is troublesome. There are strong desires to perform special experiments, such as gene modification experiments and infection experiments, which could conventionally be done only in experimental animal facilities, in usual laboratories. There is no conventional system satisfying such desires.

PROBLEMS TO BE SOLVED BY THE INVENTION

The present invention has an objective of providing an individual isolation animal breeding unit which is low-cost and easy to handle, and a system for using the same. The present invention has an objective of significantly reducing the costs of facilities and maintenance required for animal experiments, and saving on labor. The present invention also has an objective of providing a new animal transportation form (a breeding cage having a transportation function).

One objective of the present invention is to provide a breeding system with which experiments requiring a special environment, such as infection experiments and gene modification experiments, can be performed anywhere; and an article, a method and the like relating to the same. Another objective of the present invention is to provide an animal breeding system which does not require a special treatment facility; and an article, a method and the like relating the same.

DISCLOSURE OF THE INVENTION

The present invention has solved the above-described problems by providing a system for bringing an isolated animal breeding environment to an experimental environment. The present invention has solved the above-described problems by forming a cage (tray) to be two-layered and making an internal tray disposable.

Thus, the present invention provides the following.

1. A system for maintaining an animal breeding environment, the system comprising:
   A) an animal breeding unit which is capable of comprising an internal tray having a sufficient space for breeding an animal of interest, comprises an external tray capable of accommodating the internal tray and is capable of keeping a predetermined degree of cleanliness;
   B) means for providing the internal tray having the predetermined degree of cleanliness;
   C) an internal tray exchange unit capable of accommodating the animal breeding unit and exchanging the internal tray while keeping the predetermined degree of cleanliness; and
   D) means for recovering the exchanged internal tray.

2. A system according to item 1, further comprising means for transporting the internal tray to the internal tray exchange unit.

3. A system according to item 1, further comprising an environment maintaining device for maintaining the animal breeding environment.

4. A system according to item 1, wherein the means for providing the internal tray comprises means for producing the internal tray.

5. A system according to item 1, further comprising means for disposing the exchanged internal tray.

6. A system according to item 1, further comprising means for regenerating the exchanged internal tray.

7. A system according to item 1, wherein the means for providing the internal tray comprises means for regenerating the internal tray.

8. A system according to item 1, wherein the predetermined degree of cleanliness is a degree at which the animal breeding environment contains nothing which provides an undesirable influence for a purpose of using the animal of interest.

9. A system according to item 1, wherein the predetermined degree of cleanliness is a degree at which the animal breeding environment comprises no pathogens for the animal of interest.

10. A system according to item 1, wherein the internal tray is water-resistant.

11. A system according to item 1, wherein the internal tray accommodates bedding.

12. A system according to item 1, wherein the internal tray is disposable.

13. A system according to item 1, wherein the internal tray is recyclable.

14. A system according to item 1, wherein the internal tray contains a biodegradable material.

15. A system according to item 1, wherein the internal tray is formed of a material selected from the group consisting of paper, pulp, polyolefin-based resins, non-crystalline polyesters, and mixtures of polyolefin-based resins and inorganic fillers.

16. A system according to item 1, wherein the internal tray having the prescribed degree of cleanliness is sterilized.

17. A system according to item 1, wherein the internal tray exchange unit is selected from the group consisting of a safety cabinet, a clean bench, a clean table, an exchange station, and an exchange isolator.

18. A system according to item 1, wherein the means for providing the internal tray comprises means for sterilization.

19. A system according to item 1, wherein the animal breeding unit comprises means capable of maintaining airtightness.

20. A system according to item 1, further comprising a container which is capable of accommodating at least one animal breeding unit and which comprises means capable of maintaining airtightness.

21. A system according to item 1, wherein the external tray has a brim surface and a stepped portion.

22. A system according to item 1, wherein the internal tray has a brim surface and a stepped portion.

23. A device for producing an internal tray used in the system according to the present invention, the device comprising means for molding the internal tray.

24. A method for maintaining an animal breeding environment in an animal breeding unit, which comprises an internal tray having a sufficient space for breeding an animal of interest, comprises an external tray capable of accommodating the internal tray, and is capable of keeping a predetermined degree of cleanliness, the method comprising the steps of:
   A) providing another internal tray having the predetermined degree of cleanliness;
   B) locating the animal breeding unit in an internal tray exchange unit capable of accommodating the animal breeding unit and capable keeping the predetermined degree of cleanliness; and
   C) in the internal tray exchange unit,
     C-1) removing the used internal tray from the animal breeding unit;
     C-2) removing the animal of interest from the used internal tray;
     C-3) attaching the another internal tray having the predetermined degree of cleanliness to the animal breeding unit; and
     C-4) locating the animal of interest in the another internal tray having the predetermined degree of cleanliness; and
   D) recovering the used internal tray.

25. A method according to item 24, wherein the another internal tray having the predetermined degree of cleanliness is sterilized.

26. A method according to item 24, wherein the internal tray exchange unit is selected from the group consisting of a safety cabinet, a clean bench, a clean table, an exchange station, and an exchange isolator.

27. A method according to item 24, wherein the internal tray exchange unit isolates the animal breeding unit from an external environment.

28. A method according to item 24, wherein internal tray exchange unit is capable of keeping airtightness.

29. A method according to item 24, wherein a plurality of the animal breeding units are used, and the step C) is performed while at least two of the plurality of animal breeding units are kept isolated from each other.

30. A method according to item 29, wherein:
   the plurality of animal breeding units are grouped into a plurality of animal breeding unit groups;
   the animal breeding unit groups each comprise at least one animal breeding unit; and
   the step C) is performed in the state where the animal breeding units in each animal breeding unit group are not isolated from each other, but the plurality of animal breeding unit groups are isolated from each other.

31. Use of an internal tray production device for producing an internal tray used in the method according to item 24.

32. Use of an internal tray regeneration device for regenerating an internal tray recovered in the method according to item 24.

33. A system for an experiment using an animal, the system, comprising:
   A) at least one animal breeding unit, which is isolated from an external environment and is connectable to an environment maintaining device; the animal breeding unit comprising:
     1) a housing; and
     2) at least one opening, provided on the housing, connectable with the environment maintaining device;
   B) the environment maintaining device; and
   C) a facility for the experiment using the animal.

34. A system according to item 33, wherein the facility for the experiment is selected from the group consisting of an ordinary experimental facility, a P1 experimental facility, a P2 experimental facility, a P3 experimental facility, and a P4 experimental facility.

35. An animal breeding unit which is isolated from an external environment and is connectable to an environment maintaining device, the animal breeding unit comprising:
   1) a housing; and
   2) at least one opening, provided on the housing, which is connectable with the environment maintaining device.

36. An animal breeding unit according to item 35, wherein the housing and the environment maintaining device are airtightly connectable via the opening.

37. An animal breeding unit according to item 35, which has at least two openings.

38. An animal breeding unit according to item 35, wherein the opening is provided with a valve capable of maintaining isolation of an animal breeding system comprising the animal breeding unit, from an external environment when the animal breeding unit is disconnected from the environment maintaining device.

39. An animal breeding unit according to item 35, wherein the opening is provided with a valve capable of maintaining airtightness of an animal breeding system comprising the animal breeding unit, with respect to an external environment when the animal breeding unit is disconnected from the environment maintaining device.

40. An animal breeding unit according to item 35, wherein the environment maintaining device comprises means for providing a gas to the animal breeding unit and recovering the gas from the animal breeding unit via the opening.

41. An animal breeding unit according to item 35, wherein the housing comprises:
   1) an external tray; and
   2) a lid.

42. An animal breeding unit according to item 41, further comprising an internal tray inside the external tray.

43. An animal breeding unit according to item 42, wherein the internal tray is disposable.

44. An animal breeding unit according to item 42, wherein the internal tray is water-resistant.

45. An animal breeding unit according to item 42, wherein the internal tray is formed of a material selected from the group consisting of paper, pulp, polyolefin-based resins, and mixtures of polyolefin-based resins and inorganic fillers.

46. An animal breeding unit according to item 42, wherein the internal tray prevents an animal in the internal tray from contacting the external tray.

47. An animal breeding unit according to item 42, wherein the internal tray is sterilizable.

48. An animal breeding unit according to item 35, further comprising a packing member provided between the lid and the external tray for maintaining airtightness.

49. An animal breeding unit according to item 35, further comprising an internal lid for isolating the animal from the external tray.

50. An animal breeding unit according to item 49, wherein the internal lid is lattice-shaped.

51. An animal breeding unit according to item 49, wherein the internal lid is formed of stainless steel.

52. An animal breeding unit according to item 35, further comprising a mesh cover.

53. An animal breeding unit according to item 41, further comprising a filter.

54. An animal breeding unit according to item 53, wherein the filter is selected from a HEPA filter, an ULPA filter, a cellulose filter, a cellulose acetate filter, a nylon filter, a PVDF filter, a PTFE filter, a PP filter, a PES filter, a GF/F filter and filter paper, and a filter formed of a combination thereof.

55. An animal breeding unit according to item 35, further comprising a bedding material.

56. An animal breeding unit according to item 42, wherein the internal tray accommodates a water-absorbent bedding material.

57. An animal breeding unit according to item 41, wherein the external tray has a brim surface and a stepped portion.

58. An animal breeding unit according to item 42, wherein the internal tray has a brim surface and a stepped portion.

59. An animal breeding unit set comprising at least one animal breeding unit according to item 1 located on a rack.

60. An animal breeding unit set according to item 59, further comprising an automatic illumination device.

61. An animal breeding unit set according to item 59, wherein the rack comprises a sterilization circuit.

62. An animal breeding unit set according to item 59, wherein the rack comprises a deodorization device.

63. An animal breeding unit, comprising:
    1) an external tray; and
    2) an internal tray.

64. An animal breeding unit according to item 63, wherein the internal tray is disposable.

65. An animal breeding unit according to item 63, further comprising a lid.

66. An animal breeding unit according to item 63, wherein the internal tray is water-resistant.

67. An animal breeding unit according to item 63, wherein the internal tray prevents an animal in the internal tray from contacting the external tray.

68. An animal breeding unit according to item 63, wherein the internal tray is sterilizable.

69. An animal breeding unit according to item 63, wherein the internal tray is formed of a material selected from the group consisting of paper, pulp, polyolefin-based resins, non-crystalline polyesters, and mixtures of polyolefin-based resins and inorganic fillers.

70. An animal breeding unit according to item 63, wherein at least one of the internal tray and the external tray comprises a brim surface.

71. A disposable internal tray for use in an animal breeding unit comprising an external tray and the internal tray.

72. A disposable internal tray according to item 71, which is water-resistant.

73. A disposable internal tray according to item 71, wherein the internal tray prevents an animal in the internal tray from contacting the external tray.

74. A disposable internal tray according to item 71, which is formed of a material selected from the group consisting of paper, pulp, polyolefin-based resins, non-crystalline polyesters, and mixtures of polyolefin-based resins and inorganic fillers.

75. A disposable internal tray according to item 71, which comprises a brim surface and a stepped portion.

76. An animal breeding system, comprising an animal breeding unit according to item 35 and an environment maintaining device.

77. An animal breeding system according to item 76, further comprising a safety cabinet or a clean bench.

78. An animal breeding system according to item 76, wherein the environment maintaining device comprises a control section for controlling at least one parameter of a gas provided to the animal breeding unit, the at least one parameter being selected from the group consisting of temperature, humidity, oxygen concentration and carbon dioxide concentration.

79. An animal breeding system according to item 76, wherein the environment maintaining device comprises an air discharge section for discharging air.

80. An animal breeding system according to item 77, wherein the animal breeding unit, a safety cabinet or a clean bench, and the environment maintaining device are connectable with one another while being isolated from the external environment.

81. An animal breeding system according to item 76, wherein the environment maintaining device is portable.

82. An animal breeding system according to item 77, wherein the safety cabinet or the clean bench is isolated from an external environment.

83. An animal breeding method comprising the step of breeding an animal using an animal breeding unit according to item 35 or 63, or using a system according to item 1, 33, or 77.

84. A method for recycling an animal breeding unit, comprising the step of treating the internal tray and supplementing a new internal tray after breeding an animal using an animal breeding unit according to item 42 or 63.

85. An infection or recombinant experimental method, comprising the steps of:
    breeding an animal in an animal breeding unit in a system according to item 1, 33 or 77;
    moving the animal breeding unit to a safety cabinet; and
    performing an infection or recombinant experiment in the safety cabinet or a clean bench.

86. An infection or recombinant experimental method according to item 85, wherein the animal breeding unit system is located in an infection-preventing facility.

87. A container for accommodating an internal tray for use in a system according to item 1, wherein the container has a sufficient capacity for accommodating the internal tray.

88. A container according to item 87, which is sterilizable.

89. A container according to item 87, which is water-resistant.

BRIEF DESCRIPTION OF THE DRAWINGS

FIG. 10 shows one exemplary two-layer animal breeding unit according to the present invention.

FIG. 12 shows components optionally used in the present invention.

FIG. 13 shows a two-layer animal breeding unit according to a preferable example of the present invention.

FIG. 23 shows a concept of a conventional breeding environment (upper part) and a breeding environment realized by the animal breeding system according to the present invention (lower part).

FIG. 25 shows components used when the animal breeding unit according to the present invention is used in combination with conventional products.

DESCRIPTION OF THE REFERENCE NUMERALS

Figure 1:
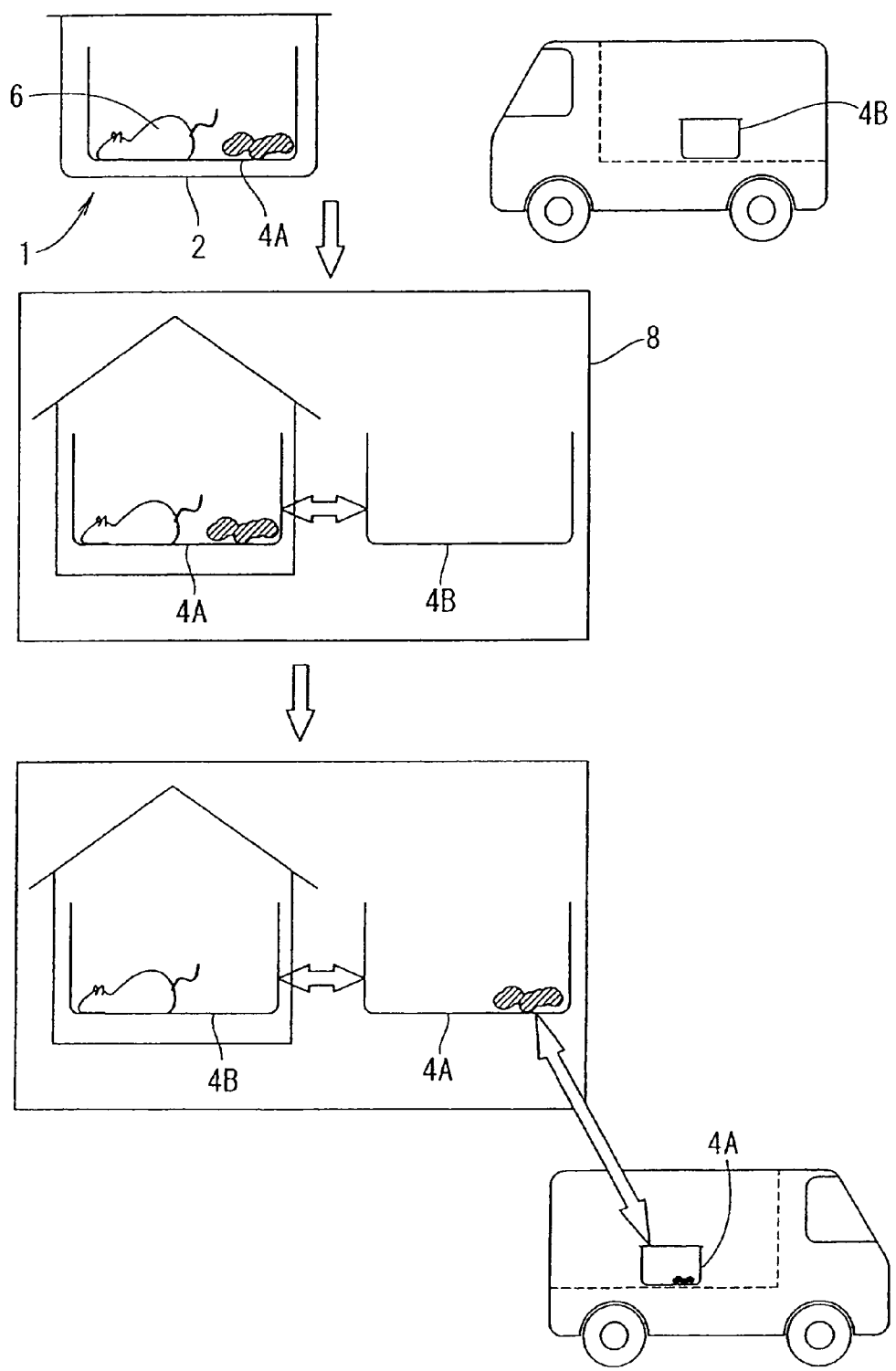
FIG. 1 shows one exemplary animal breeding system according to the present invention.

1 Animal breeding unit
2 External tray
4A Used internal tray
4B Unused internal tray
6 Animal
8 Internal tray exchange unit
10 Animal breeding unit
12 Housing
14 Opening
16 Lid
20 Animal breeding unit
22 Housing
24 Opening
26 Lid
28 Tube
30 Animal breeding unit
32 External tray
34 Lid
36 Opening
38 Tube
40 Animal breeding unit
42 External tray
44 Lid
46, 48 Opening
47, 49 Tube
50 Animal breeding unit
52 External tray
54 Lid
56 Packing member
58 Opening
60 Valve
62 Connector
70 Animal breeding unit
72 Opening
74 Tube
80 Animal breeding unit
82 External tray
84 Lid
86 Opening
88 Valve
90 Environment maintaining device
92 Control section
94 Opening
96 Valve
98 Tube
100 Animal breeding system
110 Animal breeding unit
112 External tray
114 Internal tray
116 Lid
118 Opening for air supply
120 Opening for air recovery
122 Valve for air supply
124 Valve for air recovery
130 Environment maintaining device
132 Control section
134 Opening for air supply 136 Opening for air recovery
138 Valve for air supply
140 Valve for air recovery
142 Tube
144 Tube
150 Animal breeding system
160 Animal breeding unit
162 Internal tray
163 Internal tray
164 External tray
166 Lid
172 Filter
174 Mesh cover
176 Internal tray
178 Floor spread
180 Animal breeding unit
182 External tray
184 Internal tray
186 Internal lid
188 Water supply bottle
190 Cage
192 Lid
194 Floor spread
196 Water supply bottle
200 Conventional cage unit
202 Cage
204 Lid
206 Water supply bottle
208 Floor spread
302 External tray
304 Internal tray
306 Internal lid
308 Lid
310, 312 Opening
314, 316 Valve
318 Sealing tape
320 Water supply bottle
330 Conventional cage
350 Case
352 Escape preventing mesh sheet
354 Filter
360 Transportation cage
1000 Cage kit designed so as to provide individual airtightness
1002 Dust filter
1004 Packing member
1006 Individually airtight cover
1008 Transportation filter
1010 Transportation mesh cover
1012 Internal tray
1014 External tray
1016 Floor spread
1030 Material carrier
1040 Animal breeding facility
1042 Compact air-conditioner
1044 Cages designed so as to provide individual airtightness
1046 Stack-type airtight case
1048 Room air-conditioner
1060 Experimental facility
1070 Used internal tray
1102 Individually airtight cover
1104 Opening for an air supply and discharge tube
1106 Existing breeding internal lid
1108 Disposable internal tray
1110 External tray designed so as to provide individual airtightness
1112 Existing breeding cage
1202 Transportation filter
1204 Two-sided tape
1206 Punched cover for transportation
1208 Mesh cover for transportation
1210 Disposable internal tray
1212 External tray
1214 External tray-type disposable internal tray
1301 Air valve
1302 Circulating sterilization device
1303 Compact air-conditioner including a filter and a deodorization device,
1304 Tube connector
1305 Dust filter
1306 Packing member
1307 Escape preventing internal lid
1308 Timer-equipped automatic illumination device
1309 Individually airtight external cover
1310 Disposable internal tray
1311 Individually airtight external tray
1312 Filter cap
1313 Floor spread
1314 Animal to be bred
1315 Stack-type breeding case
1501 Breeding cage main body
1504 Small projection
1601 Breeding cage main body
1602 Stepped portion
1603 Brim surface

EMBODIMENTS OF THE INVENTION

Hereinafter, the present invention will be described. It should be understood throughout the present specification that articles for singular forms include the concept of their plurality unless otherwise mentioned. Therefore, articles or adjectives for singular forms (e.g., "a", "an", "the", etc. in English; "ein", "der", "das", "die", etc. and their inflections in German; "un", "une", "le", "la", etc. in French; "un", "una", "el", "la", etc. in Spanish, and articles, adjectives, etc. in other languages) include the concept of their plurality unless otherwise specified. It should be also understood that terms as used herein have definitions ordinarily used in the art unless otherwise mentioned. Therefore, all technical and scientific terms used herein have the same meanings as commonly understood by those skilled in the art. Otherwise, the present application (including definitions) takes precedence.

DEFINITIONS

Hereinafter, definitions of the terms specifically used in this specification will be described.

As used herein, the term "animal" is used in the broadest sense as used in the art, and encompasses vertebrates and invertebrates. Animals include, but are not limited to, mammalian, aves, reptilia, amphibia, pisces, insectal, and helminthia. In this specification, an animal may preferably be a small animal. A small animal refers to an animal having such a size that the adult can be easily handled by one human hand. Small animals usually include guinea pigs and smaller animals, and are, for example, selected from the group consisting of mice, rats, guinea pigs, hamsters, jirds, Suncus, and ferrets. A system, cage and method according to the present invention are intended to be used portably and easily and thus are useful for small animals and middle-sized animals, especially small animals.

A system, cage and method according to the present invention are intended to function for all animals, in addition to mammals. Accordingly, a system, cage and method according to the present invention are intended to be used for all the fields in which animals are used, in addition to scientific studies and experiments. The fields in which the system, cage and method according to the present invention are intended to be used include, for example, exhibition at zoos, breeding and propagation in agriculture and livestock industries, breeding and propagation in the experimental animal and pet industries, medical treatment and management for injuries and diseases of animals at animal hospitals.

As used herein, the term "transgenic" refers to incorporation of a specific gene into an organism or an organism having a specific gene incorporated thereinto (for example, a mouse).

According to the present invention, when the organism to be bred is an animal, a transgenic organism can be produced by a transgenic animal production technique using a microinjection method, a virus vector method, an ES cell method (embryonal stem cell method), a sperm vector method, a method of introducing a chromosomal fragment (transomic method), an episome method or the like. Such transgenic animal production techniques are well known in the art.

General molecular biological techniques which can be used in animal experiments performed using the present invention can be easily carried out by those skilled in the art with reference to, for example, Current Protocols in Molecular Biology, edited by Ausubel F. A. et al., Wiley New York, N.Y. (1988); Sambrook et al., Molecular Cloning: A Laboratory Manual, 2nd Ed., Cold Spring Harbor Laboratory Press, Cold Spring Harbor, N.Y. (1987); and the third edition thereof. Infection experiments performed using the present invention can also be carried out using techniques well known in the art. Such a technique is described in, for example, Laboratory Safety. Principle and practices. 2nd Ed., edited by Fleming, D. O. et al., American Society for Microbiology, Washington D.C.

As used herein, the term "unit", when used for animal breeding, refers to the minimum unit of equipment for breeding an animal. An example of the unit is a cage. A set of a plurality of units can be accommodated in a larger facility such as, for example, a rack.

As used herein, the term "connectable", when used for two portions having a structure in which they can be connected to each other, refers to that the two portions (for example, openings) can optionally be connected. Accordingly, when an opening formed in an animal breeding unit and an environment maintaining device have a structure in which they are connectable, the opening can optionally be connected to the environment maintaining device.

As used herein, the term "opening" may have any shape as long as the opening has a function of connecting two spaces. Accordingly, an opening may be a simple circular opening, or may be an opening provided with a tube. Preferably, there are at least two openings in a housing or an external tray. The two openings may act as a gas supply opening and a gas discharge opening. One opening may act both as the gas supply opening and the gas discharge opening, or different openings may act respectively as the gas supply opening and the gas discharge opening. An opening may be openable/closable for itself, or may be opened/closed by another means (for example, a valve).

As used herein, the terms "isolation" and "biologically isolated" refer to that a visible substance, a microorganism such as, for example, a virus or a bacterium, and a nonvolatile chemical substance cannot move between two spaces. Isolation is performed with respect to any space (for example, an external environment).

As used herein, the terms "airtight n and "airtightness" refer to a state or a property by which a gas cannot move from one of two spaces to the other space. Preferably, the terms "airtight" and airtightness" refer to a state or a property by which an atmospheric pressure difference of about −4 mmAq to +4 mmAq can be easily maintained. An animal breeding unit according to the present invention preferably includes a packing member for maintaining the airtightness. Such a packing member may be attached to a connection section of each component.

As used herein, the term "individual airtightness breeding manner" refers to a breeding method by which each breeding unit is made airtight. In the individual airtightness breeding manner, each breeding unit is preferably connected to the environment maintaining device.

As used herein, the term "group airtight breeding manner" refers to a breeding method by which a breeding unit group including at least one breeding unit is located in a rack and the entire rack is made airtight. In the group airtight breeding manner, each rack is preferably connected to the environment maintaining device.

As used herein, the term "valve" refers to a device for adjusting a direction of inlet/outlet of, or a flow of, a gas or a liquid flowing in a tube or the like. A valve is attached to an opening when necessary and provides a function of adjusting inlet/outlet of a gas or the like. Preferably, the valve has a function of adjusting the inlet and outlet of air (i.e., an atmosphere). Preferably, the valve has a function of keeping the animal breeding system airtight with respect to an external environment.

As used herein, the expression "having a sufficient space for breeding an animal of interest" is used for an animal breeding unit, an internal tray and the like, and refers to having a sufficient space for routinely breeding an animal to be bred. Such a size of the space is, for example, at least about 30 times the volume of the animal to be bred (for example, when five adult mice are to be bred, an inner height of about 127 mm or greater and a floor area of about 483 $cm^2$ or greater), but is not limited to this.

As used herein, the expression "can accommodate" an internal tray or the like, when used for an external tray or the like, refers to that the external tray has a shape and/or size which is sufficient to accommodate the internal tray.

As used herein, the term "exchange" of internal trays refers to exchanging an internal tray already attached to the external tray with another internal tray, and also refers to newly attaching an internal tray to an external tray having no internal tray attached thereto.

As used herein, the term "recovery" of an internal tray refers to removing the internal tray from a predetermined site and transferring the internal tray to another site. Preferably, the another site may be a site where the internal tray is abolished or a site providing means for recycling the internal tray.

As used herein, the "environment maintaining device" refers to a device for maintaining an environment in which an animal to be bred can grow. Such an environment maintaining device can control at least one parameter selected from the group consisting of temperature, humidity, oxygen concentration and carbon dioxide concentration. Preferably, such an environment maintaining device can process discharged air. The discharged air preferably contains no contaminating substances as a result of being filtered, for example. In addition to using a filter for microorganisms, in the case where an experiment is performed using a chemical substance, it may be preferable to use activated carbon such that the chemical substance adsorbs the activated carbon. Ammonia is an exemplary substance which causes problems in breeding animals. Since activated carbon is saturated with ammonia in a short time, a chemical ammonia decomposition device needs to be provided against ammonia. An exemplary ammonia decomposition device uses a principle of light catalyst. The environment control device can control parameters such as illumination time, illuminance or the like, in addition to the temperature, humidity, oxygen concentration and carbon dioxide concentration. Here, the term "control", when used for a parameter, refers to maintaining the parameter within a predetermined range (preferably, a range preferable to the animal to be bred).

Among the parameters, the appropriate temperature varies with the animal. The room temperature is usually kept in the range of 0° C. to 42° C., preferably in the range of 15° C. to 37° C., and more preferably in the range of 20° C. to 30° C. For mice, the room temperature is preferably kept in the range of 20° C. to 26° C.; and for rats, the room temperature is preferably kept in the range of 20° C. to 26° C.

The appropriate humidity also varies with the animal. The room humidity is usually kept in the range of 0% to 10% (relative humidity), preferably in the range of 40% to 70%, and more preferably in the range of 45% to 70%. For mice, the room humidity is preferably kept in the range of 45% to 70%; and for rats, the room humidity is kept in the range of 55% to 70%.

The appropriate oxygen concentration also varies with the animal. The room oxygen concentration is preferably the concentration in normal fresh air. Conditions which cause low oxygen state (for example, 5%) should be avoided, since such a state has an adverse influence on the animal.

The appropriate carbon dioxide concentration also varies with the animal. The room carbon dioxide concentration is preferably the concentration in normal fresh air. Conditions which cause high carbon dioxide state (for example, about 50% or more) should be avoided, since such a state has an adverse influence on the animal. In order to maintain the oxygen concentration and the carbon dioxide concentration, it is preferable to ventilate frequently. Ventilation may be performed continuously or intermittently.

It is preferable to also control the air stream speed, atmospheric pressure, illuminance, noise, ammonia concentration and the like. A preferable air stream speed is, for example, 0.2 m/sec. or less. The atmospheric pressure may preferably be set to be 20 Pa higher than the ambient pressure, and may preferably be set to be 150 Pa higher than the ambient pressure when necessary. A preferable illuminance may be, for example, 150 to 300 lux. It may be preferable that the degree of noise does not exceed 60 dB. The ammonia concentration may be suppressed to, for example, 50 ppm or less, preferably 25 ppm or less, and more preferably 20 ppm or less.

As used herein, the term "cleanliness" refers to the level of cleanliness of an environment in which an animal is bred. As used herein, the term "predetermined degree of cleanliness" refers to a degree at which no significantly adverse influence is provided for the purpose of using an animal which is bred using a system or a method according to the present invention. Accordingly, the predetermined degree of cleanliness varies with the purpose of use of the animal bred. The predetermined degree of cleanliness is, for example, a degree at which pathogens for the animal (for example, a specific virus, bacterium, etc.) is not contained, but is not limited to such a degree. A level at which a pathogen is contained may be the predetermined degree of cleanliness as long as no significantly adverse influence is provided for the purpose of using the animal. Preferably, the predetermined degree of cleanliness may be a degree at which pathogens for the animal are not substantially contained or not contained at all. The cleanliness can be set by controlling the various parameters regarding the environment described above. Alternatively, the cleanliness can be set by using a filter or the like.

Accordingly, the above-mentioned environment maintaining device may be any air supply and discharge device preferably equipped with a HEPA filter. For example, air supply and discharge devices for a breeding rack available from Allentown Caging Equipment, Co., Inc. (Allentown, N.J., U.S.A), and Clea Japan, Inc., and the like are usable. As a small- to middle-sized environment maintaining device used in a laboratory, air supply and discharge devices for a breeding rack available from Allentown Caging Equipment, Co., Inc. (Allentown, N.J., U.S.A), and Clea Japan, Inc., and the like are usable, for example. For use in an automobile, a commercially available air-conditioning device is, for example, usable.

An animal breeding unit and an animal breeding system according to the present invention can actively maintain the environment (i.e., actively control or change a parameter) when used together with an environment maintaining device. Environment maintenance is generally passively performed by locating an animal breeding unit or an animal breeding system in a breeding chamber which is cleaned and ventilated. Passive environment maintenance has problems in that the barrier against infection is easily broken by weak sealability, deterioration of a filter, or the like. Therefore, the present invention performs active environment maintenance, i.e., controls the temperature, humidity, $O_2$ concentration and $CO_2$ concentration in the breeding unit to desired levels.

As used herein, the term "disposable" refers to being usable immediately and disposed without being recycled. Accordingly, a disposable portion should be formed of a low-cost material. Materials used for a disposable portion include, for example, paper, pulp, polycarbonate resins, polypropylene resins, polyolefin resins, polypropylene resins with fillers, polysulfone resins, non-crystalline polyester sheets, polyolefin-based resins with inorganic fillers (for example, Lifewel sheet (registered trademark) available from Zeon Kasei Co., Ltd.). A disposable portion should not be environmentally harmful when processed; for example, a disposable portion should not generate toxic gas when burned. Therefore, a chlorine-free material may be used. Such materials include, for example, paper, pulp, polyolefin-based resins (e.g., polypropylene, polyethylene, etc.), non-crystalline polyesters, polyolefin-based resins with inorganic fillers (for example, Lifewel sheet (registered trademark) is preferable), and polyolefin resins with inorganic fillers (calcium carbonate, talc, etc.). When a sufficient strength and water-resistance are desired, usable disposable materials include, for example, Lifewel sheet (registered trademark).

As used herein, the terms "regeneratable" and "recyclable", when used for an internal tray, refer to that the internal tray can be regenerated to have a predetermined degree of cleanliness after being used at least once. Recyclable materials for the internal tray include, for example, materials which can withstand the steps of sterilization, washing, drying, and the like.

As used herein, the terms "regenerate" and "recycle", when used for an internal tray, refer to changing an internal tray, after once used at least once, into an internal tray having a predetermined degree of cleanliness (for example, by washing).

As used herein, the term "biodegradability", when used for a material, refers to that the material is degraded into a small unit by a biological agent such as microorganisms or the like.

Biodegradable materials include but are not limited to, polylactic acids, polyhydroxy butyrate, polyhydroxy alkanoate, polypeptides, polysaccharides, nucleic acids, PGA, PLGA, polybutyrate, malic acid copolymers, lactide-caprolactone copolymers, poly-ε-caprolactone, poly-β-hydroxycarboxylic acid, polydioxanone, poly-1,4-dioxepane-7-on, glycolide-trimethylenecarbonate copolymers, polysebacic anhydride, poly-ω-(carboxyphenoxy)alkylcarboxylic anhydride, poly-1,3-dioxane-2-on, polydepsipeptides, poly-α-ethyl cyanoacrylate, polyphosphazene, and hydroxyl apatite.

As used herein, the term "housing" refers to a box having a sufficient space for accommodating an animal to be bred. A housing may be formed of one portion, or two or more portions (for example, a tray and a lid). In this specification, a housing may also be referred to as a "cage". A housing has a function of isolating the internal space from an external environment.

As used herein, the term "tray" refers to an article acting as a container. A tray may have any shape as long as it provides a space for accommodating an animal. A tray may be formed of any material as long as it provides a space for accommodating an animal.

As used herein, when two layers of trays are used, the outer tray is referred to as an "external tray" and the inner tray is referred to as an "internal tray". In one embodiment of the present invention, either one of an "external tray" or an "internal tray" may be used. In such a case, the terms "external tray" and "internal tray" are interchangeably used.

As used herein, the terms "water absorbability" and "water-absorbent" refer to an ability of sufficiently absorbing moisture in the excrement of the animal. For example, when a portion or a material has water absorbability, the portion or the material has an ability of absorbing moisture contained in excrement discharged by the animal over a day, usually over a week, and preferably over 2 weeks.

As used herein, the term "sterilizable", when used for a portion or a material, refers to a property that the portion or the material can withstand a sterilization treatment performed for routine animal experiments. Sterilization may be performed by, for example, autoclave, dry heat sterilization, pharmaceutical drug sterilization (e.g., sterilization with formalin gas, ozone gas, etc.), or radiation sterilization (γ irradiation, etc.). Such sterilization may be performed by, for example, autoclave at 121° C. and 15 psi for 20 minutes; dry heat sterilization at 250° C. for 2 hours; or γ irradiation sterilization. Sterilization of an article (for example, an internal tray) before use is preferably performed by γ irradiation. Sterilization of a used article may be performed using any method on principle, for example, dry heat sterilization or autoclave. Accordingly, when a portion or a material is described as sterilizable in this specification, this means that the portion or the material is resistant against at least one sterilization method.

As used herein, the term "mesh cover" refers to a mesh cover located on top of a tray (for example, an internal tray, an external tray, etc.). The mesh cover is used when a filter is attached to an external tray or a stepped portion for transporting an animal, for the purpose of protecting the filter against the animal. The mesh cover is usually formed of a fine particle resin or metal.

As used herein, the "means for producing an internal tray" or "internal tray production device" may be anything which can produce an internal tray. Such means or production device includes means for molding the internal tray. Such means or production device uses, for example, a technique of pressing the material used for producing the internal tray while heating the material. Such means or production device is, for example, a general-purpose vacuum molding device including a both-sided far infrared heating device and an air pressure cylinder-driven molding pressing device, but is not limited to these.

As used herein, the "means for regenerating an internal tray" or "internal tray regeneration device" may be anything which can recycle an internal tray. Such means or regeneration device may have an ability of, for example, washing, drying and sterilizing.

As used herein, the "means for transporting" an internal tray encompasses any means which can transport an internal tray. Such means includes, but is not limited to, an automobile, a bicycle and the like. Such means preferably comprises an environment maintaining device, but the environment maintaining device is not absolutely necessary. When such means does not have a predetermined degree of cleanliness, such means for transporting an internal tray preferably includes a container or a portion capable of maintaining the internal tray as having the predetermined degree of cleanliness, and optionally an environment maintaining device for maintaining the predetermined degree of cleanliness. Alternatively, an internal tray having the predetermined degree of cleanliness may be packaged in a container having the predetermined degree of cleanliness (for example, a cardboard box) and the container may be transported by transportation means. The environment maintaining device is especially necessary when the internal tray is transported as an animal breeding unit. Usually, the internal tray is transported without animals, in which case the environment maintaining device is not necessary. Preferably, the means for transporting is constructed so as to isolate the inside of the means from an external environment. More preferably, the means for transporting is constructed so as to keep the airtightness of the inside of the means with respect of the external environment.

As used herein, the term "filter" refers to a filter which does not allow dust or microorganisms to pass therethrough and allows only a gas to pass therethrough. Such filters include, but are not limited to, a HEPA (High Efficiency Particulate Air) filter, a semi-HEPA filter, an ULPA (Ultra Low Penetration Air) filter, a PTFE (polytetrafluoroethylene) filter, a rough dust filter, a middle- or high-performance filter, a high ventilation dust removing filter (EP series available from Mitsubishi Paper Mills Limited), and a Profile (registered trademark) filter (Pall). Preferable filters may include a high ventilation dust removing filter, a HEPA filter, and an ULPA filter. Usable materials for the filter may include cellulose fiber, rock wool, and stainless steel, but glass wool is preferably usable for the reasons of fire resistance, moisture absorbability, carcinogenicity and the like. A HEPA filter may be of a separator type or a non-separator type. When desired, an ULPA filter is usable as the filter. A HEPA filter usually can remove particles having a grain size of 0.2 to 0.3 μm, whereas an ULPA filter can capture particles having a grain size of as small as 0.1 μm or less. Preferably, the filter has a function of maintaining the sterilized state.

As used herein, the term "bedding (material)" refers to a floor used in the art, and usable bedding materials include sawdust, newspaper, pulp, paper strips and the like. The bedding is not indispensable for the present invention, but is preferably used. It is preferable to use the bedding especially for small animals. In the present invention, it is preferable to put a water-absorbent bedding in a water-resistant internal tray.

As used herein, the term "rack" refers to a rack which can accommodate an animal breeding unit used in the present invention. The rack may have any shape and may be formed of any material as long as it can accommodate the animal breeding unit. Preferably, the rack includes a sterilization circuit. Preferably, the rack includes a deodorization device.

In the group airtight breeding manner, the rack is optionally kept airtight and is connected to an environment maintaining device.

As used herein, the term "automatic illumination" refers to an illumination device capable of automatically providing a natural illumination environment (for example, providing the same illuminance as that of sunlight) or an artificial illumination environment. The automatic illumination includes a control section for setting desirable conditions. The automatic illumination may be attached to a rack.

As used herein, the term "internal lid" refers to a lid used inside an animal breeding unit such as for an internal tray. The internal lid is usually formed of stainless steel, but is not limited to this. The internal lid usually has a structure of preventing an animal from escaping (for example, a mesh-like structure). Usually, the internal lid has a structure for holding feed and/or a water supply bottle. In this specification, the internal lid is also referred to simply as a "mesh". The interval of lattices of the internal lid is usually about 5 to 8 mm.

As used herein, the terms "brim surface" and "brim", when used for a container such as a tray, refer to a portion provided around the perimeter thereof like a brim of a hat. The brim surface may have a stepped portion. By providing the stepped portion to the brim surface, dust can be prevented from scattering from the tray by the movement of an animal accommodated in the tray. The brim surface is assumed as a surface for providing close adhesion between the tray and an airtight cover. The brim surface also has a function of allowing another component such as a filter or an internal lid to be provided thereon easily. The brim surface may have any structure as long as it can prevent dust from scattering. Instead of the brim surface, portable metal fittings may be detachably attached.

The expression "the internal tray prevents an animal from contacting the external tray" and similar expressions refer to that the internal tray has a structure by which the animal accommodated in the internal tray cannot contact the external tray in whichever manner the animal may move. Such a structure may be realized by, for example, the internal tray having a height equal to or greater than the height of the external tray, or by the internal tray having a height which is lower than the height of the external tray but is higher than the height at which the animal can move.

In this specification, the "external tray" and the "internal tray" may be formed of any material. Such materials include, but are not limited to, metals (e.g., aluminum, stainless steel, etc.), plastics (e.g., polypropylene, etc.), pulp, and a mixture of pulp and another material. It is preferable to use, for example, polypropylene or non-polypropylene-based less polluting resins from the viewpoint of environmental problems. When used as a disposable member, the internal tray is formed of a material selected from the group consisting of paper, pulp, polyolefin-based-resins (e.g., polypropylene, polyethylene, etc.), non-crystalline polyesters, polyolefins with inorganic fillers (calcium carbonate, talc, etc.), mixtures of pulp and another material, and less polluting resins (Lifewel sheet (registered trademark), etc.). Preferably, the material of the tray is sterilizable. In another example, the material of the tray is recyclable. Alternatively, the material of the tray may be biodegradable.

As used herein, the term "portable" refers to that a person performing an experiment can carry the "portable" member. Accordingly, a portable system may be temporarily attached to a facility but should not be fixedly attached to an immovable facility (building, etc.). A portable animal breeding unit or animal breeding system may usually have a total weight of about 3 kgs. or less, and preferably have a total weight of about 2 kgs. or less.

In this specification, the term "facility for an experiment" may be anything in which a predetermined experiment can be performed. Examples of such a facility include, but are not limited to, a usual experimental facility, P1, P2, P3 and P4 level experimental facilities in which a safety cabinet, a clean bench, an autoclave, or the like is provided. Here, a usual experimental facility refers to an experimental facility which is not treated with isolation or sealing (for example, an open experimental facility).

As used herein, the terms "gene modification" and "gene recombination" are interchangeably used and refer to an operation of artificially changing a naturally existing gene, or an experiment including such an operation. For example, a "gene modification" encompasses a "recombinant DNA experiment" defined in the "Recombinant DNA Experiment Guidelines" established by the Ministry of Education, Culture, Sports, Science and Technology) in 2002. The recombinant DNA experiment includes an experiment coming under one of the following (excluding an experiment of creating a viable cell having an equivalent gene structure to that of a viable cell existing in nature, and an experiment using the same).

(1) An experiment of introducing a recombinant DNA molecule into a viable cell and thus replicating a heterologous DNA, and an experiment of using a viable cell created by such an experiment or an individual generated from such a viable cell; and (2) An experiment of directly introducing a heterologous DNA obtained by removing a vector from a recombinant DNA molecule or a DNA having equivalent gene information thereto into a viable cell and thus replicating a heterologous DNA, and an experiment of using a viable cell created by such an experiment or an individual generated from such a viable cell.

As used herein, the term "infection experiment" refers to an experiment using an infectious agent such as a microorganism, a virus or the like. Such an infection experiment is also strictly regulated. It is preferable that countermeasures against emergencies such as fires, earthquakes, in-house infections, outside infections, and the like are described in compliance with the conditions defined by the WHO, "Laboratory Biosafety Manual" (1993), WHO, "Safety in Healthcare Laboratories" (1997), and other domestic and international regulations. When using a system according to the present invention, it is preferable that the experimental environment is adapted for infection experiments.

When performing an infection experiment or a recombinant experiment, a safety cabinet is installed in a laboratory. As used herein, the term "safety cabinet" is a box-shaped simple facility for handling experimental materials and the like. Safety cabinets are classified into classes 1 through 3 in accordance with the degree of danger of the materials used, etc. Among these classes, class 2 is most often used. In a class 2 safety cabinet, the air which has flown into the cabinet is passed through a filter (a high performance filter having a capability of capturing microorganisms; referred to as a "HEPA filter"; usually having a capability of capturing 99.97% or more of 0.3 µm diameter particles, which are considered to be most difficult to be captured (a filter actually mounted captures 99.99% or more of such particles)), and then a part of the air is discharged and the rest of the air is circulated again through the filter.

Furthermore, an air curtain is provided (a curtain is formed of a flow of air so as to shield the internal air from the external air) for a surface of the safety cabinet on which an operator puts his/her hands to handle the materials and the like. In this manner, the operator is shielded from the internal air which is contaminated or has a possibility of being contaminated. This improves the safety of the operator, and allows the air which has contacted the experimental materials to be filtered and then discharged.

In general, class 2 safety cabinets described above are used for P3 or lower level experiments. For P4 level experiments, class 3 safety cabinets are used. With a class 1 safety cabinet, clean air is not supplied to a work area and the air flows inward through an opening of a front surface. Thus, the safety of the operator is guaranteed.

A class 3 safety cabinet (usually also called as a "glove box") has a structure with which the operator works wearing gloves. This class of safety cabinet has no opening and has a negative inner pressure. Therefore, even if the sealed state is destroyed, the safety can be guaranteed.

A class 3 safety cabinet, which is used in a P4 level laboratory, is a completely sealed box and is provided with thick rubber gloves. The operator can thus handle the materials without contacting the internal air.

Instead of a safety cabinet, a clean bench can be used in accordance with the situation. A clean bench has a similar structure to that of a safety cabinet, except that the contaminated aerosols are blown toward the operator through an opening on a front surface.

Conditions required for P1 level operations are, for example, as follows.

A Basic Operations

A1 The door is closed during the work. Entrance to the room can be restricted during the work.

A2 The work table is cleaned every day. The work table is cleaned whenever contaminated with a pathogen or the like.

A3 Liquid and other contaminated wastes are decontaminated before being disposed or recycled.

A4 When using a pipette operating device, use of the mouth is prohibited.

A5 A work area and other areas (document preparation area) can be provided in the same room. However, it is prohibited to eat, drink, smoke, store food, and put on makeup in the room.

A6 After the work, hands are washed before leaving the room.

A7 Care is taken in order to minimize generation of contaminated aerosols.

A8 It is recommended to wear a working outfit. The working outfit should not be worn outside the work area.

B Specific Operations

B1 When carrying a contaminated substance outside the work room, the contaminated substance is contained in a firm and leak-free container and covered with a lid before leaving the room.

B2 In the case where perishable wastes are not disposed immediately, a freezer for storage is installed.

B3 Anti-insect and anti-rat/mouse treatments are performed.

C Devices: Only Pipette Operation Devices

D Work Room

D1 Installation and arrangement are done to be easy to clean. A joint-free flooring material is used. Connected portions between the walls, the floor and the ceiling are rounded.

D2 The surface of the work table should be resistant against water, acid, alkali, organic solvents, and medium-degree heat.

D3 Furniture is preferably firm and easy to clean.

D4 A washing basin (a washing sink) is installed.

D5 An anti-insect net is installed for a work room having an openable window.

D6 An autoclave is installed in the same building.

Conditions required for P2 level operations are, for example, as follows.

P2 level operations are applied to pathogens and the like having medium-degree pathogenicity. Accordingly, P2 level operations require the following in addition to the conditions required for the work room for the P1 level operations.

(1) An operator receives necessary education and training in advance and works under the supervision of a person having sufficient microbiological knowledge; (2) During the work, admission of a person other than the staff involved in the work is prohibited; and (3) For work which can easily generate contaminated aerosols, a cabinet is used. Other work can be performed on a table.

A Basic Operations

The following is observed in addition to those for the P1 level operations.

During the work, admission of a person other than the staff involved in the work is prohibited. The work table is covered with a table cover lined with polyethylene or the like to facilitate cleaning, and generation of contaminated aerosols is minimized.

B Specific Operations

The following is observed in addition to those for the P1 level operations.

B4 During the work, admission to the room requires permission by a responsible person. Children, pregnant women, and immunodeficient people should avoid entering the room due to the high risk. The responsible person has an overall responsibility for determining who can enter the room and when. Only those satisfying the requirements can be permitted to enter the room. The responsible person shows the requirements for, and the method of, entering the room in writing.

B5 A work room or the like in which pathogens or the like are present is provided with a biohazard mark which is common worldwide. The mark bears the name of the responsible person, the name of the pathogen, the requirements for entering the room, and the like. Containers and equipment which contain, or have a high possibility of containing, pathogens or the like are also provided with the biohazard mark.

B6 The operator wears a working outfit, and should not go outside the work area wearing the working outfit.

B7 Animals which are not directly related to the work cannot enter the work room.

B8 The operator wears gloves when handling pathogens or the like, or infected animals.

B9 All the work wastes are decontaminated before being disposed.

C Devices

C1 A class 1 or 2 safety cabinet is installed and used for operations having a high possibility of generating infectious aerosols. Such operations include centrifugation, grinding, crushing, intense shaking/mixing, ultrasonic processing, opening the lid of a pipette-operable pressurized/vacuum container, inoculation inside the nasal cavity, and sampling from animals or eggs.

C2 A centrifuge in which a rotor or a bucket has a safety lid and the lid is opened/closed in the cabinet can be installed in the work room.

D Work Room

The following is observed in addition to those for the P1 level operations.

D1 Connected portions are joint-free. A washing basin (a washing sink) for a surgery room is installed.

Accordingly, an animal breeding unit or an animal breeding system according to the present invention can be used for P1 and P2 level operations. The forms of use are as follows, for example.

(1) Maintenance and propagation of the usual small animals with no routine gene recombination;

(2) Maintenance and propagation of the usual small animals which have been subjected to gene recombination and established as a lineage;

(3) Cleaning of the small animals described in (1) and (2);

(4) Routine animal experiments on the small animals described in (1) and (2) which do not accompany gene recombination or infection experiments;

(5) Gene introduction experiments on the small animals described in (1) and (2) permitted at the P1 and P2 levels;

(6) Infection experiments on the small animals described in (1) and (2) permitted at the P1 and P2 levels; and (7) Chemical substance exposure experiments on the small animals described in (1) and (2) permitted at the P1 and P2 levels.

Conditions required for P3 level operations are, for example, as follows.

P3 level operations are applied to very dangerous pathogens. Accordingly, the following condition are required. (1) An operator receives sufficient education and training and works under the supervision of a scientist having sufficient knowledge and experience for guaranteeing safety; (2) Admission to the room is prohibited without permission of a responsible person; (3) All the work is performed in the cabinet or a device equipped against biohazard; and (4) The work room requires a special structure and equipment.

A Basic Operations

The conditions are in accordance with those of the P2 level operations.

B Specific Operations

The following is observed in addition to those for the P2 level operations.

B1 Nobody except for the staff required for the work can enter the room. Who should be permitted to enter the room is determined by a responsible person on an individual basis with his/her authority. The responsible person informs the person entering the room of the presence of danger, teaches that only those satisfying the requirements can enter the room, and confirms that the person entering the room will follow all the necessary procedures when entering and exiting the room. Open operations handling living pathogens or the like are all performed in a cabinet or a device equipped against biohazard which is equivalent to the cabinet. Open operations must not performed on a table.

B2 No working outfit with front buttons is used.

B3 The operator does not go outside the room wearing the working outfit. Before putting the working outfit outside the room, the working outfit is decontaminated before being washed.

B4 Gloves are used. The gloves are taken off whenever a sterilization operation is finished and disposed as contaminated wastes.

B5 When performing an operation handling an infected animal, the operator uses a nonwoven mask.

B6 Animals or plants which are not directly related to the work cannot enter the work room.

B7 Wastes which are to be put outside the room are all decontaminated before being disposed or recycled.

B8 A vacuum tube or the like is provided with a HEPA filter and a liquid reservoir.

B9 Use of an injection needle is avoided as much as possible except for injection and blood sampling. When used, the injection needle is put into a firm container after use before being detached. Before disposed, the injection needle is decontaminated.

B10 When operations of different P levels are concurrently performed, the conditions are conformed to those of the operation of the highest P level.

B11 A serum reaction using an antigen from which the infectiousness has been lost can be performed on a table.

B12 When accidents causing infection (accidents having a possibility of causing infection) such as spilling or other accidents occur, these accidents are informed to the responsible person. The responsible person records the accident and takes appropriate steps. The responsible person prepares appropriate medical prevention, monitoring and treatment arrangements.

B13 A blood test of an operator is periodically performed (before working, after working) and the blood is stored.

B14 A manual describing the possibility of disasters caused by the work and requirements against biohazard is prepared. The operator thoroughly reads it and follows the instructions thereof.

C Devices

C1 All the work handling living pathogens is performed using a safety cabinet, a sealed device or the like which is equivalent to the safety cabinet.

C2 Even a P3 level operation can be performed in a P2 level work room as long as it satisfies the following three conditions.

(1) All the work is performed in a class 3 safety cabinet.

(2) Anything which is to be removed from a class 3 safety cabinet is removed through an attached autoclave, or put into in a firm sealed container and removed through an immersion tank having a sterilizer therein.

(3) The P3 requirements are satisfied in all the other aspects.

D Work Room

The following is observed in addition to those for the P2 level operations.

D1 The work room is isolated from general passages by any of the following means: (1) door/changing-room+shower/door; (2) air lock; and (3) door/passage/door. In any case, countermeasures to the passage of insects are provided.

D2 The floor, the walls, and the ceiling should be water-resistant and have an easy-to-clean structure. The gaps therebetween and through-holes are sealed or have an easy-to-seal structure (the inside of the room has a negative pressure by air-conditioning).

D3 A wash basin operable by an elbow, leg or foot is installed near the exit.

D4 Windows are closed and sealed.

D5 A door to the P3 work area is automatically closable and lockable. A door check is provided such that the door does not stay open. Thus, most of the electric doors are in appropriate in terms of the degree of sealing. A screw-type door knob has a good degree of sealing but care needs to be taken since more and more people tend not to close the door with such a type of door knob.

D6 In addition to an autoclave being provided in the same building, an autoclave for decontamination is desirably in the same work room.

D7 An air discharge system of lowing the air into the room is used. The discharged air can be taken to a common air discharge path of the building as long as the discharged air is not recycled in other areas. The discharged air can be recycled in the work room. The room air other than the air inside the cabinet can be directly discharged without being treated. The air discharged from the discharge opening is designed to be diluted by the ambient air.

D8 In a work room having air discharge equipment, the air supply operation and the air discharge operation are performed in association with each other, such that an air flow toward the work room is certainly obtained (the air flow stops when the air discharge equipment is stopped).

D9 The air in classes 1 and 2 cabinets is discharged to (1) directly to the ambient air, (2) to an air discharge system of the building, or (3) within the work room. When the air is discharged to the air discharge system of the building, no interaction should occur between the cabinet and another cabinet or between the cabinet and the air discharge system of the building.

Accordingly, an animal breeding unit or an animal breeding system according to the present invention can be used for the P3 level operations. The forms of use are as follows, for example.

The following experiments on small animals with no routine gene recombination, and small animals subjected to gene recombination and established as a lineage, both maintained and propagated at the P1 and P2 levels:

(1) Gene introduction experiments on the small animals permitted at the P3 level;

(2) Infection experiments on the small animals described permitted at the P3 level; and (3) Chemical substance exposure experiments on the small animals permitted at the P3 level.

Conditions required for P4 level operations are, for example, as follows.

P4 level operations are applied to handling of very dangerous pathogens or pathogens which are not present in Japan. Accordingly, the operator must have full knowledge of (1) pathogens and actions thereof, (2) work basics and techniques at the P4 level, and (3) characteristics and functions of a P4 work room.

The operator works under the supervision of a responsible person having knowledge of all of the above. Entrance to and exit from the P4 work area are strictly restricted. A full manual for each area is created and the regulations therein are observed.

A Basic Operations

The following is observed in addition to those of the P3 level operations.

A1 Care is taken in order to minimize generation of contaminated aerosols.

B Specific Operations

The following is observed in addition to the specific operations of the P3 level.

B1 Biologically active substances are located in a class 3 safety cabinet. When these substances are taken out of the P4 work area, the substances are put in firm primary and secondary containers and carried out through an immersion tank having a sterilizer, an atomized sterilization box or the like.

B2 Samples other than those having an intended biological activity are all decontaminated by means of an autoclave or the like before being taken out from the P4 work area.

B3 Only those directly involved in the work of the P4 work area or in each work room are permitted to enter the room. (1) Nobody except for the staff required for the work can enter the room. Who should be permitted to enter the room is determined by a responsible person on an individual basis with his/her authority. (2) The responsible person informs the person entering the room of the presence of danger, teaches that only those satisfying the requirements can enter the room, and confirms that the person entering the room will follow all the necessary procedures when entering and exiting the room.

B4 When entering the P4 work area, the person takes off everything including underwear and socks.

B5 Before exiting from the P4 work area, the person takes a shower and changes clothes. When exiting the room, the working outfit and the like are left in the shower room. An air lock is not used except for an emergency.

B6 A work room or the like in which pathogens or the like are present is provided with a biohazard mark which is common worldwide. The mark bears the name of the responsible person, the name of the pathogen, the requirements for entering the room, and the like. Containers and equipment which contain, or have a high possibility of containing, pathogens or the like are also provided with the biohazard mark.

B7 Articles are put into the room or taken out from the room through a double-door autoclave, an atomization box or an air lock. The two doors must not be open at the same time.

B8 When accidents causing infection (accidents having a possibility of causing infection) such as spilling or other accidents occur, these accidents are informed to the responsible person. The responsible person records the accident and takes appropriate steps. The responsible person prepares appropriate medical prevention, monitoring and treatment arrangements.

C Devices

C1 All the work is performed in a class 3 safety cabinet. Exception 1 is that when a positive pressure outfit which covers the entire body is used, a class 1 or 2 safety cabinet is usable. Exception 2 is that when an effective vaccine is available, the operator inoculated with the vaccine can work in a class 1 or 2 safety cabinet without wearing a positive pressure outfit.

D Special Operations for a P4 Work Area

D1 A P4 work area is an independent housing or a part of a building which is clearly distinguished. Changing rooms (for outdoor outfits and working outfits) are installed on both sides of a shower room. For putting articles into and taking articles out from the room, a double-door autoclave, an atomization box, an air lock or the like is provided.

D2 The inside of the work room is completely sealed. When providing a waste water outlet in the floor, the waste water outlet is provided with a trap having a sterilizer and is directly connected to a waste treatment tank. Air supply and discharge devices are provided with a HEPA filter.

D3 On the inner surface of the work room, devices and equipment, a horizontal top surface on which dust is accumulated is avoided as much as possible.

D4 The surface of a work table is joint-free, and is resistant against water, acid, alkali, organic solvents, and medium-degree heat.

D5 The furniture is firm and easy to clean.

D6 A wash basin operable by an elbow, leg or foot is installed near the exit.

D7 When installing a vacuum line, (1) a HEPA filter is provided as close as possible to each faucet, (2) an independent system of the P4 work area is formed, and (3) the HEPA filter is decontaminated without any other processing. Pipes for liquids and gases are designed to prevent backflow.

D8 A faucet for drinking water is operable with a foot, and is not provided in the work room. The pipes are independent. Even when provided with a backflow preventing device, the pipes must not be connected to another water supply pipe.

D9 A door to the P4 work area is automatically closable and lockable.

D10 Windows are sealed and not broken.

D11 The outer door of a double-door autoclave is only openable after the sterilization is finished.

D12 A passage-type immersion tank or an atomization box is provided. They are used only for taking out substances which cannot be autoclaved from the P4 work area.

D13 Waste water from the sink, the cabinet, the floor and the autoclave of the workroom is all heat-treated. The waste water from the shower room and the lavatory is chemically treated or heat-treated. The effectiveness of the heat treatment and chemical treatment is monitored by a biological or a physical method.

D14 Air supply and discharge systems are independent from that of the other rooms and the like. The air flow is directed from the outside toward an area which is considered to be most dangerous. The atmospheric pressure difference between rooms is measured by a manometer, and an alarm is output when abnormality is found. The air supply and discharge systems operate in association with each other, such that an air flow toward the work room is certainly obtained.

D15 The air filtered with a HEPA filter can be recycled in the room.

D16 The air discharged from the P4 work area is filtered with a HEPA filter. The HEPA filter can be decontaminated in the filter box, and is located at a position at which the area of the contaminated duct is minimum. In order to deal with backflow which can accidentally occur, the air supply system is provided with a HEPA filter.

D17 The air from a class 1 or 2 safety cabinet is discharged to the inside of the work room or to the external environment through an air discharge system of the work room. The air discharged from a P3 safety cabinet is directly discharged without being recycled, or is discharged to the work room through an air discharge system. When discharging the air to the work room, it is confirmed that no interference occurs between the cabinet and another cabinet or between the cabinet and the work room.

D18 A so-called "space suit" work room is completely sealed, and the air discharged from this work room is treated with a double HEPA filter. The space suit can be treated with a chemical shower and decontaminated while it is worn by the operator. Backup systems regarding electricity, air and the like are completely provided.

Accordingly, an animal breeding unit or an animal breeding system according to the present invention can be used for P4 level operations. The forms of use are as follows, for example.

The following experiments on small animals with no routine gene recombination, and small animals subjected to gene recombination and established as a lineage, both maintained and propagated at the P1 and P2 levels:

(1) Gene introduction experiments on the small animals permitted at the P4 level;

(2) Infection experiments on the small animals permitted at the P4 level; and (3) Chemical substance exposure experiments on the small animals permitted at the P4 level.

BEST MODE FOR CARRYING OUT THE INVENTION

The present invention, in one aspect thereof, provides a system for maintaining an animal breeding environment. The system comprises A) an animal breeding unit; B) means for providing an internal tray having a predetermined degree of cleanliness; C) an internal tray exchange unit; and D) means for recovering the exchanged internal tray (see FIG. 1 as one embodiment).

The animal breeding unit used in the system of the present invention is capable of comprising an internal tray having a sufficient space for breeding an animal of interest, comprises an external tray capable of accommodating the internal tray, and has a structure capable of keeping a predetermined degree of cleanliness. The internal tray may have any shape and/or size as long as it is capable of breeding the animal of interest. The external tray may have any shape and/or size as long as it has a function of isolating the inside of the animal breeding unit from an external environment. The external tray may preferably have a shape suitable to the internal tray. The predetermined degree of cleanliness of the animal breeding unit can be maintained by techniques well known in the art. An example of such techniques is attaching an openable/closable valve, but is not limited to this.

The internal tray exchange unit used in the system of the present invention is capable of accommodating the animal breeding unit and exchanging the internal tray while keeping the predetermined degree of cleanliness in the facility. The internal tray exchange unit may have any shape and/or size as long as it has the above-described features. Preferably, the internal tray exchange unit has such a shape and size which is sufficient for a person or a device exchanging the internal tray to perform the exchange.

The means for recovering the exchanged internal tray used in the present invention may be any means as long as it is capable of disposing the internal tray aseptically. Accordingly, such recovering means encompasses, but is not limited to, means for storing a contaminated internal tray, means for burning a contaminated internal tray, means for sterilizing a contaminated internal tray, and the like. Each of such means is well known in the art, and those skilled in the art can appropriately select such means.

In a preferable embodiment, the present invention may further comprise means for transporting the internal tray to the internal tray exchange unit. Such transporting means is especially useful in the case where the means for providing the internal tray is far away from the site at which the animal is to be bred. Such transporting means may be any means as long as it is capable of maintaining the internal tray at a predetermined degree of cleanliness. Preferably, such transporting means may be, for example, an automobile (e.g., a transportation truck, etc.), but is not limited to this. Such an automobile usually comprises means for maintaining a predetermined degree of cleanliness. Such means for maintaining the predetermined degree of cleanliness is, for example, an air-conditioner, but is not limited to this.

In a preferable embodiment, the system of the present invention may further comprise an environment maintaining device for maintaining the environment of the animal breeding unit. Separately comprising such an environment maintaining device is advantageous to perform an experiment using an independent isolation type system of the present invention. Such an environment maintaining device may be anything as long as it is capable of maintaining a desired environment in the animal breeding unit. Such an environment maintaining device may be, for example, a device described in another section of this specification, but is not limited to this.

The means for providing the internal tray used in the system of the present invention may comprise means for producing the internal tray. The means for producing the internal tray may have any shape as long as it is constructed to produce a desired internal tray. Such shapes are well known in the art. Such means or a production device comprises means for molding the internal tray. Such means for producing the internal tray may be, for example, a method of pressing a material used for producing the internal tray while heating the material. A specific example is a general-purpose vacuum molding device including a both-sided far infrared heating device and an air pressure cylinder-driven molding pressing device, but is not limited to this.

In another embodiment, the system of the present invention may further comprise means for disposing the exchanged internal tray. Herein, the disposition of the internal tray refers to a treatment which is performed such that contamination of the internal tray does not expand to an area around the internal tray. Such a treatment of the internal tray encompasses, but is not limited to, enclosure (isolation from the outside), burning, denaturing with a chemical agent, washing, sterilization and the like. In one preferable embodiment, a recyclable internal tray may be provided by such a treatment.

Alternatively, the system of the present invention may further comprise means for regenerating the exchanged internal tray. Such means for regenerating the internal tray varies with the material of the internal tray. Those skilled in the art can select appropriate means for regenerating the internal tray. Such regenerating means may comprise, for example, washing means, drying means, sterilization means, and coating means with a coating material (e.g., a water-resistant substance, etc.).

In one preferable embodiment, the means for providing the internal tray may comprise means for regenerating the exchanged internal tray as described above. Alternatively, the means for providing the internal tray itself may also act as the means for regenerating the exchanged internal tray.

In one embodiment, the predetermined degree of cleanliness which should be maintained in the system of the present invention may be a degree at which nothing is contained which provides an undesirable influence for a purpose of using the animal. Such uses of the animal encompass, for example, infection experiments, gene recombination experiments, and routine experiments, but are not limited to these. Accordingly, when performing an infection experiment, the predetermined degree of cleanliness means a degree at which the pathogens (infectious agents) of interest are not contained. Here, other pathogens may or may not be contained. The predetermined degree of cleanliness refers to a degree at which preferably pathogens for the animal of interest are not contained, and more preferably no pathogens are contained. As used herein, the term "infectious agent" refers to an agent responsible for a disease or disorder, and is interchangeably usable with a pathogen. In the case of a gene recombination experiment, the predetermined degree of cleanliness refers to a degree at which a gene used for the gene recombination or a construct derived from the gene, or an agent which influences the expression of such a gene or construct, is not contained. Accordingly, in the case of a gene recombination experiment, pathogens may or may not be present in order to achieve the predetermined degree of cleanliness. In a preferable embodiment, it may be advantageous that no pathogen is contained.

In a preferable embodiment of the present invention, the internal tray may be disposable. Disposable materials may be biodegradable. Biodegradable materials usable in the present invention include, but are not limited to, polylactic acids, polyhydroxy butyrate, polyhydroxy alkanoate, polypeptides, polysaccharides, nucleic acids, PGA, PLGA, polybutyrate, malic acid copolymers, lactide-caprolactone copolymers, poly-$\epsilon$-caprolactone, poly-$\beta$-hydroxycarboxylic acid, polydioxanone, poly-1,4-dioxepane-7-on, glycolide-trimethylenecarbonate copolymers, polysebacic anhydride, poly-$\omega$-(carboxyphenoxy)alkylcarboxylic anhydride, poly-1,3-dioxane-2-on, polydepsipeptides, poly-$\alpha$-ethyl cyanoacrylate, polyphosphazene, hydroxyl apatite, and the like. In another preferable embodiment, the material of the internal tray may be recyclable. Recyclable materials used in the present invention include, but are not limited to, non-crystalline polyesters.

Preferably, the internal tray used in the system of the present invention may be formed of a material selected from the group consisting of paper, pulp, polyolefin-based resins, non-crystalline polyesters, and mixtures of polyolefin-based resins and inorganic fillers.

In a preferable embodiment, the internal tray having the prescribed degree of cleanliness may be advantageously sterilized. By being sterilized, the internal tray can be advantageously used in an infection experiment or the like. Means for achieving such sterilization encompasses, for example, autoclave, dry heat sterilization, sterilization with a chemical agent (e.g., sterilization with formalin gas, ozone gas, etc.), and radiation sterilization (using $\gamma$ irradiation, etc.). Such sterilization may be performed by, for example, autoclave at 121° C. and 15 psi for 20 minutes; dry heat sterilization at 250° C. for 2 hours; or $\gamma$ irradiation sterilization. Sterilization of an article (for example, an internal tray) before use is preferably performed by $\gamma$ irradiation.

In one embodiment, the means for providing an internal tray used in the system of the present invention preferably comprises means for sterilization.

In another preferable embodiment, the animal breeding unit used in the system of the present invention may comprise means capable of maintaining airtightness. Such means capable of maintaining airtightness may be any means as long as it is capable of maintaining airtightness. With the means capable of maintaining airtightness, a system usable for an infection experiment or the like can be provided.

The system of the present invention may further comprise a container which is capable of accommodating at least one animal breeding unit and which comprises means capable of maintaining airtightness. With such a container being provided, a plurality of animal breeding units can be treated at a time.

In a preferable embodiment, the external tray and the internal tray used in the present invention may independently have a brim surface and/or a stepped portion.

The present invention, in one aspect thereof, provides a device for producing an internal tray used in the system according to the present invention. For such means or production device, a technique of, for example, pressing the material used for producing the internal tray while heating the material is used. A specific example is use of a general-purpose vacuum molding device formed of a both-sided far infrared heating device and an air pressure cylinder-driven molding pressing device, but is not limited to this.

The present invention, in another aspect thereof, provides a method for maintaining an animal breeding environment in an animal breeding unit which comprises an internal tray having a sufficient space for breeding an animal of interest, comprises an external tray capable of accommodating the internal tray, and is capable of keeping a predetermined degree of cleanliness. This method comprises the steps of: A) providing another internal tray having the predetermined degree of cleanliness; B) locating the animal breeding unit in an internal tray exchange unit which is capable of accommodating the animal breeding unit and is capable of keeping the predetermined degree of cleanliness; and C) in the internal tray exchange unit, C-1) removing the used internal tray from the animal breeding unit; C-2) removing the animal of interest from the used internal tray; C-3) attaching another internal tray having the predetermined degree of cleanliness to the animal breeding unit; and C-4) locating the animal of interest in the another internal tray; and D) recovering the used internal tray.

In the method for maintaining an animal breeding environment according to the present invention, the step of providing the another internal tray having the predetermined degree of cleanliness may be carried out by any technique as long as the technique maintains such a predetermined degree of cleanliness of the internal tray. Accordingly, the internal tray may be provided manually or automatically using a machine. Such techniques are well known in the art. For example, a technique of providing such an internal tray in the state of being held in a container capable of maintaining the internal tray at the predetermined degree of cleanliness is used, but the technique is not limited to this. In exemplary embodiments of providing the internal tray, one or more, as appropriate, number of internal trays are stacked in the state of filled with a bedding necessary or appropriate for the animal breeding, or without bedding; packaged in a container capable of maintaining the cleanliness; subjected to sterilization such as γ irradiation or the like; and provided. The appropriate number of internal trays is determined in accordance with the form of use. Thus, the user can be supplied with a necessary number of internal trays in advance. By storing an appropriate number of internal trays, the user can conveniently use a necessary number of internal trays in a clean state. The internal trays can alternatively be provided in a state without sterilization. In this case, the user can perform sterilization or other treatments optionally, and use the internal trays in a form suitable to the purpose of use. The container used for packaging can desirably accommodate the used internal tray with contaminants, can receive sterilization by autoclaving or the like, and can be recovered. In this case, the container is desirably water-resistant. Specifically, such a container may be an equivalent to an autoclave bag, but is not limited to this.

Accordingly, the present invention also provides a container for accommodating the internal tray used in the system of the present invention. The container has a sufficient volume for accommodating the internal tray. The container is preferably sterilizable. Alternatively, the container may be water-resistant. The container is usable for providing an internal tray having a predetermined degree of cleanliness and/or for recovering the exchanged internal tray.

The step for providing the internal tray may optionally comprise the step of producing the internal tray. Such production can be carried out using an internal tray production device described in this specification. In the case where a site at which the internal tray is provided is far away from a site at which the internal tray is exchanged, the step of providing the internal tray may comprise the step of transporting the internal tray. Such transportation of the internal tray can be carried out using the transportation means described in this specification.

The step of locating the animal breeding unit in an internal tray exchange unit capable of accommodating the animal breeding unit and capable of keeping the predetermined degree of cleanliness, which is performed by the method of the present invention, may be carried out using any technique as long as the animal breeding unit can be located in the internal tray exchange unit. Thus, the location of the animal breeding unit may be performed manually or automatically using a machine or the like. Since the animal breeding unit usually has an experimental animal for a predetermined purpose bred therein, it is preferable to use a technique which at least maintains the predetermined degree of cleanliness at which the animal is to be bred. It is preferable to sterilize the animal breeding unit if necessary, but sterilization is not absolutely necessary. In the case where the animal is used for an infection experiment and the pathogen for infection may influence other animals (including humans), it is preferable to locate the animal breeding unit such that the pathogen is not scattered to the outside (especially the outside of the internal tray exchange unit). The internal tray exchange unit may be provided with an environment maintaining device such as a sterilization device or the like optionally.

In one preferable embodiment, another internal tray having the predetermined degree of cleanliness may be sterilized. Methods of such sterilization are well known in the art. An exemplary method is γ irradiation, but the method is not limited to this. In a preferable embodiment, examples of the internal tray exchange unit used in the method of the present invention include, but are not limited to, a clean table for an animal breeding cage, an animal breeding cage exchange station, and an animal breeding cage exchange isolator. Examples of such exchange units encompass, but are not limited to, a clean table for an animal breeding cage commercially available from TONET (a work table having a suction opening in a rear surface thereof, in which scattered dust is absorbed through the opening), Animal Transfer Station commercially available from ACE, and a safety cabinet type exchange unit (Poultry Isolator; commercially available from ACE). Preferably, the internal tray exchange unit may be configured so as to isolate the animal breeding unit from an external environment. Such a configuration is well known in the art. Such a configuration may be adopted in the above preferable embodiment, but is not absolutely necessary. In one preferable embodiment, the internal tray exchange unit is configured to keep airtightness. Here, "to keep airtightness" means to keep the airtightness between the outside and the inside of the facility. By keeping the airtightness, contamination can be prevented in the case where, infection needs to be prevented or genetic contamination needs to be prevented. Techniques for keeping the airtightness are well known in the art, and the airtightness can be achieved using a commercially available facility.

Removal of the used internal tray from the animal breeding unit in the internal exchange unit and removal of an animal of interest from the used internal tray, which are performed by the method of the present invention, can be carried out by techniques which are well known and commonly used in the art. The removal of the internal tray and the removal of the animal can be separately performed, and may be performed manually or automatically using a machine or the like. Here, since the used internal tray often does not have the predetermined degree of cleanliness, it is preferable to locate the used internal tray at a different position from that of another (new) internal tray having the predetermined degree of cleanliness in the internal tray exchange unit. It is preferable to locate another container for accommodating the used internal tray in the internal tray exchange unit, but this is not absolutely necessary.

The mounting of another internal tray having a predetermined degree of cleanliness on the animal breeding unit in an internal tray exchange unit, and the location of an animal of interest in another internal tray having a predetermined degree of cleanliness, which are performed by the present invention, are also carried out using techniques which are well known and commonly used. The mounting of the internal tray and the location of the animal can be independently performed, and may be performed manually or automatically using a machine or the like. The mounting of the internal tray and the location of the animal, and the removal of the internal tray and the removal of the animal, may be performed continuously or separately. In the case of performing them separately, it is necessary to temporarily accommodate the animal. Such temporary accommodation can be carried out by methods well known in the art. In one embodiment, after the internal tray is removed and another internal tray having a predetermined degree of cleanliness is mounted on the animal breeding unit, the animal present in the removed internal tray may be transferred to the another internal tray which has been mounted. In another embodiment, after the animal is transferred to another internal tray having a predetermined degree of cleanliness, the used internal tray may be removed and then another internal tray in which the animal is located may be mounted on the animal breeding unit. Regarding such steps, those skilled in the art can select a technique appropriate to the situation.

The recovery of the used internal tray, which is performed by the method of the present invention, can also be carried out using techniques well known and commonly used in the art. Such recovery may be performed manually or automatically using a machine or the like. In an exemplary embodiment of such recovery of the internal tray, the used internal trays are accommodated together with filth such as excrement or the like in a stacked manner in a sterilizable recovery container or bag in an appropriate cage exchange unit or the like; and the container or bag are sealed such that the filth does not leak outside. The container or bag is optionally sterilized by an autoclave or the like, and then appropriately disposed. The post-sterilization disposal can be performed by a party qualified to conduct waste disposal. The internal tray is stored in a state where the filth does not leak from the internal tray, and may be recovered by appropriate means and disposed by the disposing party. The recovery of the internal tray may include disposal and regeneration of the internal tray. The disposal of the internal tray may encompass burning and pulverization. A method for disposing the internal tray preferably conforms to the regulations defined by the appropriate authority (for example, the Ministry of Education, Culture, Sports, Science and Technology of Japan). Such methods are well known and commonly used in the art. An exemplary method is to burn the internal tray together with the filth, but the method is not limited to this. In a specific embodiment, the internal tray may be regenerated using any technique as long as the internal tray is regenerated so as to be recyclable by the method of the present invention. Such techniques are well known in the art. An exemplary technique is to wash and then sterilize, but the technique is not limited to this.

In a preferable embodiment, a plurality of animal breeding units may be used, and the exchange of the internal trays and animals as described above may be performed while at least two of the plurality of animal breeding units are kept isolated from each other. Techniques for isolating the two plurality of animal breeding units are well known, and any technique is usable as long as the isolation can be maintained. Such isolation is advantageous to prevent the contamination of animals (especially, infection, gene contamination, etc.).

In another preferable embodiment, the plurality of animal breeding units as described above are grouped into a plurality of animal breeding unit groups. The animal breeding unit groups each comprise at least one animal breeding unit. The exchange of the animals and the internal trays as described above can be performed in the state where the animal breeding units in an animal breeding unit group are not isolated from each other, but the animal breeding units are isolated from each other between the plurality of groups. By such exchange, the work can be efficiently conducted while preventing contamination (for example, infection or gene contamination, etc.) in a certain animal group.

The present invention, in still another aspect thereof, relates to use of an internal tray production device for producing an internal tray used in the method or the system of the present invention. Such means or production device comprises means for molding the internal tray. As the internal tray production device, a device known in the art may be used or a device obtained by improving such a known device may be used. For example, a technique of pressing the material used for producing the internal tray while heating the material may be used. Especially, a technique of using a general-purpose vacuum molding device formed of a both-sided far infrared heating device and an air pressure cylinder-driven molding pressing device is usable, but the technique is not limited to this.

The present invention, in another specific aspect thereof, relates to use of an internal tray regeneration device for regenerating an internal tray used in the method or the system of the present invention. As the internal tray regeneration device, a device known in the art may be used or a device obtained by improving such a known device may be used. Examples of such an internal tray regeneration device include a device comprising means capable of washing an internal tray, and a device means capable of sterilizing an internal tray, but are not limited to these.

The present invention, in still another aspect thereof, provides a system for an experiment using an animal. The system comprises A) at least one animal breeding unit, in which the animal breeding unit is isolated from an external environment, the unit being connectable to an environment maintaining device and comprising 1) a housing; and 2) at least one opening, provided on the housing, through which the housing is connectable with the environment maintaining device; B) the environment maintaining device; and C) a facility for the experiment using the animal. Such a system achieves an independent isolation type system. Accordingly, use of such a system allows an intended experiment using an experimental animal (for example, a gene recombination experiment, an injection experiment, etc.) to be conducted in an environment in which a predetermined degree of cleanliness is maintained without providing any specialized facility. As the animal breeding unit, the environment maintaining device, and the experimental facility used here, those described in other sections of this specification can be used. The present invention allows an infection experiment and a gene introduction experiment to be conducted in a regular experimental facility, which was not achieved with prior art. This is a significant effect of the present invention. More and more gene introduction experiments using a virus vector are expected to be performed in the future. In actuality, there is a shortage of facilities which guarantee the safety level of using a vector made from a lentivirus (HIV virus, etc.). Since a large demand for such facilities is expected in the future, such an independent isolation type system will play a significant role in the art.

In one preferable embodiment, the above-described facility for the experiment is usually an experimental facility defined by recombination DNA experiment guidelines or the like, and is optionally selected from the group consisting of P1, P2, P3 and P4 experimental facilities equipped with a safety cabinet, a clean bench, an autoclave or the like.

The present invention, in one aspect thereof, provides an animal breeding unit which is isolated from an external environment and is capable of being connected to an environment maintaining device. The animal breeding unit comprises 1) a housing; and 2) at least one opening, provided on the housing, through which the housing is connectable with the environment maintaining device. The housing needs to be constructed so as to be isolated from the external environment. Preferably, the housing is constructed to keep airtightness. In order to realize such a housing, the housing may be formed of a material selected from the group consisting of polycarbonate resins, polypropylene resins, polyolefin resins, polypropylene resins with fillers, polysulfone resins, and non-crystalline polyesters. The housing does not need to be formed of one material and may be formed of a mixture of two or more materials. Preferably, the housing is formed of polyolefin resins, polysulfone resins and/or non-crystalline polyester sheets. The housing may be formed of one element, or two or more elements (for example, an external tray and a lid). In the case where the housing is formed of one element, an entrance/exit opening needs to be provided through which an animal is placed into, or taken out from the housing.

The environment maintaining device may be of any type as long as it is connectable with the unit. The environment maintaining device may be of a conventional type (e.g., attachable to the facility) or a portable type. When an automobile is used for transportation, an environment maintaining device attached to the automobile (for example, an air-conditioner, a cooling device, etc.) may be used. In the unit, the opening may be a simple circular opening or may be provided with a tube. The opening may be provided with a valve. The opening preferably is constructed to be airtightly connectable with the housing.

In one embodiment, there are two such openings. Either one of the openings may act as a gas supply opening and the other opening may act as a gas discharge opening. By causing the roles of gas supply (air supply) and gas discharge (air discharge) being provided by separate openings, smooth environment maintenance and prevention of contamination can be achieved with more certainty.

In another embodiment, the opening is provided with a valve capable of isolating the animal breeding unit from an external environment when the animal breeding unit is disconnected from the environment maintaining device. Methods for producing such a valve are well known in the art.

In another preferable embodiment, the opening is provided with a valve capable of maintaining the animal breeding unit airtight with respect to an external environment when the animal breeding unit is disconnected from the environment maintaining device. Methods for producing such a valve are well known in the art.

In one embodiment, the environment maintaining device is a device for providing a gas to the animal breeding unit and recovering the gas from the animal breeding unit via the opening. Such an environment maintaining device may have any structure as long as it can recover and provide gas. Accordingly, devices well known in the art are usable as such an environment maintaining device.

To the valve, an easily detachable tube (air supply and discharge hose) is attachable by a push type adaptor. The valve may be provided with a filter having a dust removing effect for smoothing air supply and discharge.

In a preferable embodiment, the housing used in the animal breeding unit of the present invention comprises 1) an external tray; and 2) a lid. For the external tray, structures and materials described above regarding the housing are usable. The external tray has a structure on which a lid can be located. Accordingly, the external tray and the lid are preferably constructed such that contact surfaces thereof adhere to each other. Thus, the external tray is formed of a material selected from the group consisting of polycarbonate-based resins, polycarbonate resins, polypropylene resins, polyolefin resins, polypropylene resins with fillers, polysulfone resins, and non-crystalline polyester sheets. Polyolefin resins, polysulfone resins, and non-crystalline polyester sheets are preferably used, since they are superior in heat resistance and chemical resistance. In this specification, the lid may be an upper lid or a side lid.

In another preferable embodiment, the animal breeding unit of the present invention may further comprise an internal tray inside the external tray. Preferably, the internal tray is disposable.

In one embodiment, the internal tray is water-resistant. Thus, the internal tray is formed of a material selected from the group consisting of paper, pulp, polycarbonate resins, polypropylene resins, polyolefin resins, polypropylene resins with fillers, polysulfone resins, non-crystalline polyester sheets, and polyolefin resins with inorganic fillers (calcium carbonate, talc, etc.) (for example, Lifewel sheet (registered trademark)). Preferably, the internal tray is formed of paper, pulp, polyolefin resins (e.g., polypropylene, polyethylene, etc.), polyolefin resins with inorganic fillers (calcium carbonate, talc, etc.) (for example, Lifewel sheet (registered trademark)), and non-crystalline polyesters.

Preferably, the internal tray is constructed to prevent an animal in the animal breeding unit from contacting the external tray. Accordingly, the internal tray preferably has the same shape as that of the external tray (nestable to the external tray) and has a height equal to or slightly less than that of the external tray.

In a preferable embodiment, the internal tray is sterilizable. Accordingly, the internal tray is formed of a material selected from the group consisting of, for example, paper, pulp, polycarbonate resins, polypropylene resins, polyolefin resins, polypropylene resins with fillers, polysulfone resins, non-crystalline polyesters, and polyolefin resins with inorganic fillers (calcium carbonate, talc, etc.) (for example, Lifewel sheet (registered trademark)). Preferably, the internal tray is formed of a material selected from the group consisting of paper, pulp, polyolefin-based resins (for example, polypropylene, polyethylene, etc.), and polyolefin resins with inorganic fillers (calcium carbonate, talc, etc.) (for example, Lifewel sheet (registered trademark)). More preferably, the internal tray is formed of Lifewel sheet (registered trademark).

Preferably, the animal breeding unit of the present invention may further comprise a packing member provided between the lid and the external tray for reinforcing airtightness. The packing member may be a two-sided tape.

Preferably, the animal breeding unit of the present invention may comprise a mesh cover for transportation. A commercially available mesh cover is usable.

Preferably, the animal breeding unit of the present invention may further comprise an internal lid. The internal lid may be anything as long as it is used for a cage. By the internal lid, the accommodated animal can be prevented from escaping. It is important in one aspect to prevent the animal from escaping, since a bred animal is active and produces excrement. A bred animal is usually kept in a small living space, and generates and scatters the excrement. Even when an internal tray is provided for preventing the animal from escaping, the excrement occasionally scatters over the internal tray to the environment. In order to efficiently prevent the excrement from scattering, the tray has a stepped portion having a height difference from the opening, in addition to be provided with an internal lid (for example, a metal mesh). The internal lid has a structure which can withstand an attack from the animal, and is formed of a material providing a sufficient strength (for example, stainless steel). The brim surface and/or the stepped portion may be provided in the external tray and/or the internal tray. It is preferable to provide the brim surface and/or the stepped portion in both trays. The brim surface may be formed of the same material as that of the tray and continuously formed from the tray, may be bonded to the tray later, or may be formed of a different material from that of the tray.

Preferably, the animal breeding unit of the present invention further comprise a filter. Usable filters include commercially available filters (e.g., Atmosfilter, Polyvent, Vacuguard, etc.) and filters formed of a material selected from the group consisting of a HEPA filter, an ULPA filter, a cellulose filter, a cellulose acetate filter, a nylon filter, a PVDF filter, a PTFE filter, a PP filter, a PES filter, a GF/F filter and filter paper, and a filter formed of a combination thereof. The filter can preferably shield microorganisms (e.g., bacteria, viruses, etc.) from going back and forth therethrough. The filter preferably satisfies the criteria used for gene modification experiments. Accordingly, a HEPA filter or an ULPA filter is preferably used as the filter. Thus, the filter can preferably maintain a sterilized state.

The animal breeding unit of the present invention may further comprise bedding. A generally used bedding material (for example, sawdust, newspaper, pulp chips, paper strips, etc.) can be used. The bedding may preferably be located in the internal tray.

Preferably, the animal breeding unit of the present invention may further comprise a rack. Any conventionally used rack is usable. By using the rack, the transportation of the animal breeding unit of the present invention can be facilitated. Preferably, the rack comprises a sterilization circuit. Preferably, the rack may comprise a deodorization device.

Preferably, the animal breeding unit of the present invention further comprises an automatic illumination device. The automatic illumination device may be anything as long as it can automatically provide a desired illumination environment (for example, usual sunlight, and illumination environments for different seasons). Accordingly, a commercially available automatic illumination device is usable. Such an automatic illumination device preferably comprises a control section for setting a desired condition. For performing an individual experiment, it may be important that the animal breeding unit comprises an automatic illumination device.

The present invention, in still another aspect thereof, provides a two-layer animal breeding unit. The animal breeding unit comprises 1) an external tray and 2) an internal tray. The external tray may have any structure and may be formed of any material as long as it is strong enough to withstand activities of an animal accommodated therein. The external tray may be formed of, for example, a polycarbonate resin. A polycarbonate resin, which is superior in heat resistance and chemical resistance, is preferable as a material of an external tray which is often in contact with an external environment. By the internal tray provided in the animal breeding unit, the work of exchanging the beddings can be alleviated. Preferably, the internal tray is disposable. Accordingly, the internal tray may be formed of a material selected from the group consisting of paper, pulp, polyolefin-based resins (e.g., polypropylene, polyethylene, etc.), and polyolefin resins with inorganic fillers (calcium carbonate, talc, etc.) (for example, Lifewel sheet (registered trademark)).

Preferably, the two-layer animal breeding unit of the present invention further comprises a lid. Preferably, the lid is an upper lid. The lid may have a structure and may be formed of a material described in another section of this specification.

Preferably, the internal tray may be formed of a water-resistant material. An internal tray produced using a water-resistant material can be efficiently treated. Material providing such water resistance include, for example, pulp, mixtures of pulp and other materials, polyolefin-based resins, less polluting resins (e.g., Lifewel sheet (registered trademark)), and non-crystalline polyesters. A material forming the internal tray is also preferably sterilizable. Such materials include, but are not limited to, pulp, mixtures of pulp and other materials, less polluting resins (e.g., Lifewel sheet (registered trademark)), non-crystalline polyesters, and the like.

Preferably, the internal tray may be constructed so as to prevent the animal in the internal tray from contacting the external tray. Owing to such a construction, the external tray can be kept in a clean state. In an exemplary construction, the external tray has a similar shape to that of the internal tray, and the internal tray is as high as, or slightly lower than, the external tray when the internal tray is stacked in the external tray. In order to prevent the animal in the internal tray from contacting the external tray, the internal tray may have a height which is lower than the height of the external tray but exceeds the height to which the animal can move. The internal tray and the external tray do not need to have a similar shape to each other.

Preferably, at least one of the internal tray and the external tray has a brim surface and a stepped portion. The provision of the stepped portion has an effect of, for example, preventing excrement from scattering.

The present invention, in still another aspect thereof, provides a disposable internal tray for use in an animal breeding unit comprising an external tray and the internal tray. By providing the disposable internal tray, intensive labor, such as exchanging the beddings and cleaning the cage, which is conventionally necessary, can be significantly reduced. A preferable disposable material is selected from the group consisting of, for example, paper, pulp, polyolefin resins (for example, polypropylene, polyethylene, etc.), and non-crystalline polyesters, and polyolefin-based resins with inorganic fillers (calcium carbonate, talc, etc.) (for example, Lifewel sheet (registered trademark)). The disposable internal tray is preferably sterilizable. In another preferable embodiment, the disposable internal tray is water-resistant.

Preferably, the disposable internal tray is constructed so as to prevent an animal in the animal breeding unit from contacting the external tray. Such a construction is discussed in detail in another section of this specification.

Preferably, the disposable internal tray comprises a brim surface and a stepped portion. By providing the stepped portion, the excrement can be restricted from scattering, and as a result, the external tray can be kept at a certain level of cleanliness or higher.

The present invention, in still another aspect thereof, provides an animal breeding system comprising an animal breeding unit and an environment maintaining device.

The environment maintaining device used in the present invention comprises a control section for controlling at least one parameter of a gas provided to the animal breeding unit. The at least one parameter is selected from the group consisting of temperature, humidity, oxygen concentration and carbon dioxide concentration. Preferably, the control section adjusts at least the temperature of the gas provided to the animal breeding unit.

Preferably, the animal breeding unit and the environment maintaining device are connectable to each other in an airtight manner. In this case, the animal breeding unit is preferably constructed to be kept airtight.

Preferably, the environment maintaining device is portable. Such environment maintaining devices are well known, and any air supply and discharge device equipped with a HEPA filter is usable. A commercially available device (for example, an air supply and discharge device for a breeding rack available from Allentown Caging Equipment, Co., Inc. (Allentown, N.J., U.S.A.), or Clea Japan, Inc.) may be adapted so as to be suitable to the present invention. Since the animal breeding unit and the environment maintaining device of the present invention are portable, the entire animal breeding system can have a portable structure. It is noted that the environment maintaining device does not need to be always carried around. In a maintaining facility (e.g., a breeding facility), for example, an environment maintaining device attached to the facility can be used. For transportation, an environment maintaining device attached to the transporting automobile can be used. When carrying the animal breeding unit to a laboratory in order to perform an individual experiment after the transportation, it is possible to carry the animal breeding unit together with a portable environment maintaining device. If the animal breeding unit is to be carried a short distance, it can be carried by using passive ventilation through a filter, without such an environment maintaining device.

The present invention, in still another aspect thereof, provides an animal breeding method, comprising the step of breeding an animal using an animal breeding unit or an animal breeding system of the present invention. By using a unit having a feature of independent isolation among the animal breeding units of the present invention, animals can be bred without using a large-scale facility. When a two-layer animal breeding unit is used, animals can be bred without using a large-scale filth processing/recover/recycling (washing) facility. In any case, a large-scale breeding facility, which has been conventionally indispensable for middle- to large-scale research institutes which perform animal experiments frequently and routinely, is not necessary any more. This is a significant effect which could not be achieved with the prior art.

The present invention also provides a method for recycling an animal breeding unit. This recycling method comprises the step of disposing the internal tray and supplementing a new internal tray after breeding an animal using the animal breeding unit of the present invention. Since the internal tray is disposable, a new animal breeding unit can be provided without treating the filth. This effect was not conventionally achieved and is convenient especially for the people working in animal breeding facilities.

The present invention, in still another aspect thereof, provides an infection or recombinant experimental method using an animal, comprising the steps of breeding the animal in an independent isolation type animal breeding unit or animal breeding system of the present invention; and moving the animal breeding unit or animal breeding system to a laboratory which is not kept in a highly desirable state environmentally together with an environment maintaining device, in order to perform an infection or recombinant experiment in the laboratory. Here, the environment maintaining device is preferably small enough to be portable. The environment maintaining device preferably provides an environment which can withstand the danger level of an intended experiment (e.g., P1 level, P2 level, etc.). Use of the system of the present invention has allowed an infection experiment or a gene modification experiment to be performed in a usual P1 or P2 level laboratory, without using a highly safe animal breeding experimental facility having a high standard safety breeding unit installed therein. This is convenient for the people performing experiments.

P3 or P4 level experiments must be performed in a high standard, highly safe experimental facility in which such experiments are permitted. Preferably, P3 or P4 level animal experiments are also required to be performed in a high standard, highly safe experimental facility in which such experiments are permitted. Such special facilities are expensive to build and maintain, and are limited in number. Use of the system of the present invention has allowed a system for animal experiments to be constructed easily in a conventional highly safe experimental facility. Owing to an isolation ability of the system of the present invention, the system can be operated more simply and safely. This has alleviated the load on the researchers and realized safe treatment of wastes.

The present invention has been described by way of preferable embodiments. The present invention will be described based on examples with reference to the figures. It should be noted that the following examples are provided only for the purpose of illustration. The scope of the present invention is not limited by any specific embodiment used for the description or any of the following examples, but is limited only by the attached claims.

EXAMPLES

Hereinafter, the present invention will be described with reference to relevant drawings.

Figure 2A:
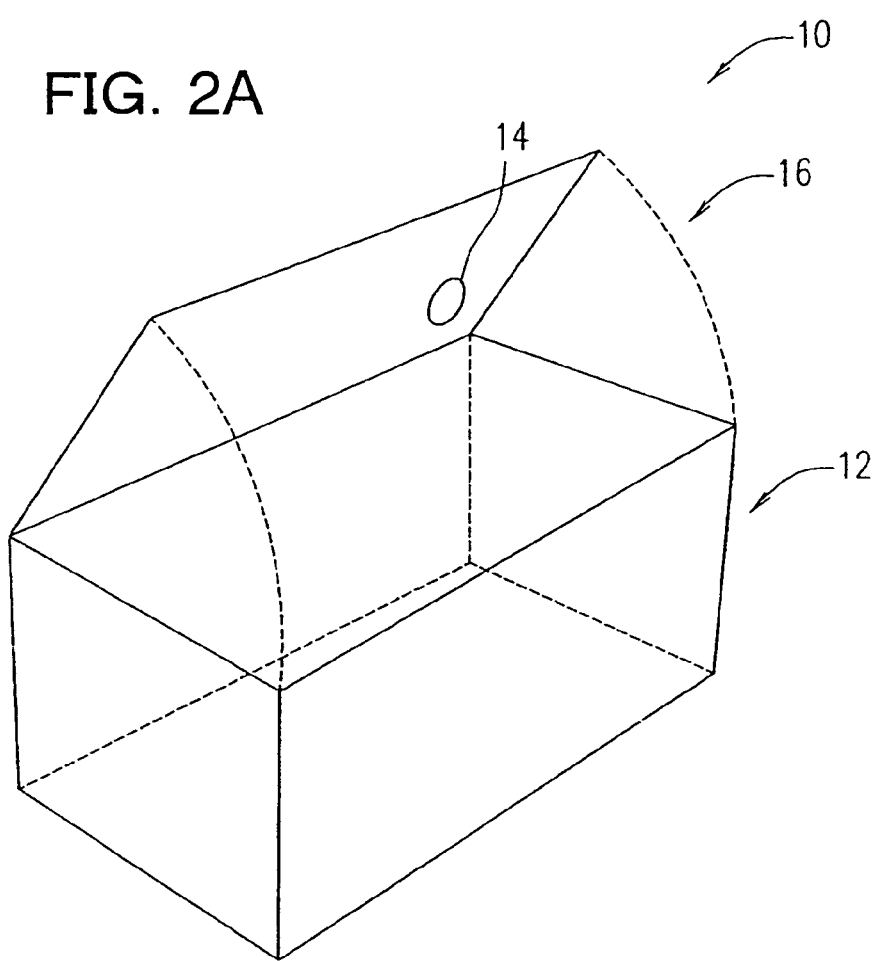
FIGS. 2A and 2B each show one exemplary animal breeding unit according to the present invention.

FIG. 2A shows an exemplary animal breeding unit 10 according to the present invention. The animal breeding unit 10 includes a housing 12 having an opening 14 provided thereon as a connecting section. The housing 12 isolates the inside thereof from an external environment. The housing 12 may be formed of a plastic material such as, for example, polycarbonate, a metal material such as, for example, aluminum, or the like. The opening 14 may be used both for air supply and air discharge. The housing may be connected to an environment maintaining device (not shown) via the opening 14. A lid portion 16 which is a part of the housing 12 is openable/closable. The housing 12 may preferably have a function of maintaining airtightness, in addition to the function of isolation. When the air breeding unit 10 is connected to a portable environment maintaining device via the opening 14, aseptic experiments or recombinant DNA experiments may be conducted at a desired site (for example, an ordinary laboratory). There may be a plurality of openings.

Figure 2B:
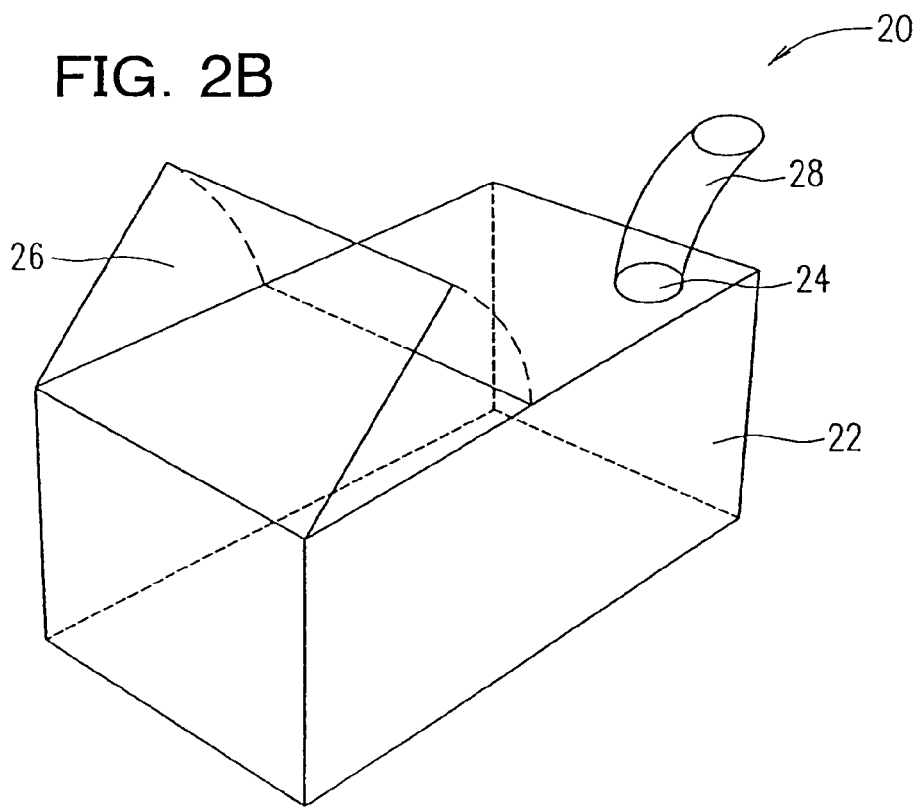

FIG. 2B shows an exemplary animal breeding unit 20 according to the present invention. The animal breeding unit 20 includes a housing 22 having an opening 24 provided thereon as a connecting section. The animal breeding unit may include a tube 28 connected to the housing via the opening 24 for facilitating connection. Like in the unit 10 shown in FIG. 2A, the opening 24 may be used both for air supply and air discharge. The housing 22 may be connected to an environment maintaining device (not shown) via the opening 24. The housing 22 isolates the inside thereof from the external environment. The housing 22 may be formed of a plastic material such as, for example, polycarbonate, a metal material such as, for example, aluminum, or the like. A lid portion 26 which is a part of the housing 22 is openable/closable.

Figure 3:
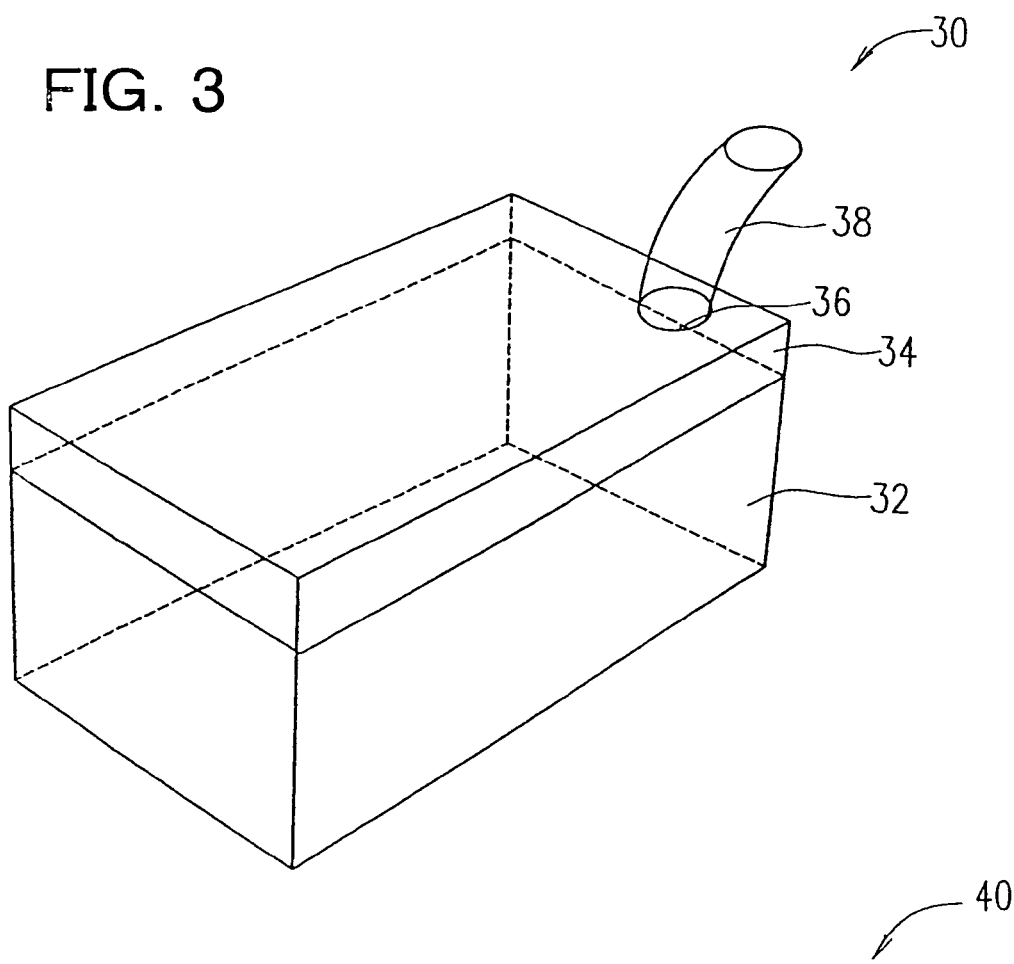
FIG. 3 shows one exemplary animal breeding unit according to the present invention.

FIG. 3 shows an exemplary animal breeding unit 30 according to the present invention. The animal breeding unit 30 includes an external tray 32 and a lid 34. The lid 34 has an opening 36. The animal breeding unit may include a tube 38 connected to the lid via the opening 36 for facilitating connection. Like in the unit 10 shown in FIG. 2A, the opening 36 may be used both for air supply and air discharge. The lid 34 may be connected to an environment maintaining device (not shown) via the opening 36. The external tray 32 may be formed of a plastic material such as, for example, polycarbonate, a metal material such as, for example, aluminum, or the like. The lid 34 may be formed of an identical or similar material to, or a different material from, that of the external tray 32. In the state where the lid 34 is closed, the external tray 32 and the lid 34 can isolate the inside thereof from the external environment and thus can maintain the inside thereof airtight when desired.

Figure 4:
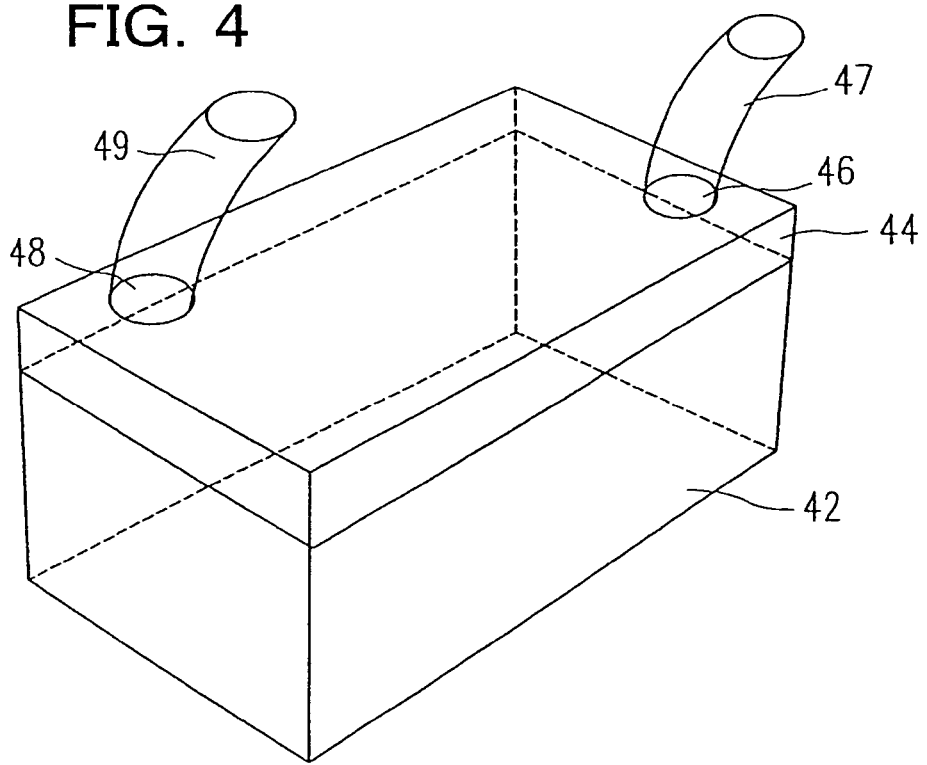
FIG. 4 shows one exemplary animal breeding unit according to the present invention.

FIG. 4 shows an exemplary animal breeding unit 40 according to the present invention. The animal breeding unit 40 includes an external tray 42 and a lid 44. The lid 44 has openings 46 and 48. Preferably, one of the openings 46 and 48 can be used only for air supply, and the other of the openings 46 and 48 can be used only for air discharge. By one of the openings 46 and 48 being used for air supply and the other being used for air discharge, smooth environment control can be performed. The animal breeding unit may include tubes 47 and 48 connected to the lid respectively via the openings 46 and 48 for facilitating connection. The external tray 42 may be formed of a plastic material such as, for example, polycarbonate, a metal material such as, for example, aluminum, or the like. The lid 44 may be formed of an identical or similar material to, or a different material from, that of the external tray 42. In the state where the lid 44 is closed, the external tray 42 and the lid 44 can isolate the inside thereof from the external environment and thus can maintain the inside thereof airtight when desired.

Figure 5:
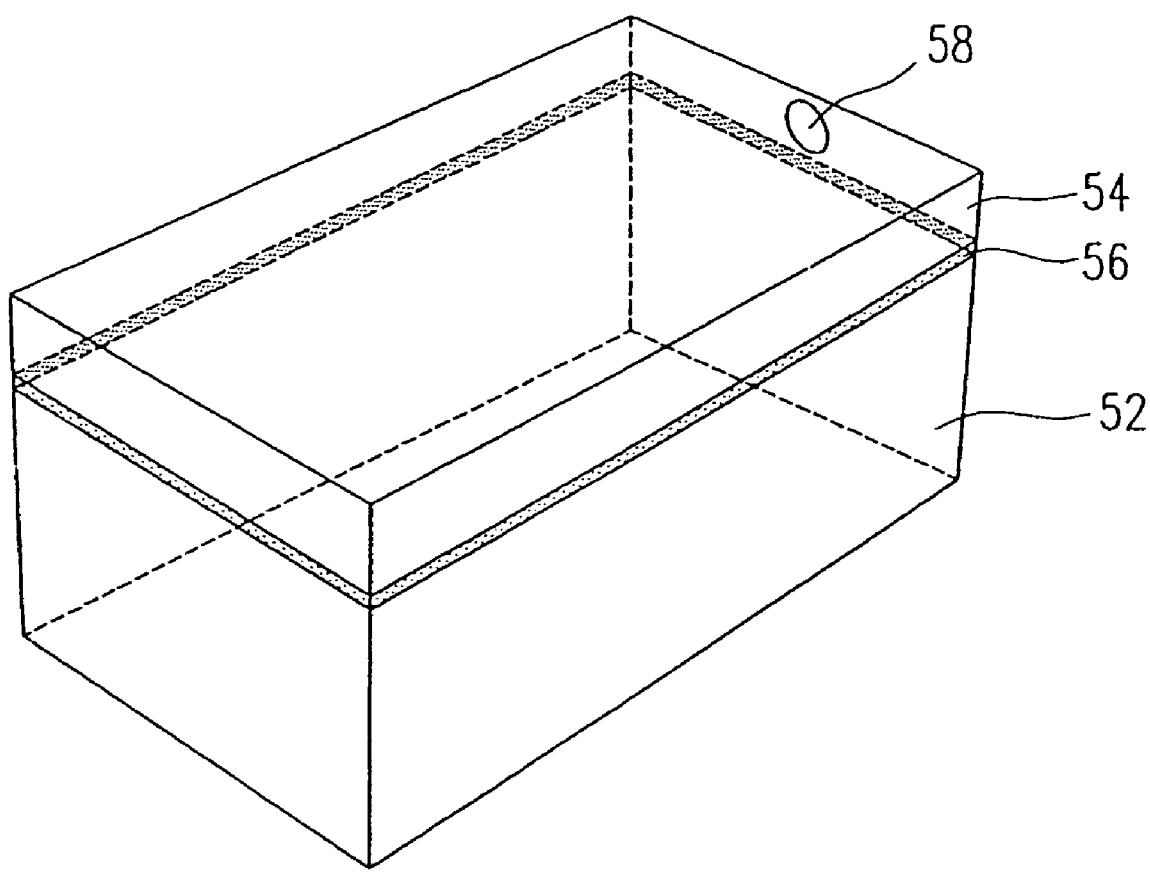
FIG. 5 shows one exemplary animal breeding unit according to the present invention.

FIG. 5 shows an exemplary animal breeding unit 50 according to the present invention. The animal breeding unit 50 includes an external tray 52 and a lid 54. A packing member 56 is provided between the external tray 52 and the lid 54. The packing member 56 reinforces the airtightness of the animal breeding unit 50. The lid 54 has an opening 58. The opening 58 may be used both for air supply and air discharge. The lid may be connected to an environment maintaining device (not shown) via the opening 58. The external tray 52 may be formed of a plastic material such as, for example, polycarbonate, a metal material such as, for example, aluminum, or the like. The lid 54 may be formed of an identical or similar material to, or a different material from, that of the external tray 52. In the state where the lid 54 is closed, the external tray 52 and the lid 54 can isolate the inside thereof from the external environment and thus can maintain the inside thereof airtight when desired.

Figure 6:
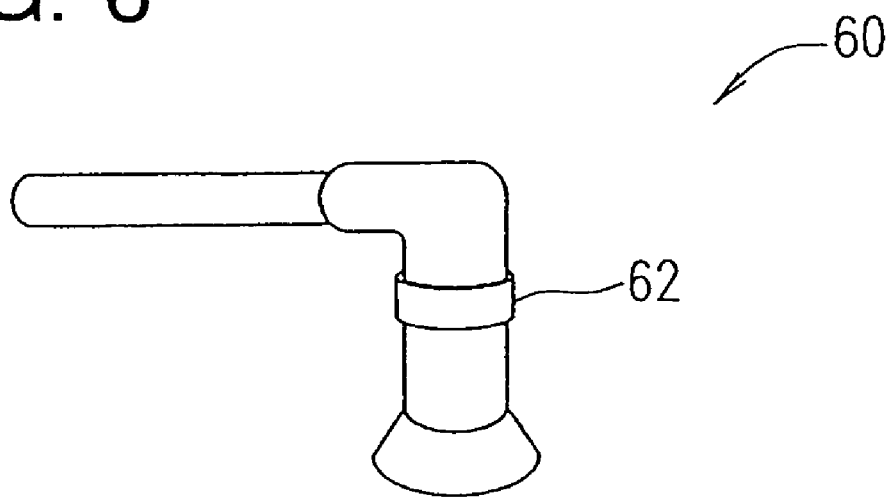
FIG. 6 shows a valve used in one exemplary animal breeding unit according to the present invention.
Figure 7:
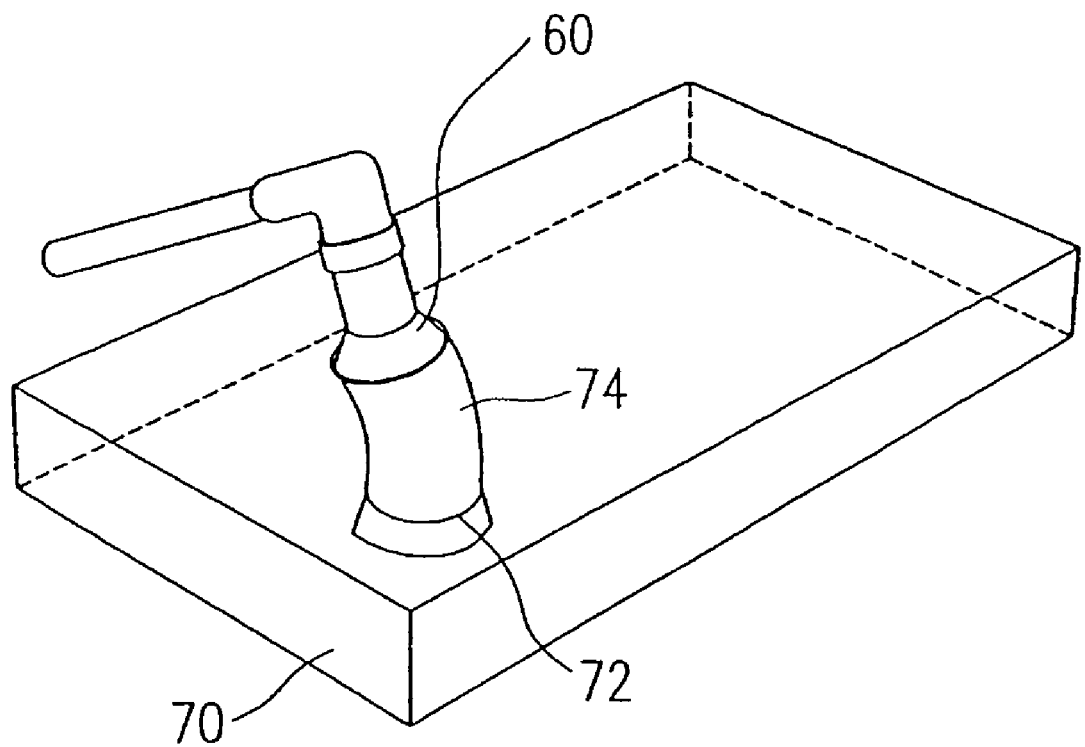
FIG. 7 shows how a valve is attached in one exemplary animal breeding unit according to the present invention.

FIG. 6 shows an exemplary valve 60 provided to a connecting section of an animal breeding unit. The valve 60 is opened or closed by a connector 62. As shown in FIG. 7, the valve 60 is connected to an opening 72 of an animal breeding system 70 via a tube 74. The valve 60 may be connected to the opening 72 without the tube 74.

Figure 8:
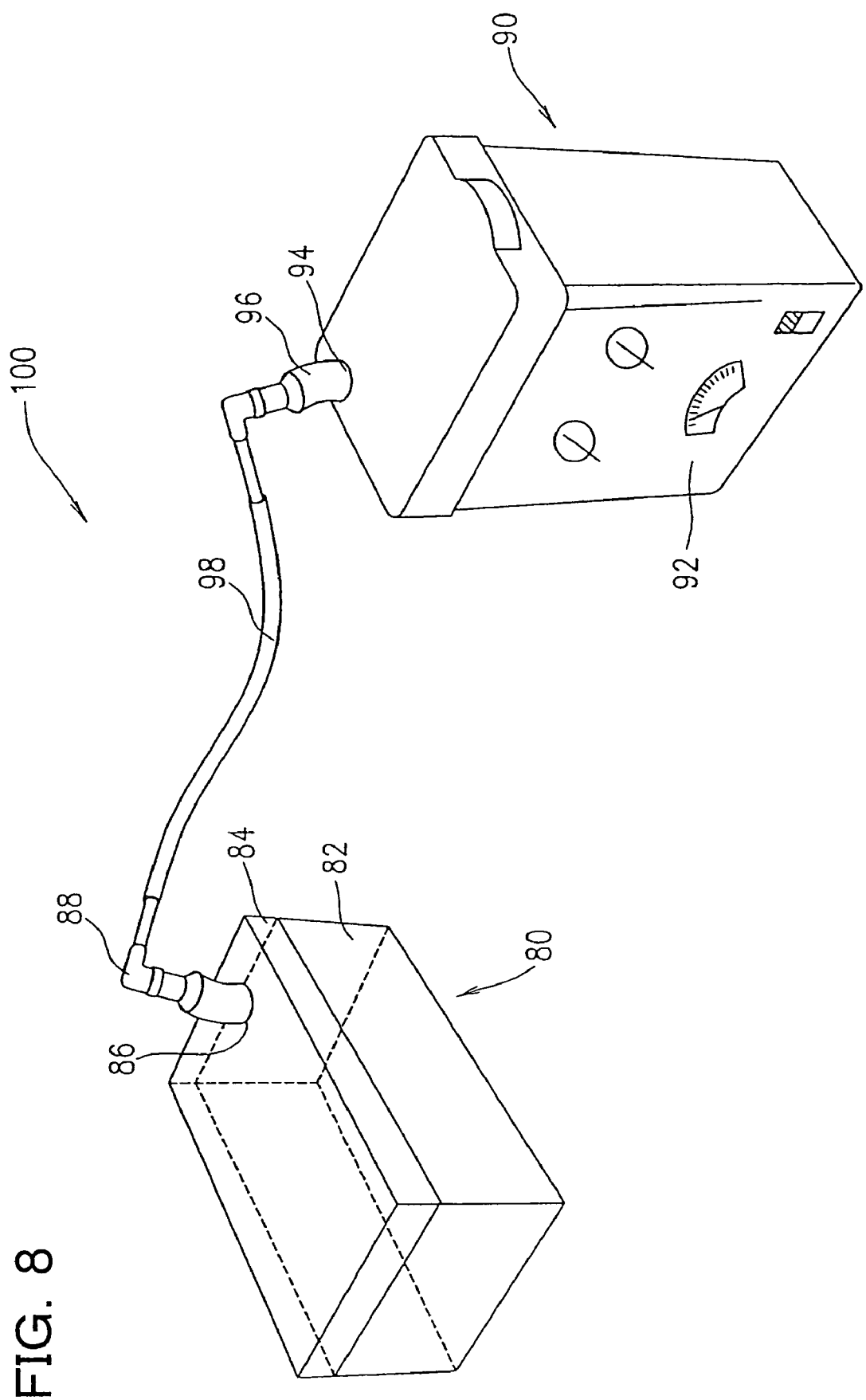
FIG. 8 shows a combination of one exemplary animal breeding unit according to the present invention and an environment maintaining device.

FIG. 8 shows an exemplary animal breeding system 100 according to the present invention. The animal breeding system 100 includes an animal breeding unit 80 and an environment maintaining device 90, both according to the present invention, which are connected to each other. The animal breeding system 100 may optionally include a safety cabinet. The animal breeding unit 80 includes an external tray 82 and a lid 84. The lid 84 has an opening 86 and is connected to a valve 88 via the opening 86. The environment maintaining device 90 includes a control section 92 and an opening 94. The environment maintaining device 90 is connected to a valve 96 via the opening 94. The animal breeding unit 80 and the environment maintaining device 90 are connected to each other via a tube 98 which connects the respective valves thereof. The parameters of the environment maintaining device 90 may be controlled manually or automatically.

Figure 9:
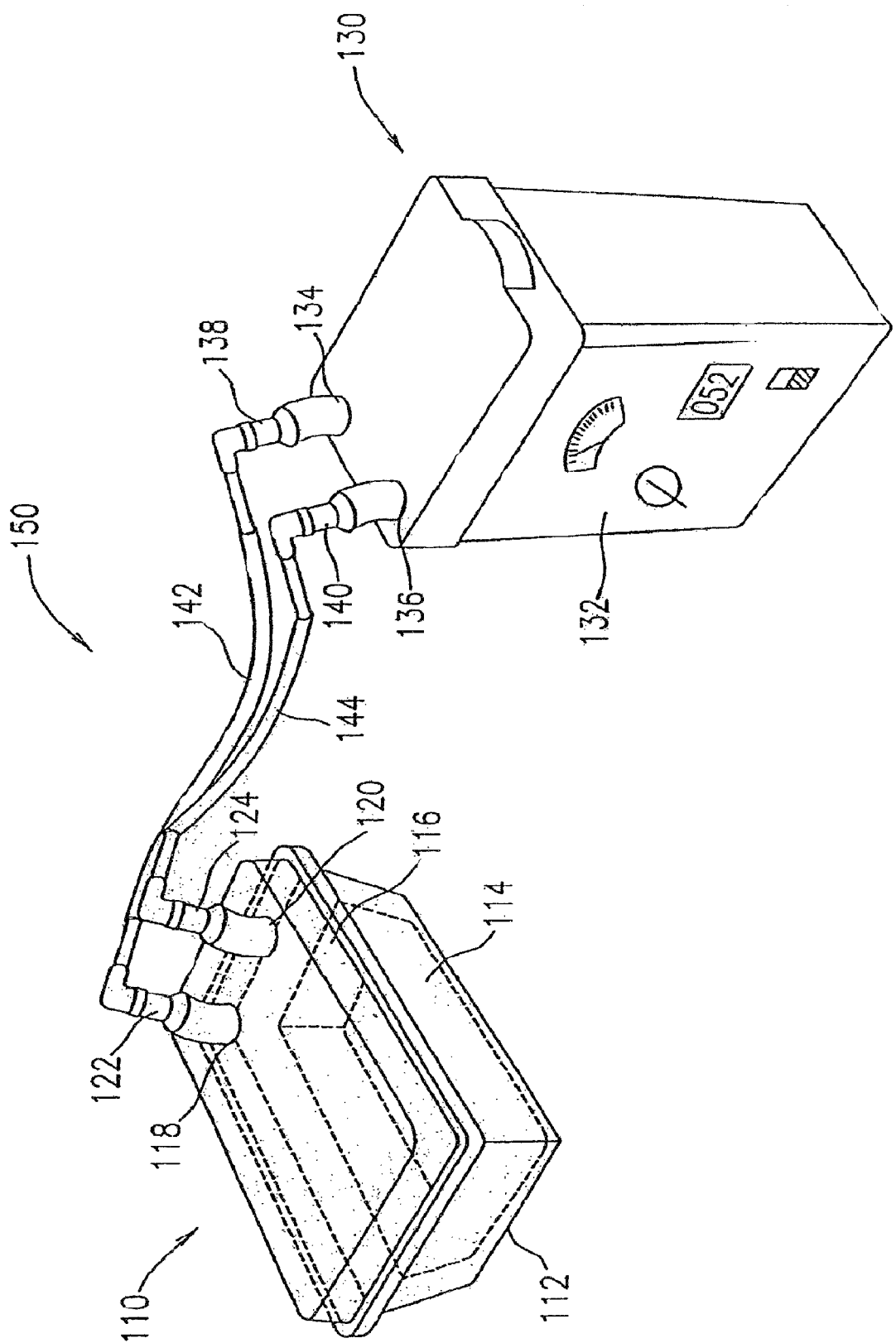
FIG. 9 shows a combination of one exemplary animal breeding unit according to the present invention and an environment maintaining device.

FIG. 9 shows an exemplary animal breeding system 150 according to the present invention. The animal breeding system 150 includes an animal breeding unit 110 and an environment maintaining device 130, both according to the present invention, which are connected to each other. The animal breeding system 150 may optionally include a safety cabinet. The animal breeding unit 110 includes an external tray 112, an internal tray 114, and a lid 116. The lid 116 has an opening 118 for air supply and an opening 120 for air recovery, and is connected to a valve 122 for air supply via the opening 118 and is also connected to a valve 124 for air recovery via the opening 120. The environment maintaining device 130 includes a control section 132, an opening 134 for air supply and an opening 136 for air recovery. The environment maintaining device 130 is connected to a valve 138 for air supply via the opening 134, and is also connected to a valve 140 for air recovery via the opening 136. The animal breeding unit 110 and the environment maintaining device 130 are connected to each other via a tube 142 which connects the valves 122 and 138, and via a tube 144 which connects the valves 124 and 140. The parameters of the environment maintaining device 130 may be controlled manually or automatically.

FIG. 10 shows a two-layer animal breeding unit 160 according to the present invention. The animal breeding unit 160 includes an internal tray 162 and an external tray 164. The internal tray 162 may preferably be disposable, and may preferably be water-resistant.

Figure 11:
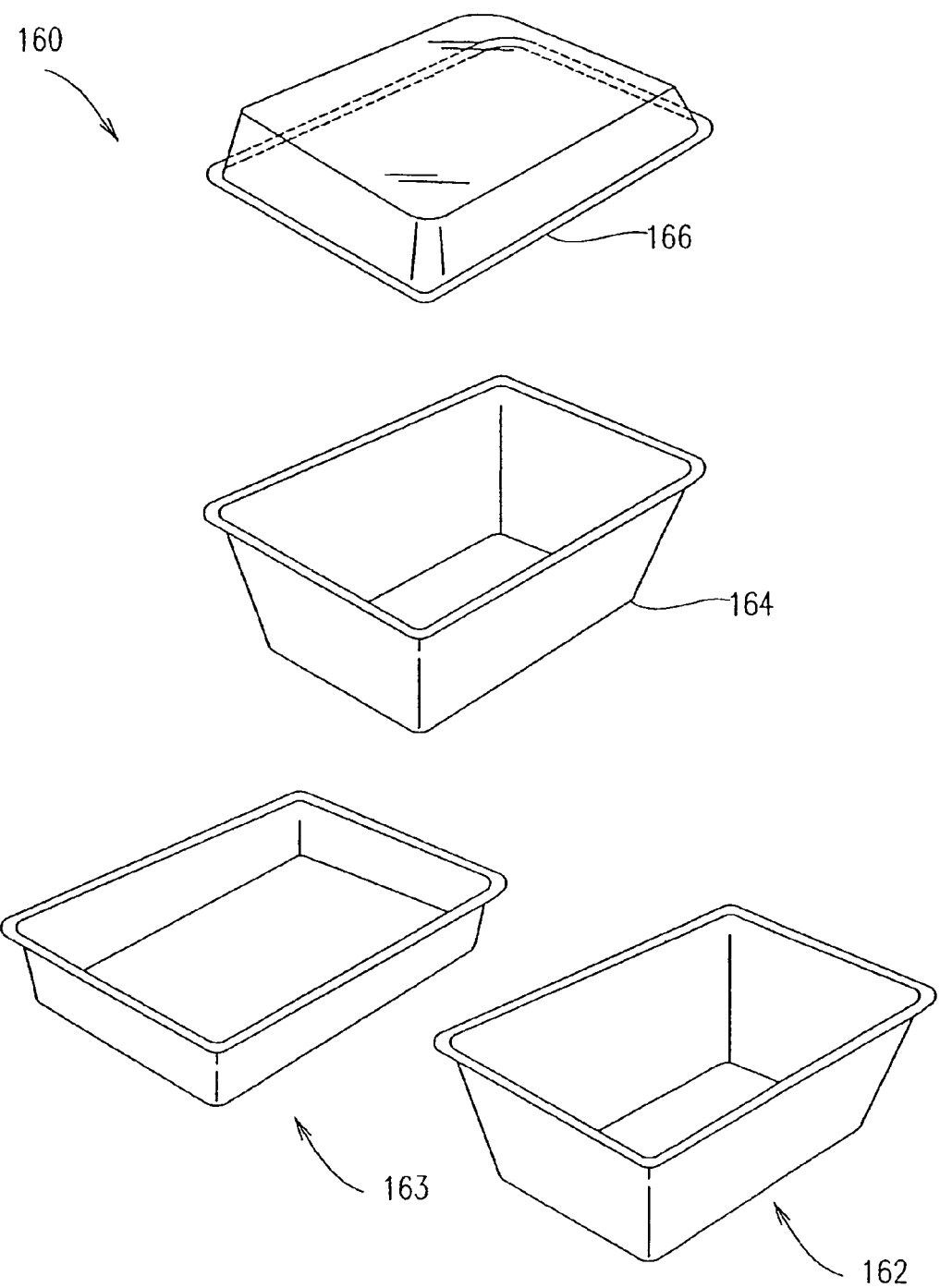
FIG. 11 shows one exemplary two-layer animal breeding unit according to the present invention.

As shown a lower part of FIG. 11, the internal tray has a height (as indicated by reference numeral 162) which is sufficient to cover the inner wall of the external tray 164 and, as a result, to prevent an animal in the animal breeding unit from contacting a surface of the external tray 164. The internal tray may have such a height (as indicated by reference numeral 163) as to cover a part of the inner wall of the external tray 164. Preferably, the internal tray and the external tray have substantially the same height. In consideration of the strength and the lid, the size indicated by reference numeral 162 which is sufficient to cover the inner wall of the external tray 164 is preferable. With this height, the internal tray can prevent the animal therein from contacting the external tray 164 and thus prevent filth, dust, etc. from scattering. The animal breeding unit 160 may optionally include a lid 166.

As shown in FIG. 12, an animal breeding unit may include further components such as, for example, a filter 172 and a mesh cover 174. The inner tray 176 may have a bedding material 178 covering the entire floor surface thereof.

Figure 14:
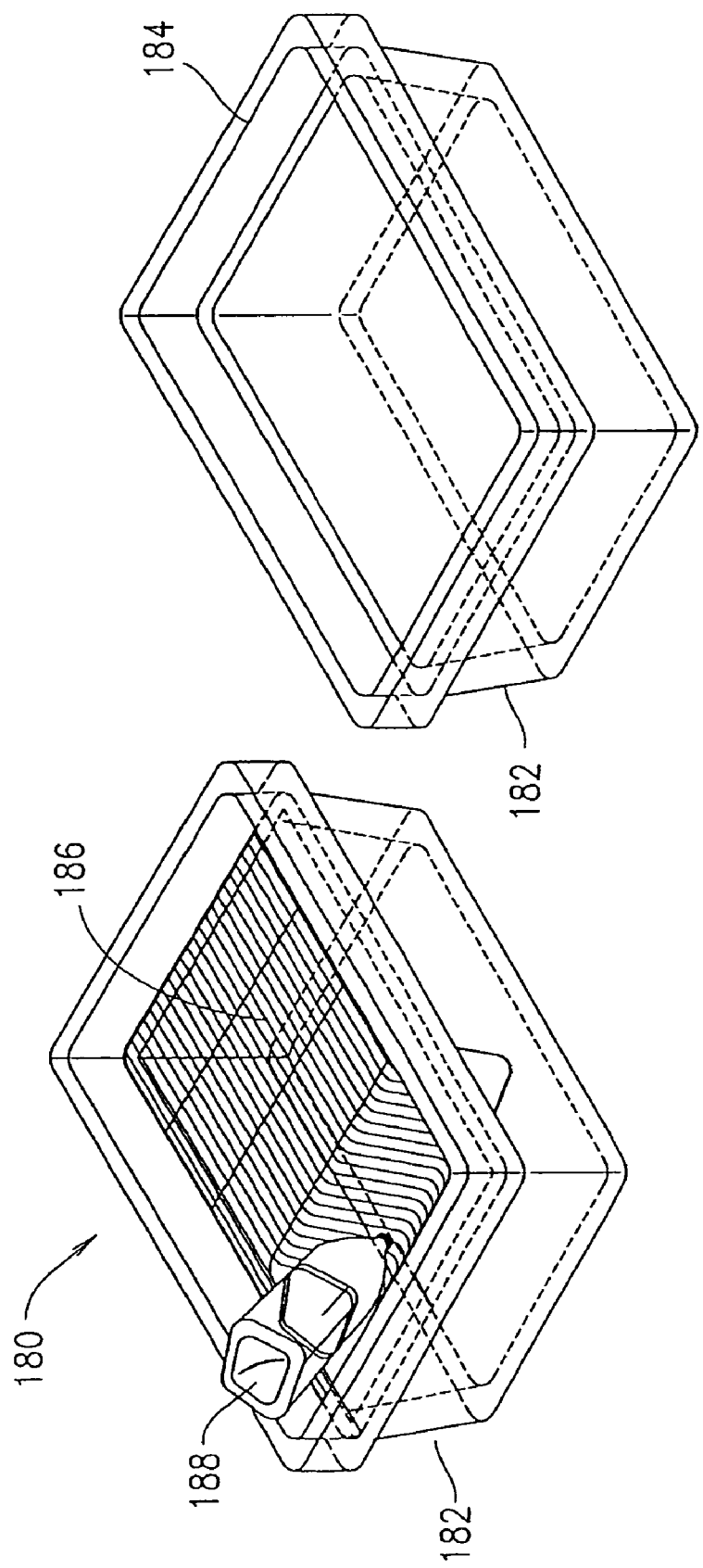
FIG. 14 shows how an animal breeding unit according to the present invention is assembled.

FIG. 13 shows a two-layer animal breeding unit 180 as a preferable example according to the present invention. The animal breeding unit 180 includes an external tray 182 and an internal tray 184. The external tray 182 is formed of polycarbonate. The internal tray 184 is formed of a less polluting resin and is disposable. FIG. 14 shows a process of assembling the animal breeding unit 180. As shown in the right part of FIG. 14, the internal tray 184 is fit into the external tray 182. Then, as shown in the left part of FIG. 14, an internal lid 186 is fit into the assembly of the internal tray 184 and the external tray 182. The internal lid 184 is slightly recessed so as to accommodate a water supply bottle 188 and feed.

Figure 15:
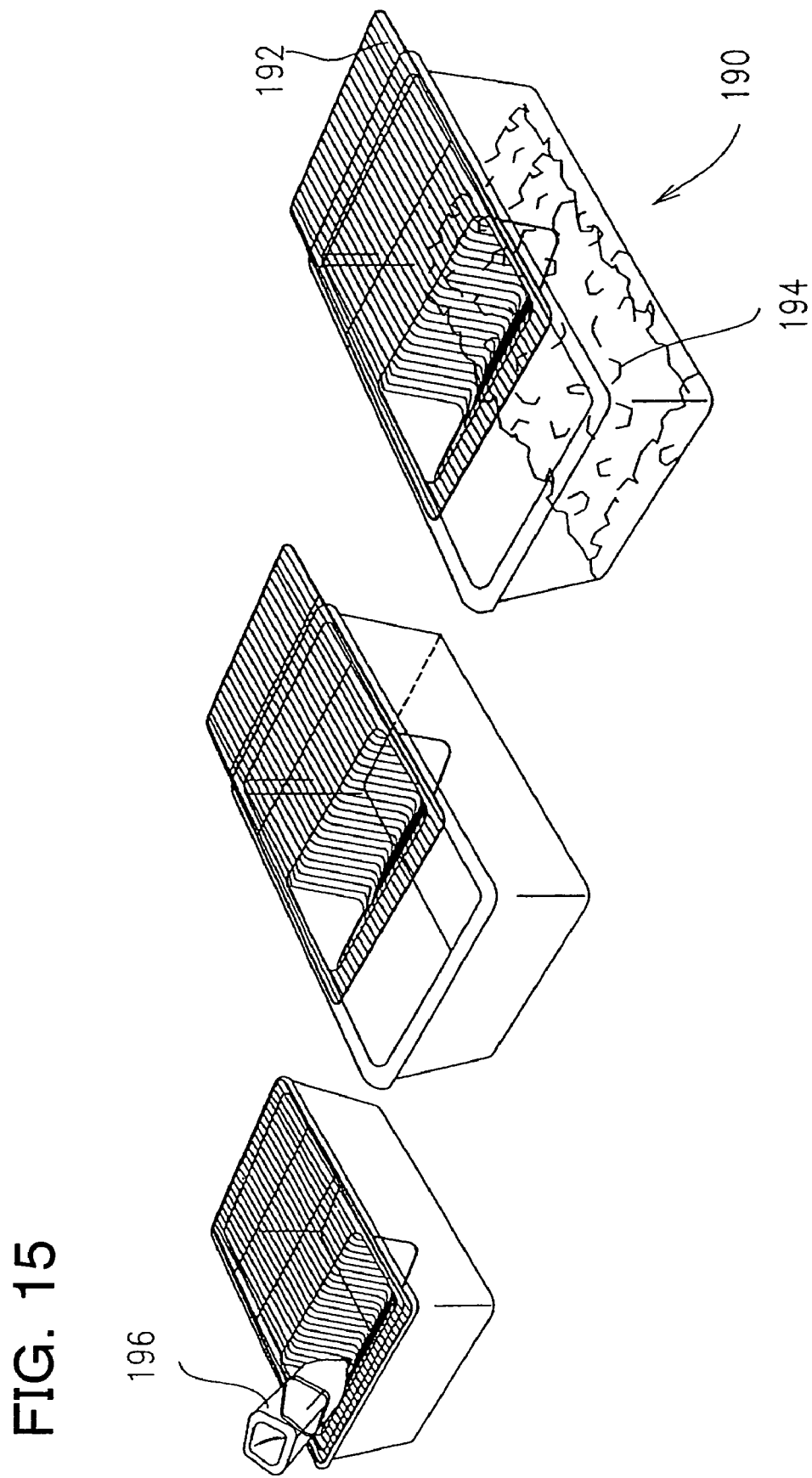
FIG. 15 shows a conventional animal breeding cage.
Figure 16:
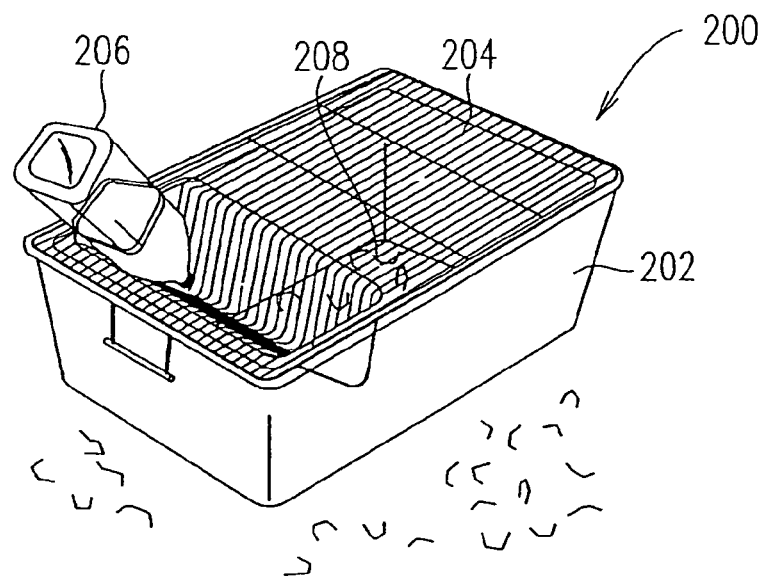
FIG. 16 shows a conventional animal breeding cage.
Figure 17:
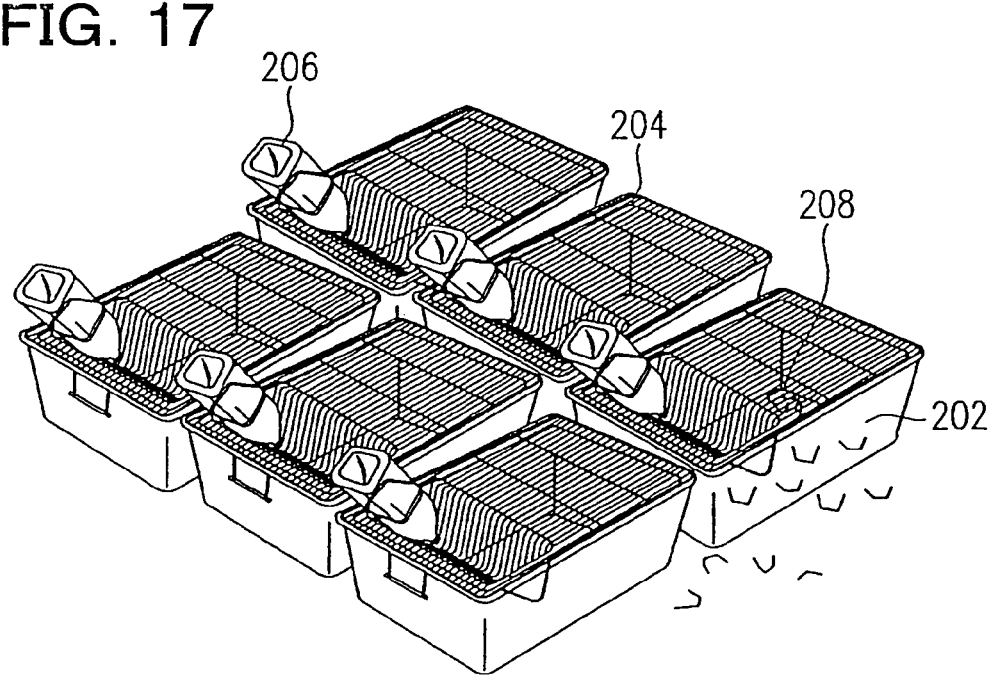
FIG. 17 shows a conventional animal breeding cage.

FIG. 15 shows a conventional animal breeding cage 190. The cage 190 has an inner lid 192. The cage 190 has a bedding material 184 covering the entire floor surface thereof. A water supply bottle 196 is attached to the inner lid 196. As shown in FIG. 16, a conventional cage unit 200 includes a cage 202, a lid 204, and a water supply bottle 206 attached to the lid 204. When an animal inside the cage 202 moves, a bedding material 208 and/or feed often flies out. This contaminates the environment more than commonly recognized. FIG. 17 shows a plurality of conventional cages for breeding animals. When a plurality of cages are used, the degree of contamination between the cages and outside the cages is significantly raised. Therefore, use of the conventional cages causes the contamination problems and requires work of washing.

Figure 18:
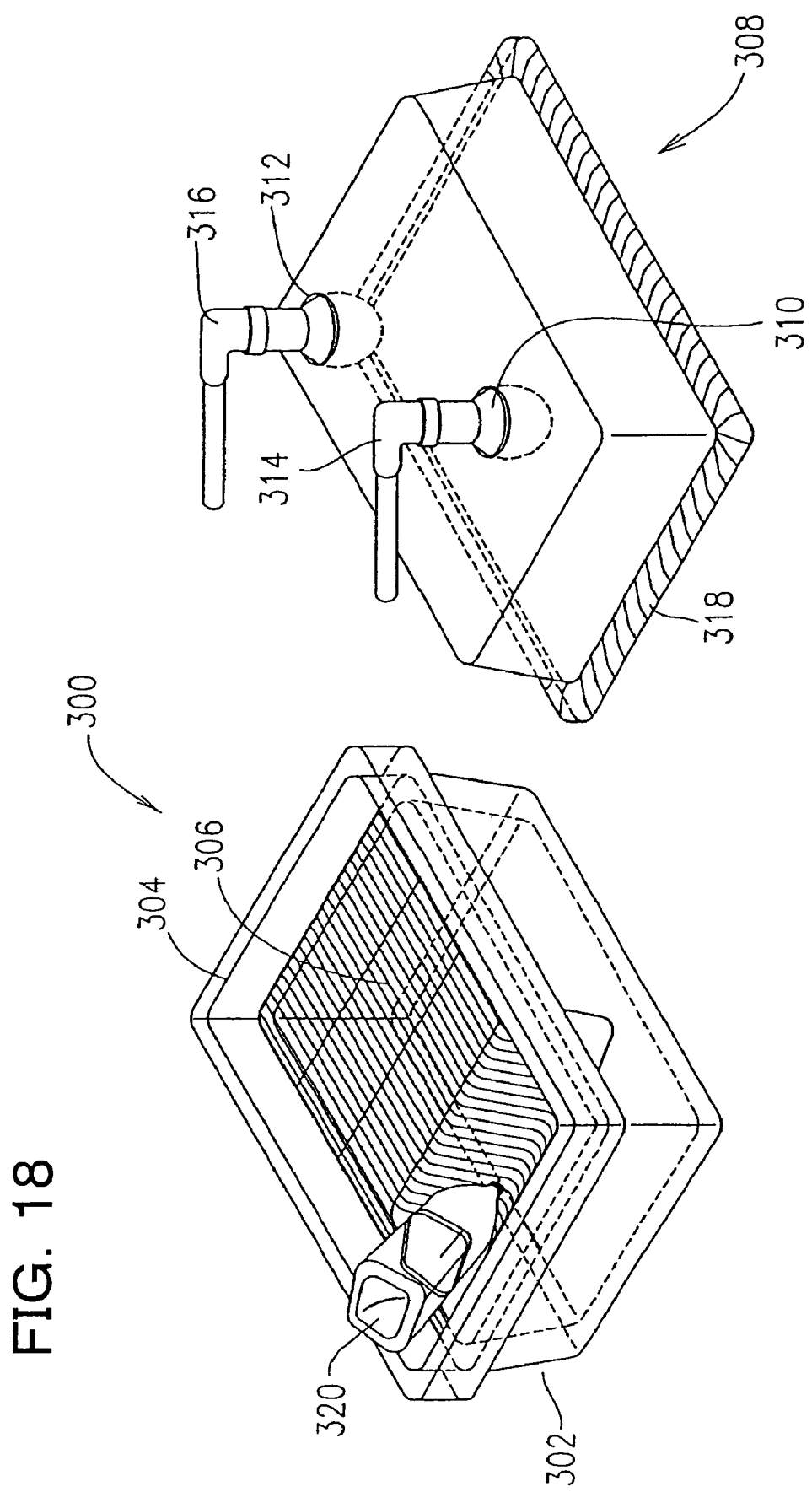
FIG. 18 shows an animal breeding unit according to a preferable example of the present invention having both a feature of an independent isolation type unit and a feature of a two-layer type unit.
Figure 19:
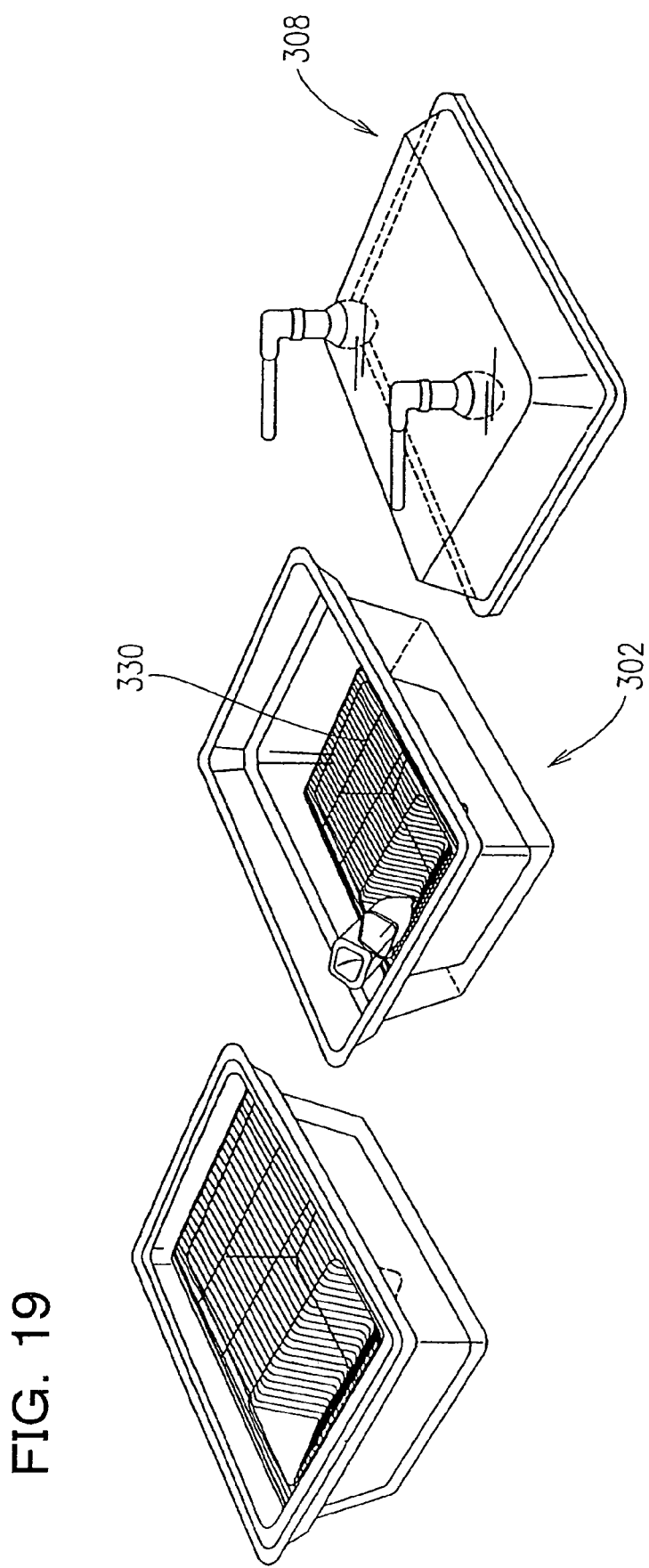
FIG. 19 shows how to operate the animal breeding unit according to a preferable example of the present invention having both a feature of an independent isolation type unit and a feature of a two-layer type unit.

FIG. 18 shows an animal breeding unit 300 as a preferable example of the present invention. The animal breeding unit 300 has both a feature of an independent isolation type unit and a feature of a two-layer unit. An internal tray 304 is fit into an external tray 302. Both the external tray 302 and the internal tray 304 have a stepped portion. The stepped portions prevent the contents in the unit 300 from scattering even when an animal therein moves. An internal lid 306 is fit onto the internal tray 304. The internal lid 306 prevents the animal accommodated in the unit 300 from escaping. A recess formed in the internal lid 306 can accommodate a water supply bottle 320 and feed. By putting a lid 308 on the assembly of the external tray 302 and the internal tray 304, the unit 300 can make the inside of the unit 300 independent and isolated from the external environment, and also airtight optionally. The lid 308 has openings 310 and 312. Either one of the openings 310 and 312 is used for air supply, and the other is used for air discharge. The lid 308 is connected to valve 314 and 316 respectively via the openings 310 and 312. The valves 314 and 316 may be connected to an environment maintaining device (not shown) when necessary. A portion of the lid 308 which contacts the external tray 302 is treated to airtightness. In this example, a sealing tape 318 adheres to the portion of the lid 308. As shown in FIG. 19, the lid 308 and the external tray 302 may be used with a conventional cage 330 so as to form an independent isolation type animal breeding system.

Figure 20:
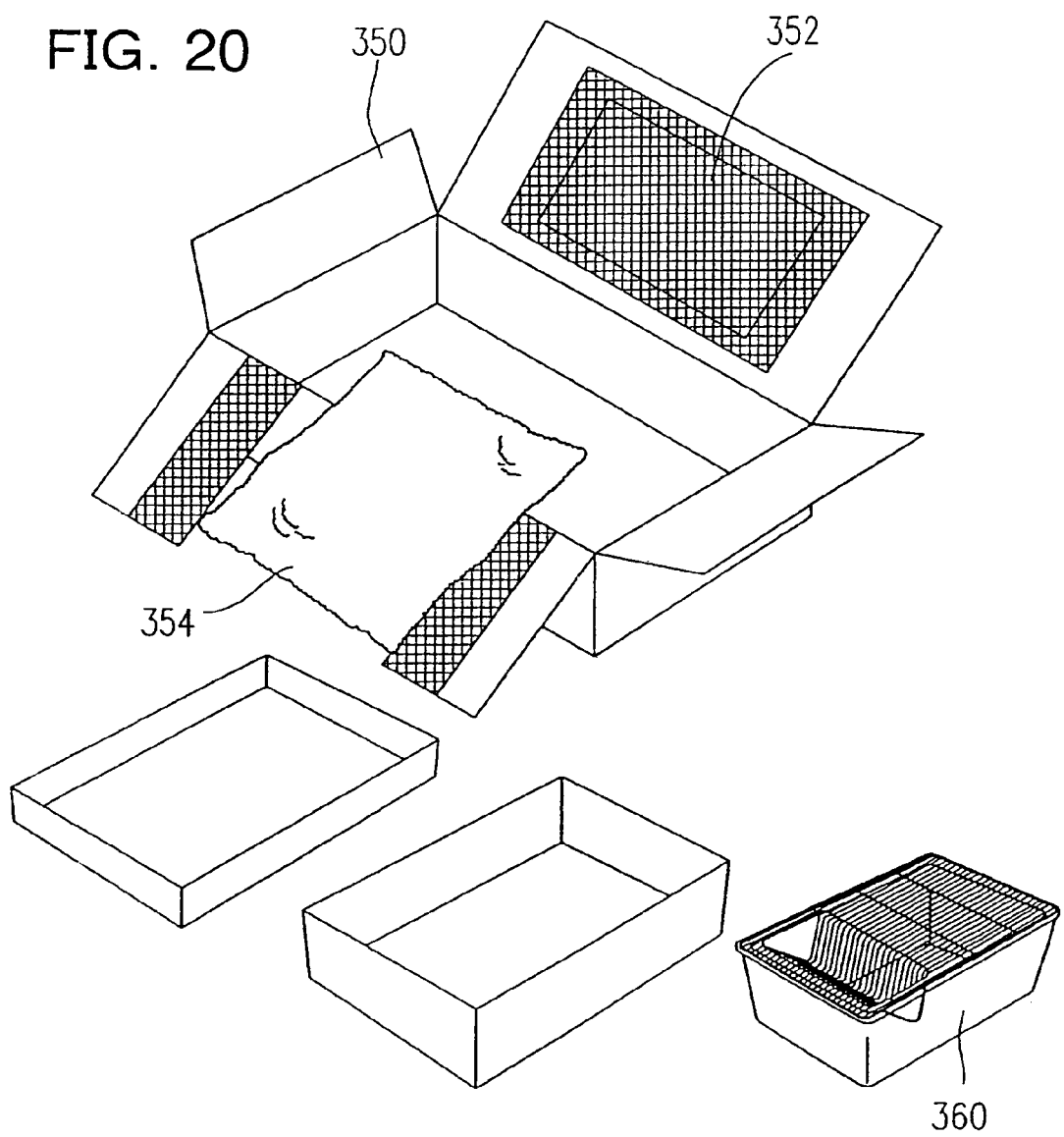
FIG. 20 shows how to assemble a transportation set of an animal breeding unit according to the present invention.
Figure 21:
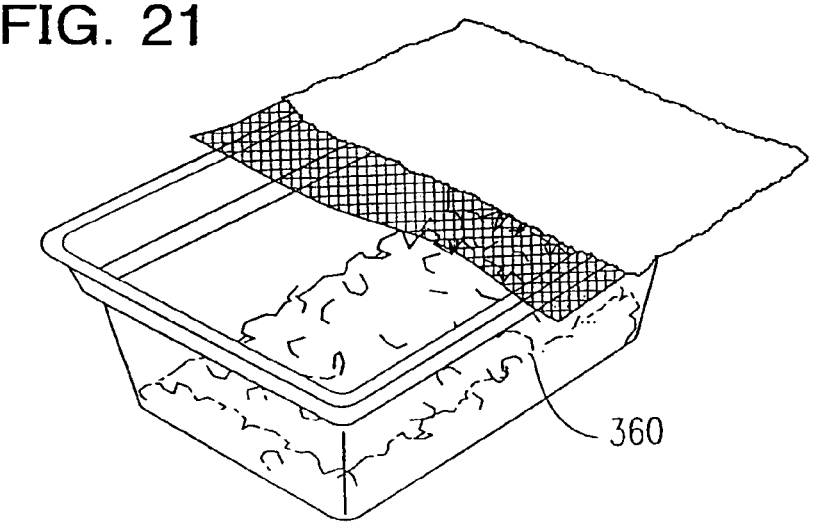
FIG. 21 shows how a transportation case is used as a breeding cage according to the present invention.

FIG. 20 shows a process of assembling a set for transportation. A cardboard box (or resin case) 350 may be used. A clean state can be kept by optionally providing an escape-preventing mesh sheet 352 to the cardboard box 350 and providing a filter 354 to a brim surface of the cardboard box 350. When the mesh sheet 352 and the filter 354 are removed, the transportation case can be used as a breeding cage 360 (see FIG. 21).

Figure 22:
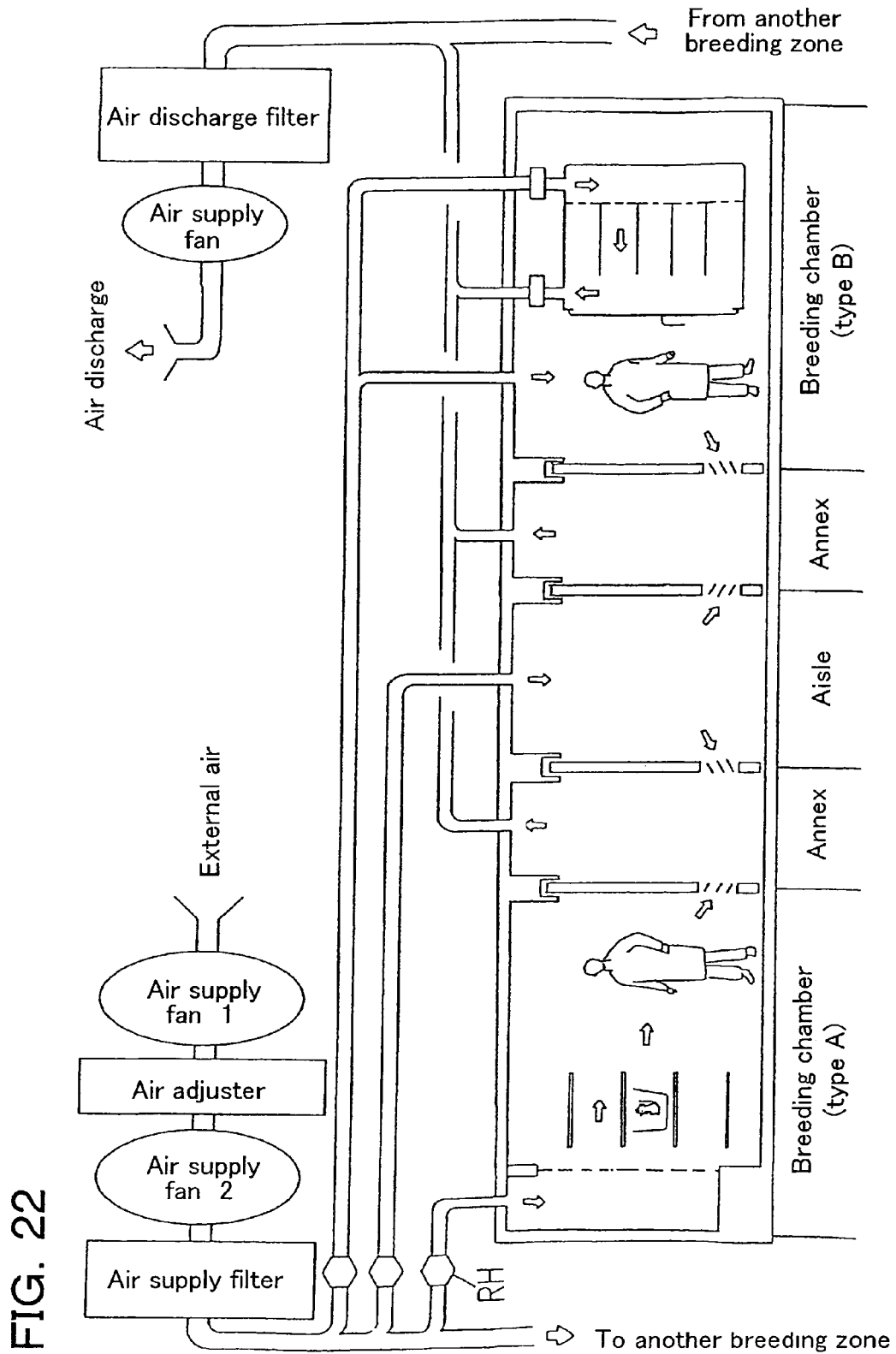
FIG. 22 shows exemplary air-conditioning used in the conventional art.

FIG. 22 shows an example of air-conditioning. When, as shown here, a conventional cage system is used, a large-scale air-conditioning system needs to be used. Therefore, the conventional animal breeding system has little flexibility. (In FIG. 22, "RH" represents an electric heater for correction.) FIG. 23 shows a concept of a conventional breeding environment (upper figure), and a concept of a breeding environment realized by an animal breeding system according to the present invention (lower figure). Conventionally, a breeding facility includes an experimental environment and a breeding environment. The conventional breeding facility includes an area which is shared by the experimental environment and the breeding environment. The conventional breeding facility optionally has an environment maintaining device which is sufficiently large to maintain the facility. In the system according to the present invention, an experimental environment has a safety cabinet and an environment maintaining device. By moving an animal breeding unit according to the present invention between the safety cabinet and the environment maintaining device, a movable experimental environment having a high degree of freedom can be provided.

Figure 24:
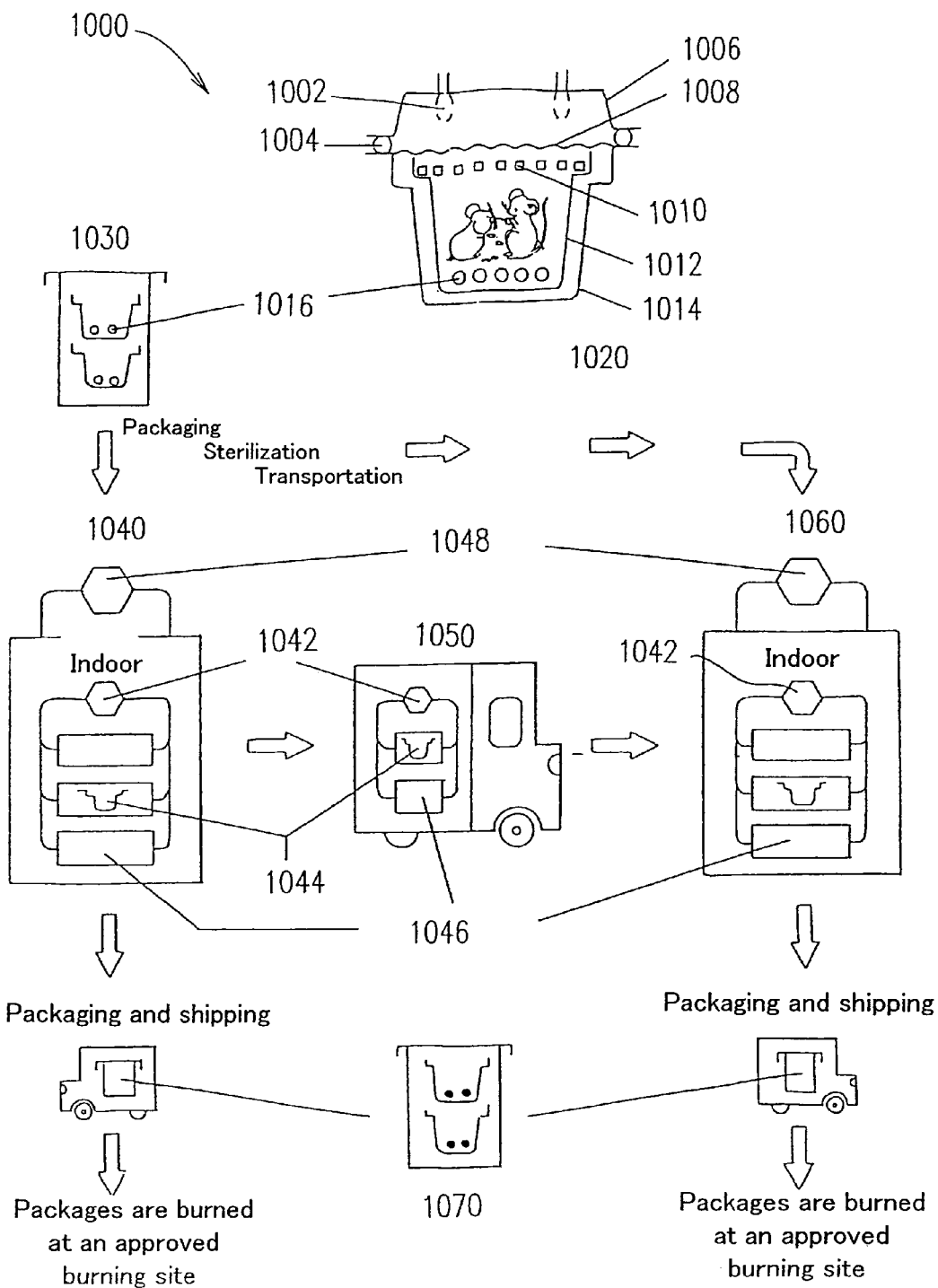
FIG. 24 shows an example of using an animal breeding system according to the present invention.

FIG. 24 shows an example of use of animal breeding system according to the present invention. A cage kit 1000 designed so as to provide individual airtightness includes a dust filter 1002, a packing member 1004, an individually airtight cover 1006, a transportation filter 1008, and a transportation mesh cover 1010. The cage kit 1000 is in a sealed state. An animal breeding unit includes a disposable internal tray 1012 and an external tray 1014 designed so as to provide individual airtightness. Preferably, the internal tray 1012 has a bedding material 1016 covering the entire floor thereof.

A material carrier 1030 transports internal trays 1012 to an animal breeding facility 1040 or an experimental facility 1060. These facilities have a room air-conditioner 1048, and a carrying vehicle has a small-size air-conditioner 1042. Cages 1044 designed so as to provide individual airtightness are accommodated in a stack-type airtight case 1046. Internal trays 1070 which have been used are appropriately burned at an approved burning site.

FIG. 25 shows components which are used when an animal breeding unit according to the present invention is used together with conventional products. An individually airtight cover 1102 has openings 1104 for air supply and discharge tubes. The airtight cover 1102 may be combined with a conventional breeding internal lid 1106, and a disposable internal tray 1108 and an external tray 1110 designed so as to provide individual airtightness both according to the present invention. The airtight cover 1102 may be combined with the conventional breeding internal lid 1106, or with the disposable internal tray 1108 and the external tray 1110 according to the present invention. Alternatively, the airtight cover 1102 may be combined with a conventional breeding cage 1112.

Figure 26:
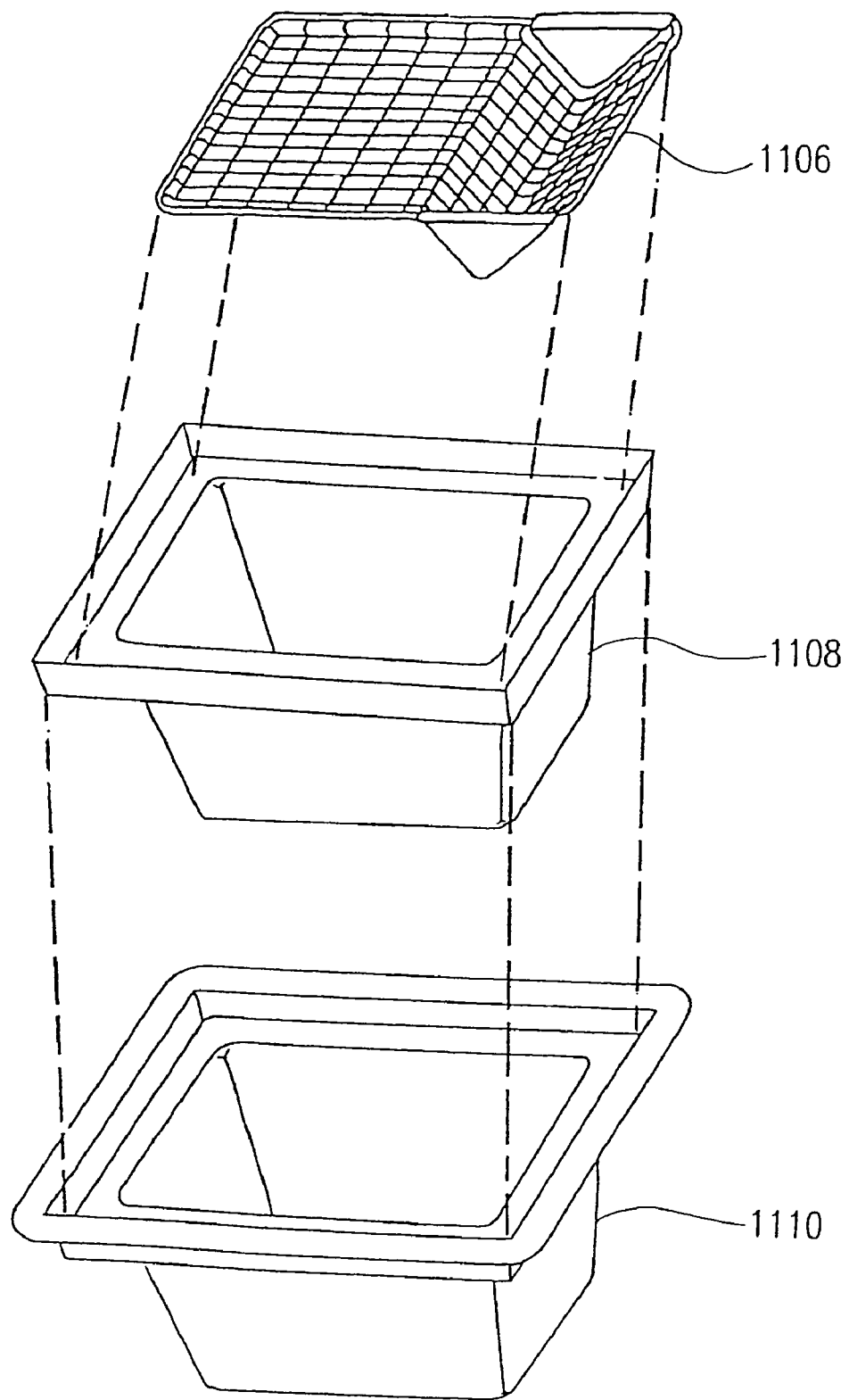
FIG. 26 shows components used in an animal breeding unit according to a preferable example of the present invention, and a method for assembling the same.

FIG. 26 shows the components used in an animal breeding unit in a preferable example of the present invention and a process for assembling the components. The conventional breeding internal lid 1106 is fit into the disposable internal tray 1108, and the disposable internal tray 1108 is fit into the external tray 1110. Thus, the animal breeding unit according to the present invention is completed.

Figure 27:
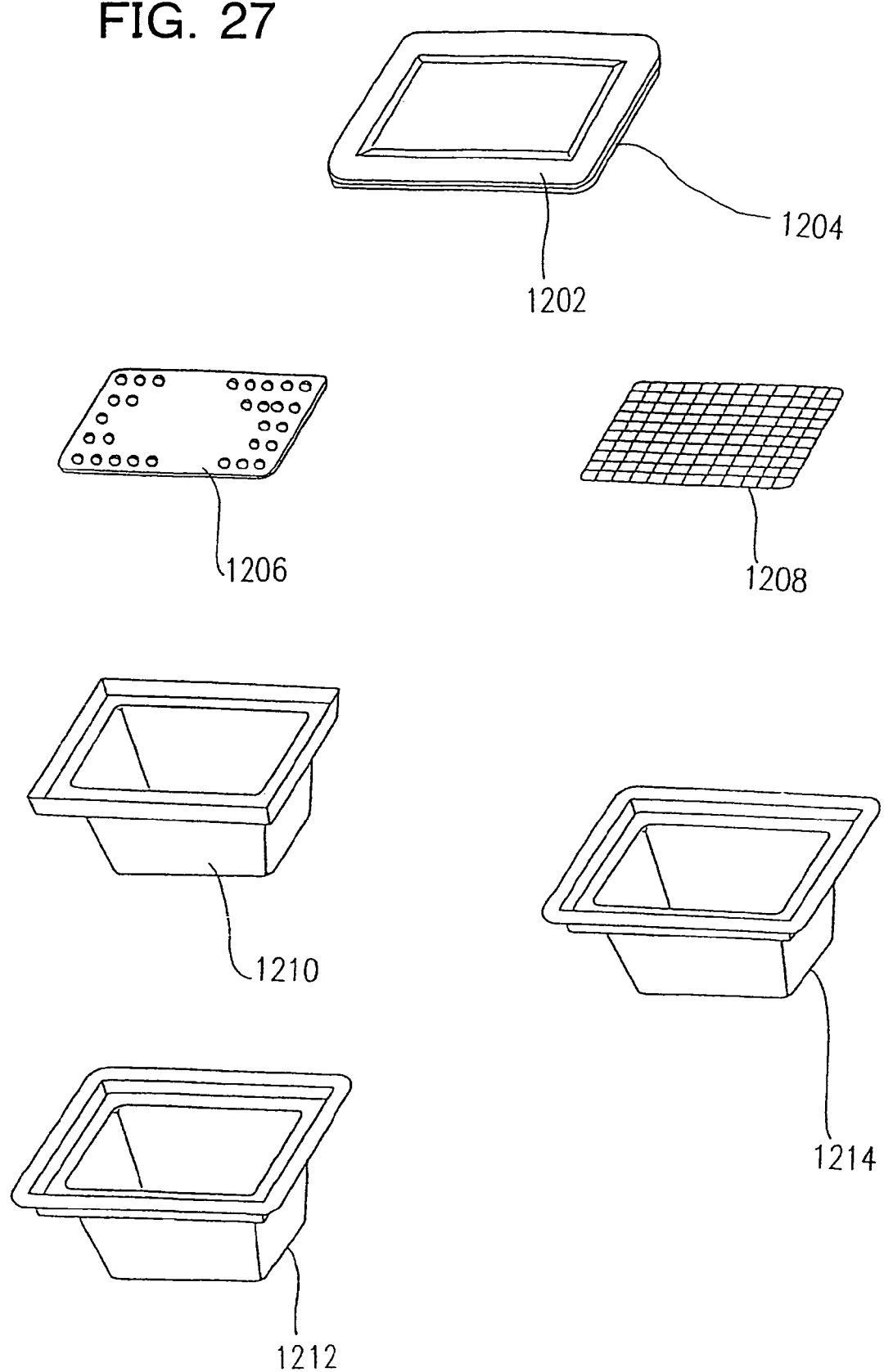
FIG. 27 shows another example of using an animal breeding unit according to the present invention.

FIG. 27 shows another example using an animal breeding system according to the present invention. This example is preferable for transportation. For a lid, a transportation filter 1202, a punched cover 1206, and a mesh cover 1208 are used. A two-sided tape 1204 adheres to the transportation filter 1202 so as to guarantee the microbiological isolation. A disposable internal tray 1210 and an external tray 1212 are used. Instead of the combination of the disposable internal tray 1210 and the external tray 1212, an external tray-type disposable internal tray 1214 may be used when necessary. The external tray is used in the state where, for example, an animal is accommodated in the internal tray, a transportation mesh cover or punched cover is attached to a stepped internal surface of the internal tray, and a filter is attached to a brim surface of the internal tray. A party which has received this assembly (for example, a party conducting an experiment) sterilizes the outer surface of the assembly in the safety cabinet, remove the filter, the mesh and the like, attaches the internal lid. Then, the assembly is used for breeding and experiments in the state conforming to the respective current conditions.

Figure 28:
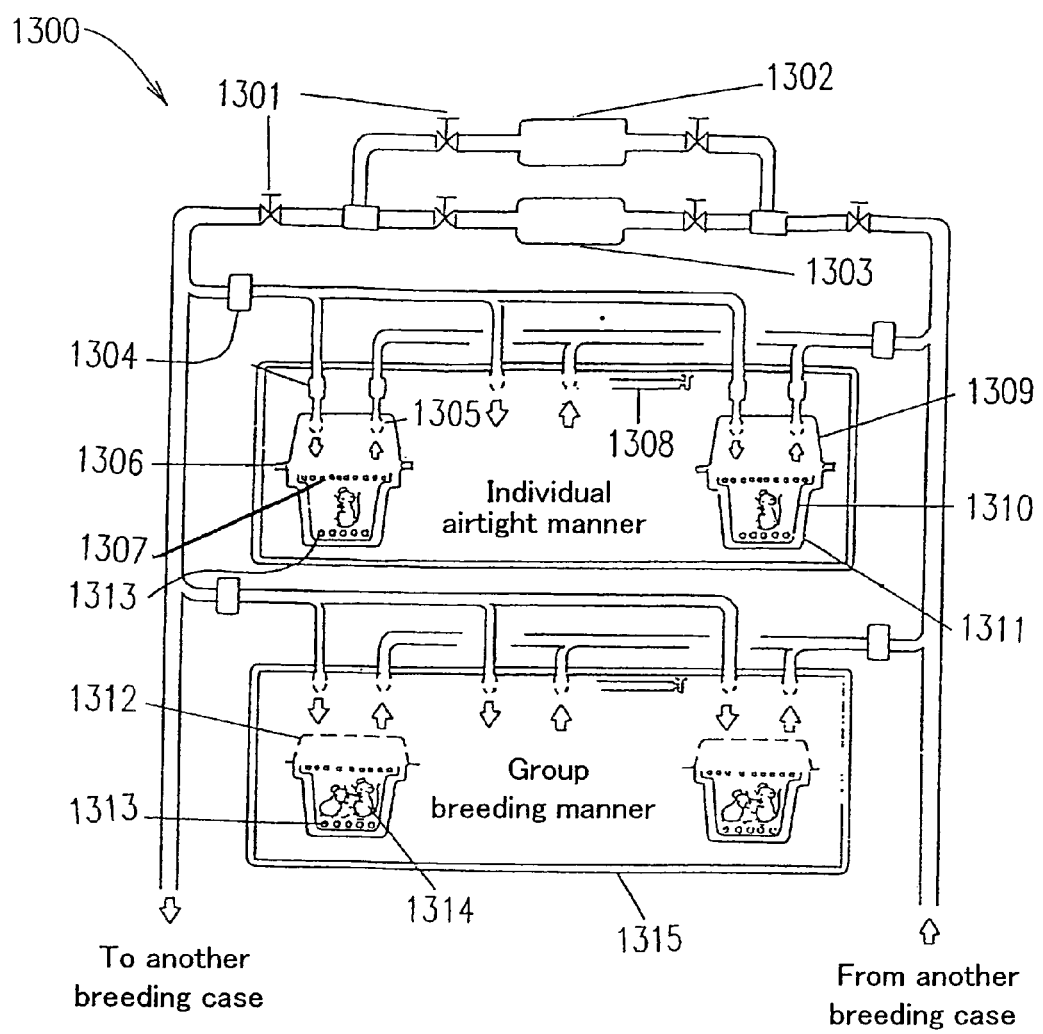
FIG. 28 shows still another example of using an animal breeding unit according to the present invention.
Figure 29:
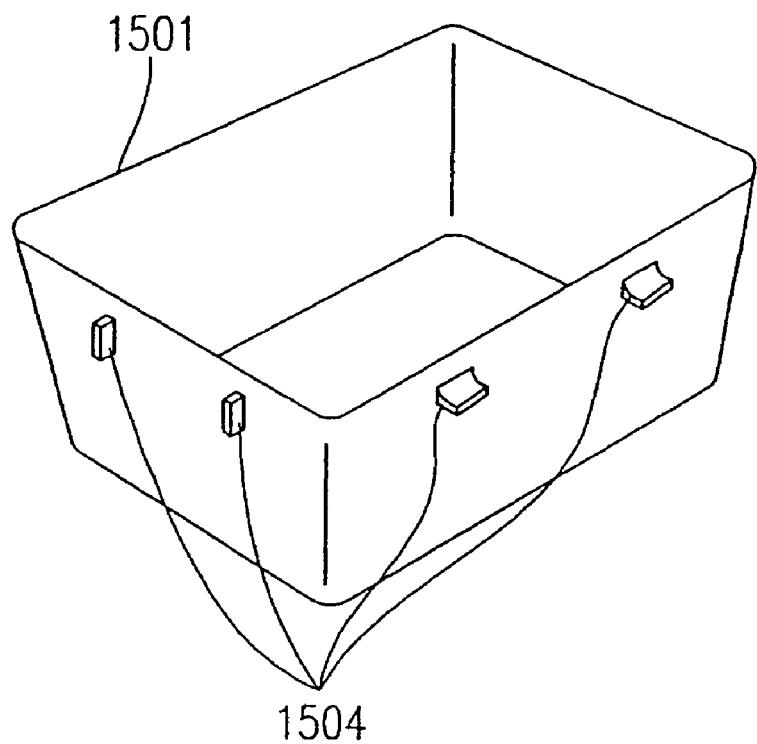
FIG. 29 shows a shape of a conventional animal breeding cage.

FIG. 28 shows still another example. A system in this example includes air valve 1301, a circulating sterilization device 1302, a compact air-conditioner 1303 including a filter and a deodorization device, a tube connector 1304, a dust filter 1305, a packing member 1306, an escape preventing internal lid 1307, a timer-equipped automatic illumination device 1308, an individually airtight external cover 1309, a disposable internal tray 1310, an individually airtight external tray 1311, a filter cap 1312 providing an effect of minimizing the unnecessary scattering of dust, a bedding 1313, an animal to be bred 1314, and a stack-type breeding case 1315. In this system, the animal breeding unit can be used in an individual airtightness manner as shown in the upper stage of the system in FIG. 28, or can be used in a group breeding manner as shown in the lower stage of the system in FIG. 28. The group breeding is possible when it is not necessary to isolate each cage for the purpose of the experiment, as long as the experimental chamber is clean and there is no risk of infection. In the group breeding, it is not necessary to isolate each animal breeding unit, and therefore the animals can be bred in a unit including an external tray, an internal tray and a lid. Thus, the system is simpler to handle. The use of the internal tray makes it possible to exchange the bedding cleanly and easily. This operation does not need a safety cabinet or a clean bench, and can be performed in an ordinary laboratory.

Figure 30:
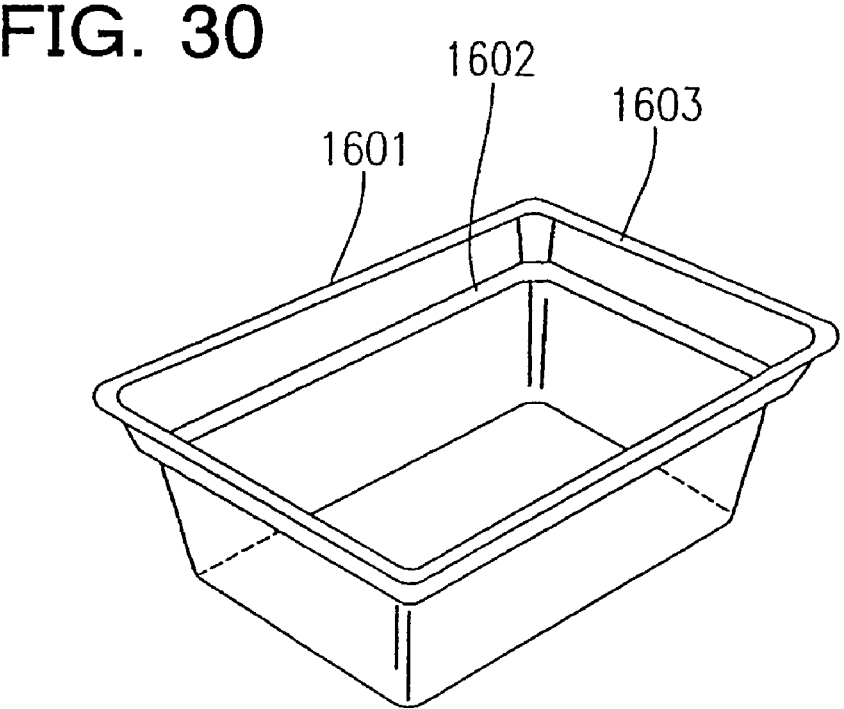
FIG. 30 shows one exemplary animal breeding unit in which a brim surface is utilized.

FIG. 30 shows one example according to the present invention in which a brim surface is utilized.

A breeding cage main body 1601 is formed of a resin, and has a stepped portion 1602 throughout an inner wall thereof. The stepped portion 1602 is parallel to the bottom of the main body 1601. The main body 1601 has a brim surface 1603 along an outer perimeter around an upper opening thereof. The main body 1601 is formed of a resin in this example, but may be formed of paper, styrene foam, wax, or a mixed material thereof. In this example, the stepped portion 1602 and the brim surface 1603 provided on the main body 1601 alleviate the deformation of the breeding cage which is caused by stacking a plurality of cages. Thus, each cage can be removed from the stack more easily.

The stepped portion 1602 allows a lid for preventing the animal from escaping to be put on the stepped portion 1602. Thus, the excrement generated by the excretion of the animal and the bedding materials can be prevented from scattering by the height difference between the escape-preventing lid and the opening of the breeding cage. Therefore, a great amount of the labor and cost for the cleaning work can be significantly reduced, and the amount of dust generated in the breeding chamber by the cleaning work is minimized.

Since a filter can be easily attached to the brim surface 1603, the product according to the present invention can be used as an airtight transportation case. In each experimental institute, the labor for, for example, transferring the animals and the cost for disposing the used transportation cases can be reduced for the following reasons. The transportation case equipped with a filter can be smoothly moved to a breeding and experimental zone after being sterilized with a pharmaceutical drug or the like, and the transportation case can be used as a breeding cage after removing the filter attached to the brim surface 1603 in the breeding and experimental chamber.

An airtight lid connected to air supply and discharge tubes can be easily attached to and detached from the brim surface 1603. Therefore, the breeding cage is easily made airtight. In addition, the odor of the animal and dust generated while the animal is bred are prevented from being diffused to the external environment, and the breeding cage is protected against contamination from the external environment. Special experimental animals such as, for example, infected animals, sterilized animals, and animals with immune diseases can be bred safely and easily. Therefore, research and experiments using experimental animals can be performed without any specific experimental facility. Since the volume of the airtight breeding cage is the target of air-conditioning, the amount of air to be processed is significantly reduced as compared to the conventional ventilation system targeted for the entire breeding chamber. Thus, the scale and cost of air-conditioning equipment can be significantly reduced.

In still another example, an internal tray supplied from the material carrier may be used as a disposable bedding in the conventional breeding cage. In this case, the labor which was conventionally required for each used breeding cage, i.e., the labor of, for example, removing, cleaning, sterilizing, and putting the bedding material, and the expenses for light and fuel can be significantly reduced. In conventional experimental facilities, the labor and cost are significantly reduced. As for newly building animal experimental facilities, highly flexible experimental facilities which are usable for many purposes can be built.

(Gene Modification Experiment Using an Independent Isolated Type Breeding System)

Using an independent isolation type breeding system according to the present invention, the creation of gene modified animals can be performed by group breeding with no problem, without isolating the animals at P1 and P2 levels. In this example, a gene introduction experiment was performed using a virus vector.

Gene modification of rats was performed using an adeno-associated virus vector as the virus vector.

First, cultured rat cells and tissues were infected with an adeno-associated virus having β-galactosidase or GFP as a reporter gene, and the optimum concentration of infection was checked.

Next, the DNA of a molecule which is expected to control a signal transduction molecule (JNK, SEL, etc.) was incorporated into the adeno-associated virus, and the cultured rat cells and tissues were infected therewith so that the signal transduction molecule was expressed. The virus infection experiment was performed in a laboratory satisfying the P2 or higher level conditions.

Next, tissues of rats gene-introduced ex vivo were implanted into rats. The rats were bred using a system according to the present invention. The system was installed in a laboratory satisfying the P2 or higher level conditions. Operations of directly or indirectly treating viruses, including virus infection and implantation using animals, were performed. Operations of treating virus particles were performed in a safety cabinet. The wastes generated by the experiments were all sterilized.

The rats gene-introduced ex vivo were individually isolated and bred by the system according to the present invention. The filth discharged by the rats was collected in the safety cabinet together with the internal trays, accommodated in a sterilizing pack, and sterilized.

The role played by the signal transduction molecule expressed using the gene-introduced rats was analyzed (data is not shown).

The gene-introduced animals were treated in the safety cabinet and used for preparation of specimens.

As a result of such an analysis, an accurate experimental result, which was the same as that obtained by conventional large-scale animal breeding facilities, was obtained.

Thus, use of the system according to the present invention allows the virus vector used for gene introduction to be completely isolated, so that the experiments can be performed safely.

(Infection Experiment Using an Independent Isolation Type Breeding System)

When using an independent isolation type breeding system according to the present invention, the established infection experiments may be performed in a laboratory satisfying P1, P2, P3 or P4 level conditions in accordance with the microorganism used. By installing the system according to the present invention in a laboratory satisfying such conditions, the experiments can be performed safely.

In this example, an infection experiment using a Japanese encephalitis virus as an infectious agent will be described. As animals, mice were used.

The mice were inoculated with the Japanese encephalitis virus. This virus infection experiment was performed in a laboratory satisfying the P3 or higher level conditions. The mice were bred and kept using a system according to the present invention. The operations of treating the Japanese encephalitis virus were performed in the safety cabinet. The wastes generated by the experiments were all sterilized.

The infected mice were individually isolated and bred by the system according to the present invention. The filth discharged by the mice was collected in the safety cabinet together with the internal trays, accommodated in a sterilizing pack, and sterilized. The survival state of the mice infected with Japanese encephalitis were checked. Regarding the dead mice, the bodies were subjected to an autopsy to check, for example, the influence on each organ. The influences on the organs by the length of time by which the mice survived were compared and studied (data is not shown).

The infected animals were treated in the safety cabinet and used for preparation of specimens.

Which of P1 through P4 level conditions are to be used depends on the type of infectious agent such as the virus, and the cases where each level of conditions is to be used are shown in a list defined by an authority of each national government (in the case of Japan, for example, the Recombinant DNA Experiment Guidelines defined by the Ministry of Education, Culture, Sports, Science and Technology) (e.g., http://www.mext.go.jp/a_menu/shinkou/seimei/dna.htm).

Thus, use of the system according to the present invention allows the infectious agent and the infected animals to be completely isolated, so that the experiments can be performed safely.

The present invention has been described by way of preferable embodiments and examples of the present invention. It is understood that the scope of the present invention should be interpreted by the attached claims. It is also understood that the patents, patent applications, and other documents used in this specification are incorporated by reference such that the contents thereof are interpreted as being described in this specification.

INDUSTRIAL APPLICABILITY

The present invention provides a low-cost and easy-to-handle, individually isolatable animal breeding unit. The present invention eliminates the necessity of animal experimental facilities, especially large-scale animal experimental facilities, and significantly reduces the maintenance cost and labor. The present invention provides a novel form of animal transportation (breeding cage having a transportation function).

The invention claimed is:

1. An airtight animal breeding unit comprising:
   an airtight external tray;
   an internal tray;
   a mesh cover; and
   an airtight lid;
   wherein the external tray comprises a bottom, side walls, and an upper opening, an inner surface of each of the walls being formed to have a first stepped portion along an entire perimeter of the external tray and that is parallel to the bottom, and a brim surface is formed along an outer perimeter of the upper opening;
   wherein the internal tray is the same shape as the external tray and is configured to fit wholly within the external tray such that when the internal tray is disposed wholly within the external tray the internal tray is supported by the first stepped portion of the external tray and constructed so that an animal contained within the internal tray cannot contact the external tray, the internal tray configured to be disposable and comprising sufficient space for breeding an animal of interest, wherein walls of the internal tray are formed to have a second stepped portion configured to occupy the external tray first stepped portion around substantially an entire outer boundary of the internal tray, the internal tray including an upwardly-extending brim portion that extends above side walls of the internal tray; and
   wherein the lid is directly attachable to and detachable from the brim surface of the external tray;
   wherein contacting surfaces of the lid and the brim surface are formed to maintain airtightness when the lid is attached to the brim surface of the external tray;
   wherein the lid includes at least one opening configured for airtight connection to an environment-maintaining device; and
   wherein the mesh cover is configured for preventing an animal from escaping, the mesh cover being supported by the second stepped portion of the walls of the internal tray.

2. A system comprising a plurality of animal breeding units according to claim 1.

3. An animal breeding unit according to claim 1, wherein the contacting surfaces of the lid and the brim surface that are formed to maintain airtightness when the lid is attached to the brim surface of the external tray comprise a sealing tape on the lid.

4. An animal breeding unit comprising:
   an airtight construction configured to maintain airtightness, including when connected with an environment maintaining device, the animal breeding unit including an airtight external tray;
an internal tray; and
an airtight lid including an opening configured for airtight connection to an environment-maintaining device;
wherein the external tray comprises a bottom, side walls, and an upper opening, an inner surface of each of the walls being formed to have a stepped portion along an entire perimeter of the external tray and that is parallel to the bottom, and a brim surface formed along an outer perimeter of the upper opening;
wherein the internal tray is the same shape as the external tray,
   is configured to fit wholly within the external tray such that when the internal tray is disposed within the external tray the internal tray is supported by the stepped portion of the external tray around substantially an entire outer boundary of the internal tray, the internal tray configured to be disposable and comprising sufficient space for breeding an animal of interest,
   is configured to include an upwardly-extending brim portion that extends above side walls of the internal tray, and
   is constructed so that an animal contained within the internal tray cannot contact the external tray; and
wherein the lid is directly attachable to and detachable from the brim surface of the external tray, the attachment being configured to form an airtight connection between the lid and the external tray.

5. A system comprising a plurality of animal breeding units according to claim 4.

* * * * *